United States Patent
Sullivan et al.

(10) Patent No.: US 11,718,754 B2
(45) Date of Patent: Aug. 8, 2023

(54) POLY(SARCOSINE) POLYMER EXCIPIENTS

(71) Applicant: CALUSA BIO, LLC, Tampa, FL (US)

(72) Inventors: Bradford T. Sullivan, Clearwater, FL (US); Kevin N. Sill, Tampa, FL (US)

(73) Assignee: CALUSA BIO, LLC, Tampa, FL (US)

( * ) Notice: Subject to any disclaimer, the term of this patent is extended or adjusted under 35 U.S.C. 154(b) by 0 days.

(21) Appl. No.: 17/985,428

(22) Filed: Nov. 11, 2022

(65) Prior Publication Data
US 2023/0142999 A1    May 11, 2023

Related U.S. Application Data

(60) Provisional application No. 63/263,900, filed on Nov. 11, 2021.

(51) Int. Cl.
*C08L 89/00* (2006.01)

(52) U.S. Cl.
CPC .................................. *C08L 89/00* (2013.01)

(58) Field of Classification Search
CPC .... A61K 49/22; A61K 49/221; A61K 31/785; A61K 9/19; A61K 31/427; A61K 45/06; A61K 47/18; A61K 9/1641; A61K 31/4738; C08G 69/49; C08G 69/04; C08G 63/10; C08G 69/10
See application file for complete search history.

(56) References Cited

U.S. PATENT DOCUMENTS

| | | | |
|---|---|---|---|
| 4,600,526 | A | 7/1986 | Gallot et al. |
| 4,859,753 | A | 8/1989 | Gallot et al. |
| 7,501,280 | B2 | 3/2009 | Nagamune et al. |
| 10,836,869 | B1 | 11/2020 | Sill et al. |
| 2001/0036914 | A1 | 11/2001 | Philippe et al. |
| 2002/0164360 | A9 | 11/2002 | Philippe et al. |
| 2010/0092405 | A1 | 4/2010 | Philippe et al. |
| 2018/0280547 | A1* | 10/2018 | Saji ............... C08G 69/48 |
| 2022/0001025 | A1 | 1/2022 | Barz et al. |

FOREIGN PATENT DOCUMENTS

| | | |
|---|---|---|
| JP | 5142313 B2 | 2/2013 |
| WO | 1995007881 A1 | 3/1995 |
| WO | 2020/070040 A1 | 4/2020 |
| WO | 2021191265 A1 | 9/2021 |

OTHER PUBLICATIONS

Hortz, Christian, et al., "Cylindrical brush polymers with polysarcosine side chains: a novel biocompatible carrier for biomedical applications." Macromolecules 48.7 (2015): 2.
Bleher, Stefan, et al., Poly (Sarcosine) Surface Modification Imparts Stealth-Like Properties to Liposomes. Small 15.50 (2019): 1904716.
Nogueira, Sara, et al., "Polysarcosine-functionalized lipid nanoparticles for therapeutic mRNA delivery." ACS Applied Nano Materials 3.11 (2020): 10634-10645.
Weber, Benjamin, et al., "Polysarcosine-based lipids: from lipopolypeptoid micelles to stealth-like lipids in Langmuir Blodgett monolayers." Polymers 8.12 (2016): 427.
Mu Muhl, Christian, et al., "Synthesis and characterization of bisalkylated polysarcosine-based lipopolymers." European Polymer Journal 120 (2019): 109223.
Douy, Andre, et al., "New amphipathic lipopeptides, 1. Synthesis and mesomorphic structures of lipopeptides with polysarcosine peptidic chains." Die Makromolekulare Chemie: Ma.
Weber et al., "Polysarcosine-based lipids: From lipopolypeptoid micelles to stealth-like lipids in langmuir blodgett monolayers" Polymers, 2016, vol. 8, p. 1-14.
Hsiao et al., "Enhancing the in vivo transdermal delivery of gold nanoparticles using poly(ethylene glycol) and its pleylamine conjugate" International Journal of Nanomedicine, 2016, vol. 11, p. 1867-1878.
International search report and written opinion for application No. PCT/US2022/049670 dated Apr. 18, 2023.
Garidel et al., "A thermodynamic analysis of the binding interaction between polysorbate 20 and 80 with human serum albumins and immunoglobulins: A contribution to understand colloidal protein stabilisation" Biophysical Chemistry, 2009, vol. 143 (1-2), pp. 70.
Khan et al., "Key interactions of surfactants in therapeutic protein formulations: A review" European Journal of Pharmaceutics and Biopharmaceutics, 2015, vol. 97, p. 60-67.

* cited by examiner

*Primary Examiner* — Robert D Harlan
(74) *Attorney, Agent, or Firm* — Lando & Anastasi, LLP

(57) ABSTRACT

The present disclosure relates to the field of polymer chemistry and more particularly to poly(sarcosine) polymers and uses thereof. The disclosure is also directed to compositions comprising a protein and a poly(sarcosine) polymer and uses thereof.

24 Claims, 23 Drawing Sheets

POLY(SARCOSINE) POLYMER EXCIPIENTS

CLAIM OF PRIORITY

This application claims priority to U.S. Provisional Application No. 63/263,900, filed on Nov. 11, 2021, the entire contents of which is hereby incorporated by reference.

FIELD OF THE DISCLOSURE

This disclosure is directed to the field of polymer chemistry and more particularly to poly(sarcosine) polymers and uses thereof. The disclosure is also directed to compositions comprising a protein and a poly(sarcosine) polymer and uses thereof.

BACKGROUND

Biological drug products (biologics) are generally large, complex molecules produced through biotechnology techniques in a living system such as a microorganism, plant cell, or animal cell. Biologics are often more difficult to purify and characterize than small molecule drugs. Despite these challenges, technological advances have led to the emergence of biologics as a crucial category of pharmaceuticals. Biologics are now used for the diagnosis, prevention, and treatment of diseases and medical conditions that previously relied on small molecules. Currently, the majority of approved and under development biologics are protein-based (protein biologics), with monoclonal antibodies (mAb) representing the largest sub-category. Proteins are inherently fragile molecules, especially when compared to small molecules. Conditions such as temperature, pH, ionic strength, light, mechanical stress, and interfacial stress can all cause physical or chemical damage. This can alter the structure of a protein and lead to denaturation and aggregation and may ultimately lead to the loss of solubility of a protein. This can be problematic during the entire life of a protein biologic. During manufacturing, proteins face stressful conditions during, e.g., chromatography, mixing, filtration, pumping, filling, and lyophilization. Post-manufacturing, conditions during shipping, storage, clinical handling and administration can also have negative impacts on a protein biologic. Protein aggregation and denaturation increases the cost and complexity of manufacturing and can create a bottleneck for drug development. For a final drug product, protein aggregation and denaturation decrease storage condition flexibility and shelf-life, impedes administration, and can lead to inaccurate dosing.

Critically, protein aggregation has been connected to an increase in adverse immune responses to a biologic protein. Specifically, protein biologics can elicit the formation of anti-drug antibodies (ADAs) which may have neutralizing activity. Such is the case for tumor necrosis factor (TNF) blockers Remicade (infliximab) and Humira (adalimumab), whose ADAs have been shown to be 90% and 97% neutralizing respectively (see: van Schie, K. A., et al. *Ann. Rheum. Dis.* 2015, 74, 311). The development of ADAs can lead to the formation of immune complexes which reduce serum levels of the protein biologic. Other immunologically related adverse clinical events can manifest as anaphylaxis, cytokine release syndrome, infusion reactions, reduced drug efficiency, and cross-reactive neutralization of endogenous proteins mediating critical functions (see: Moussa, E. M., et al. *J. Pharm. Sci.* 2016, 105, 417). A protein biologic can aggregate prior to administration during manufacturing, shipment, storage, or preparations for administration. Such pre-administration protein aggregation has been correlated with an increased risk for the formation of ADAs (see: Kijanka, G., et al. *J. Pharm. Sci.* 2018, 107, 2847).

Accordingly, protein biologics are formulated with excipients, typically surfactants, which are included to abate protein aggregation as well as denaturation. Surfactant excipients are generally amphiphilic compounds which function to lower the surface tension between two phases, such as an air-water interface. Proteins in solution can absorb on to such interfaces initiating conformational changes which can lead to denaturation and aggregation. This interfacial stress for a protein in solution can arise from liquid-gas interfaces, such as the headspace in a container and gas bubbles. Liquid-oil interfacial stress between a protein in solution can arise from the use of lubricating oils (e.g., silicone oils) with the rubber plunger of pre-filled syringes and the rubber vial stoppers used in primary packaging. Liquid-solid interfaces for a protein in solution are perhaps the most common, which include interfaces with the walls of the vial or container, packing material used in chromatography, filter membranes, mixing devices, tubing used in manufacturing, and infusion sets, to name a few. Surfactants can outcompete a protein for such interfaces and prevent proteins from interacting and absorbing, thus reducing protein denaturation and aggregation. Surfactant excipients protection can be beneficial for protein biologics formulated as a solution, whether liquid or frozen, and for lyophilized forms.

Polysorbates (PS) are the most prevalent surfactant excipient utilized in the formulation of protein biologics for the prevention of denaturation and aggregation. Polysorbates are nonionic surfactants composed of polyethoxylated sorbitan functionalized with a fatty acid ester; monolaurate for polysorbate 20 (PS20) and monooleate for polysorbate 80 (PS80). Despite their wide-spread use, polysorbates have well-studied problems. Polysorbates are inherently unstable compounds, especially under the conditions in which they are used in protein formulations (i.e., aqueous solutions for manufacturing and storage). Polysorbates undergo an autooxidation process at the ethylene oxide subunits and fatty ester that yields reactive hydro- and alkyl-peroxides which oxidize proteins (see: Ha, E., et al. *J. Pharm. Sci.* 2002, 91, 2252; Kerwin, B. A. *J. Pharm. Sci.* 2008, 97, 2924). Through another process, polysorbates degrade into reactive aldehyde species (e.g., formaldehyde and acetaldehyde), which also react with proteins (see: Erlandsson, B. *Polym. Degrad. Stab.* 2002, 78, 571). In addition to the self-degradation pathways, it has been observed that proteins themselves, specifically mAbs, catalyze the cleavage of polysorbates to produce fatty acids, polyethylene glycol (PEG), and pegylated sorbitan (see: Labrenz, S. R. *Pharm. Biotechnol.* 2014, 103, 2268). Regardless of the degradation pathway, polysorbate degradants react with proteins and can initiate denaturation and aggregation and the associated downstream problems.

Polysorbate degradation pathways that produce free PEG are particularly concerning. Immunological research has implicated PEG and PEG-containing materials with an undesired immunogenic response. This issue is especially pronounced for parenteral administration, which is the most common method for the delivery of protein biologics (see: Garay, R. et al., *Expert Opin. Drug Delivery,* 2012, 1319; Yang, Q. et al., *Anal. Chem.* 2016, 88(23), 11804; Wenande, E. et al., *Clin. Exp. Allergy,* 2016, 46(7), 907; Webster, R. *Drug Metab. Dispos,* 2007, 35(1), 9). Additionally, PEG-containing pharmaceutical products can produce infusion-related reactions and anaphylaxis (see: Browne, E. K. et al.

*J. Pediatr Oncolo. Nurs.* 2018, 35(2), 103; Wylon, K., et al., *J. Allergy Clin. Immunol.* 2016, 12(1), 1.).

Accordingly, it would be desirable to develop an excipient to prevent the denaturation and aggregation of proteins which does not utilize PEG. Such excipient would have broad applications in the manufacturing, shipment, storage, and administration of proteins, in particular protein biologics.

SUMMARY

The present disclosure is directed to polymers comprising a hydrophilic poly(sarcosine) chain and hydrophobic aliphatic group, as well as compositions thereof and related methods of making and using. In some embodiments, such polymers are synthesized by the polymerization of sarcosine N-carboxyanhydride with a hydrophobic aliphatic amine, or by treating a poly(sarcosine) polymer with a fatty acid halide, along with other methods described herein and/or known to one of skill in the arts. As described herein, it has been unexpectedly found that certain polymers and/or compositions of the present disclosure are useful for the stabilization of proteins through the prevention of aggregate formation and denaturation. Also provided herein are compositions comprising such polymers and proteins, for use as described herein. Further description of exemplary embodiments of the disclosure is provided herein in the Drawings, Description, Examples, and Claims.

DETAILED DESCRIPTION

1. General Description

Figure 1:
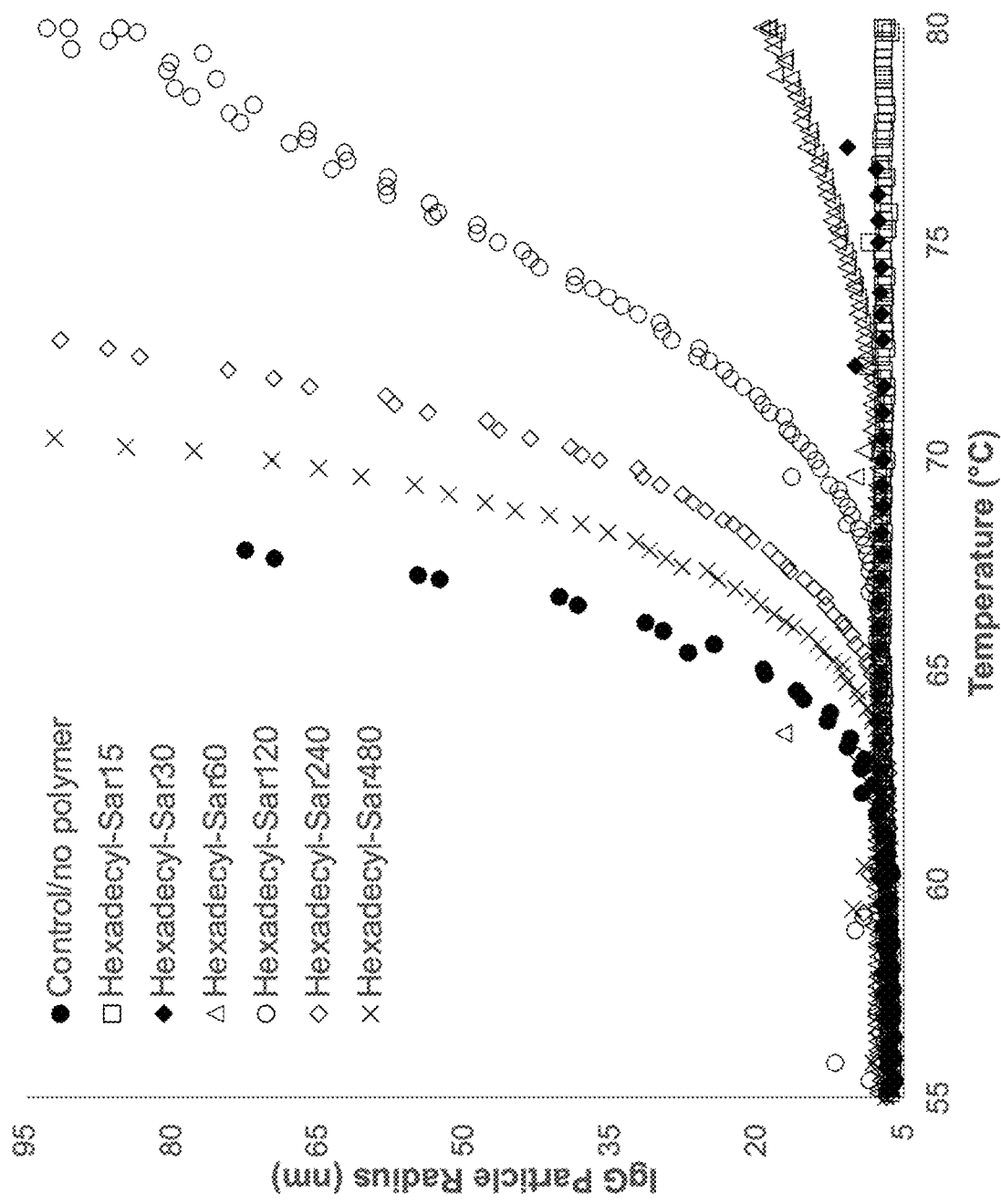
FIG. 1. Temperature ramp study of IgG (1 mg/mL, PBS, pH 7) with hexadecyl polymers of varying poly(sarcosine) lengths (each at 1 mg/mL).
Figure 2:
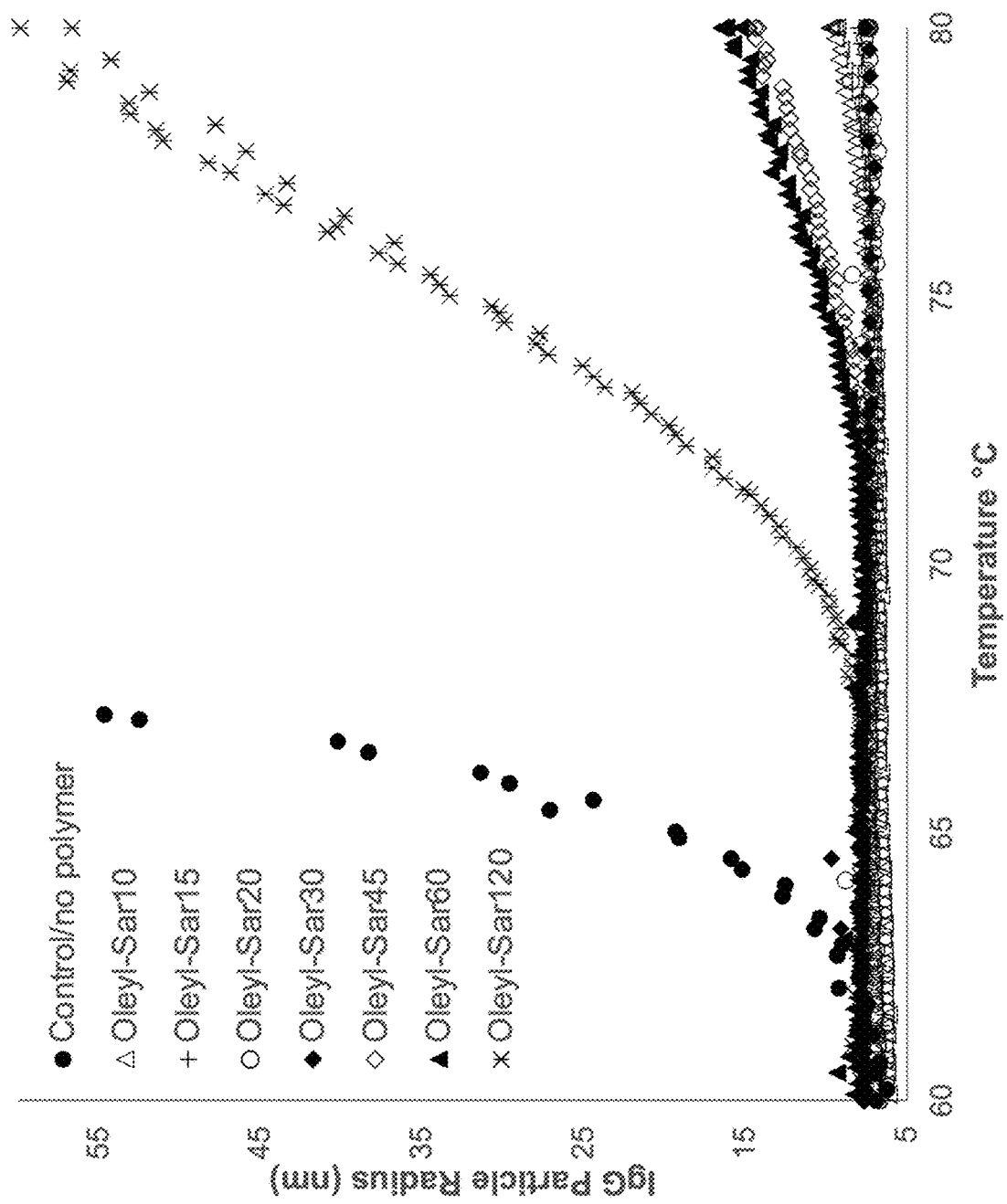
FIG. 2. Temperature ramp study of IgG (1 mg/mL, PBS, pH 7) with oleyl polymers of varying poly(sarcosine) lengths (each at 1 mg/mL).
Figure 3:
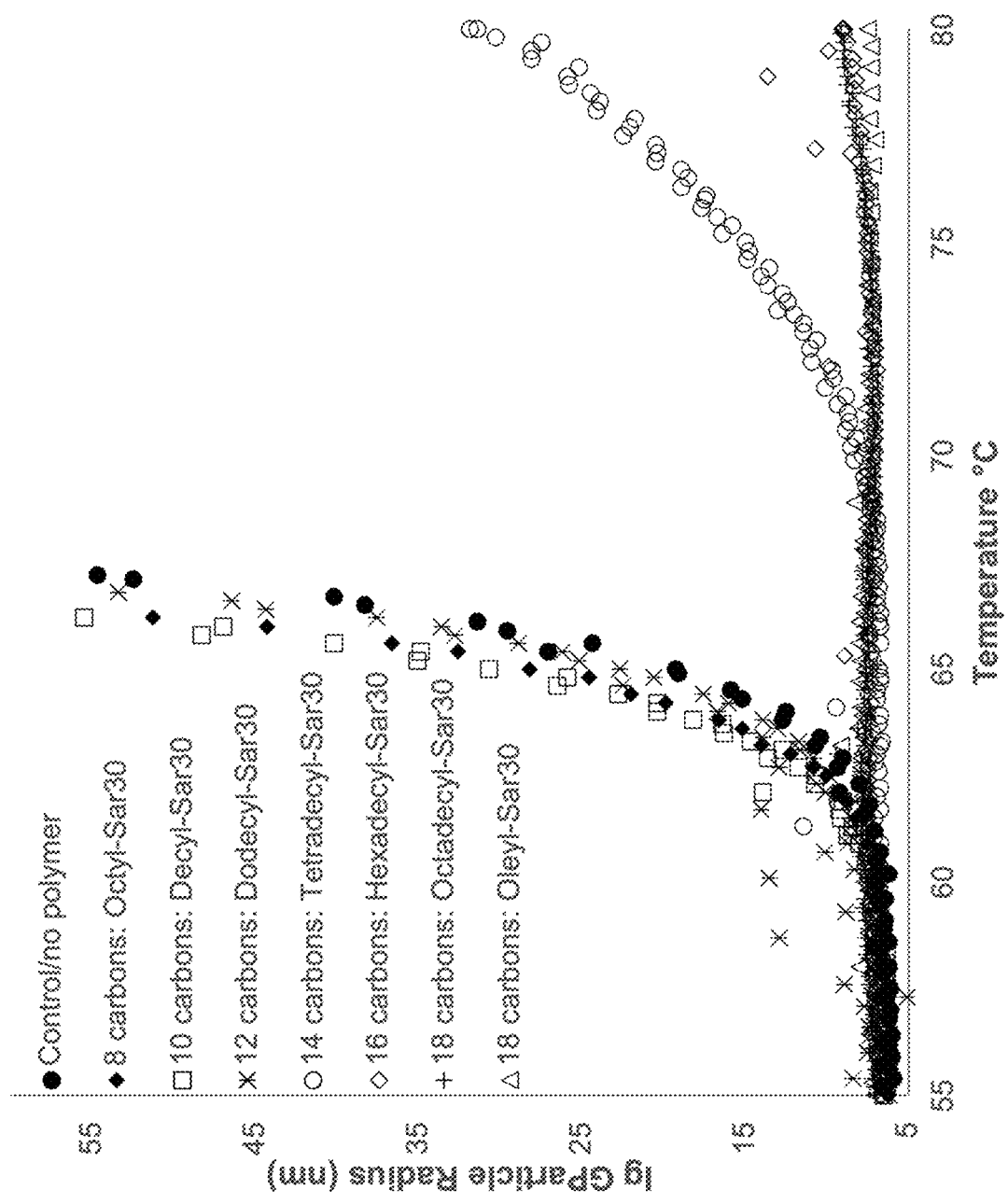
FIG. 3. Temperature ramp study of IgG (1 mg/mL, PBS, pH 7) with poly(sarcosine)$_{30}$ polymers with varying hydrocarbon length (each at 1 mg/mL).
Figure 4:
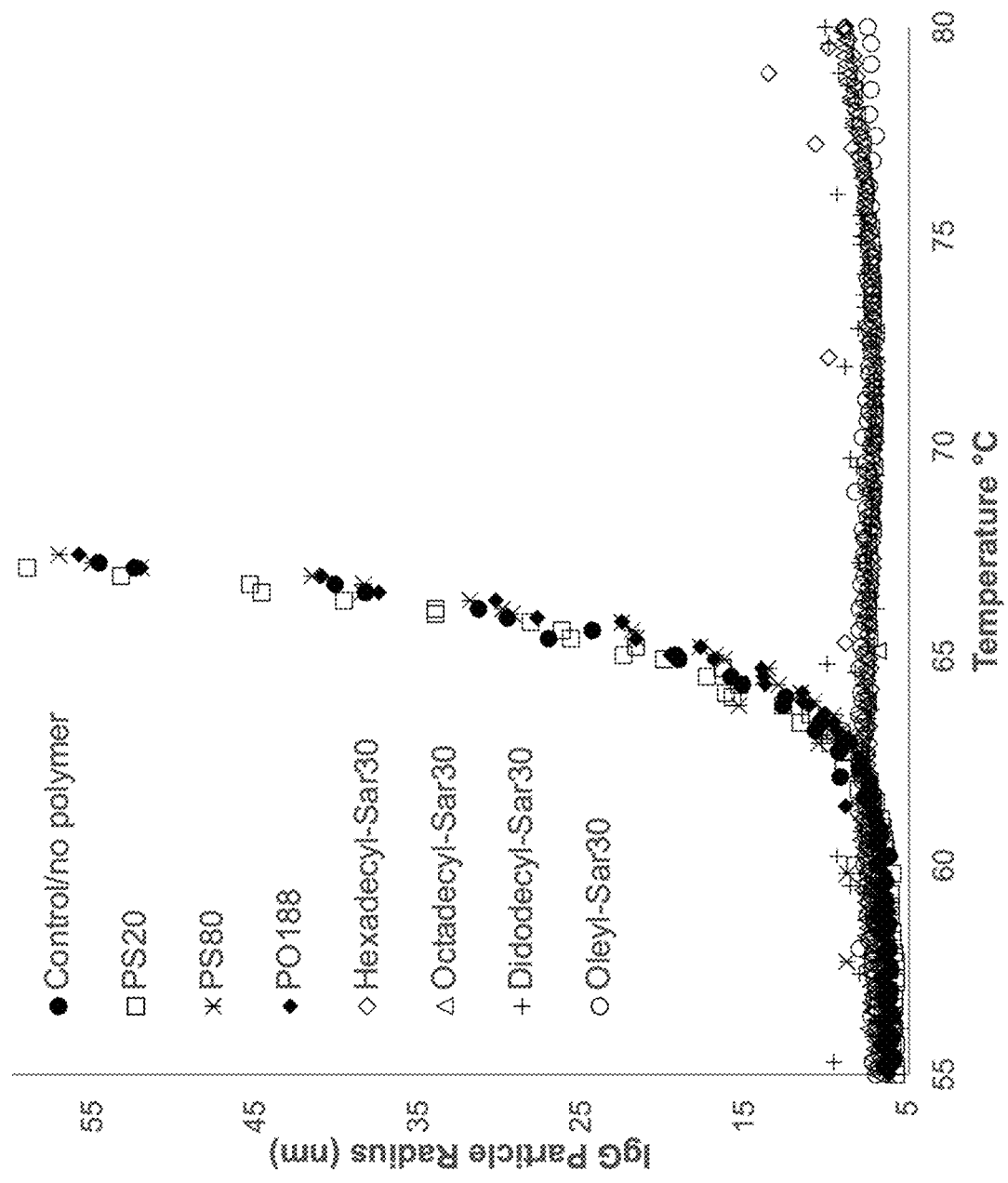
FIG. 4. Temperature ramp study of IgG (1 mg/mL, PBS, pH 7) with select PEG and poly(sarcosine) polymers (each at 1 mg/mL).
Figure 5:
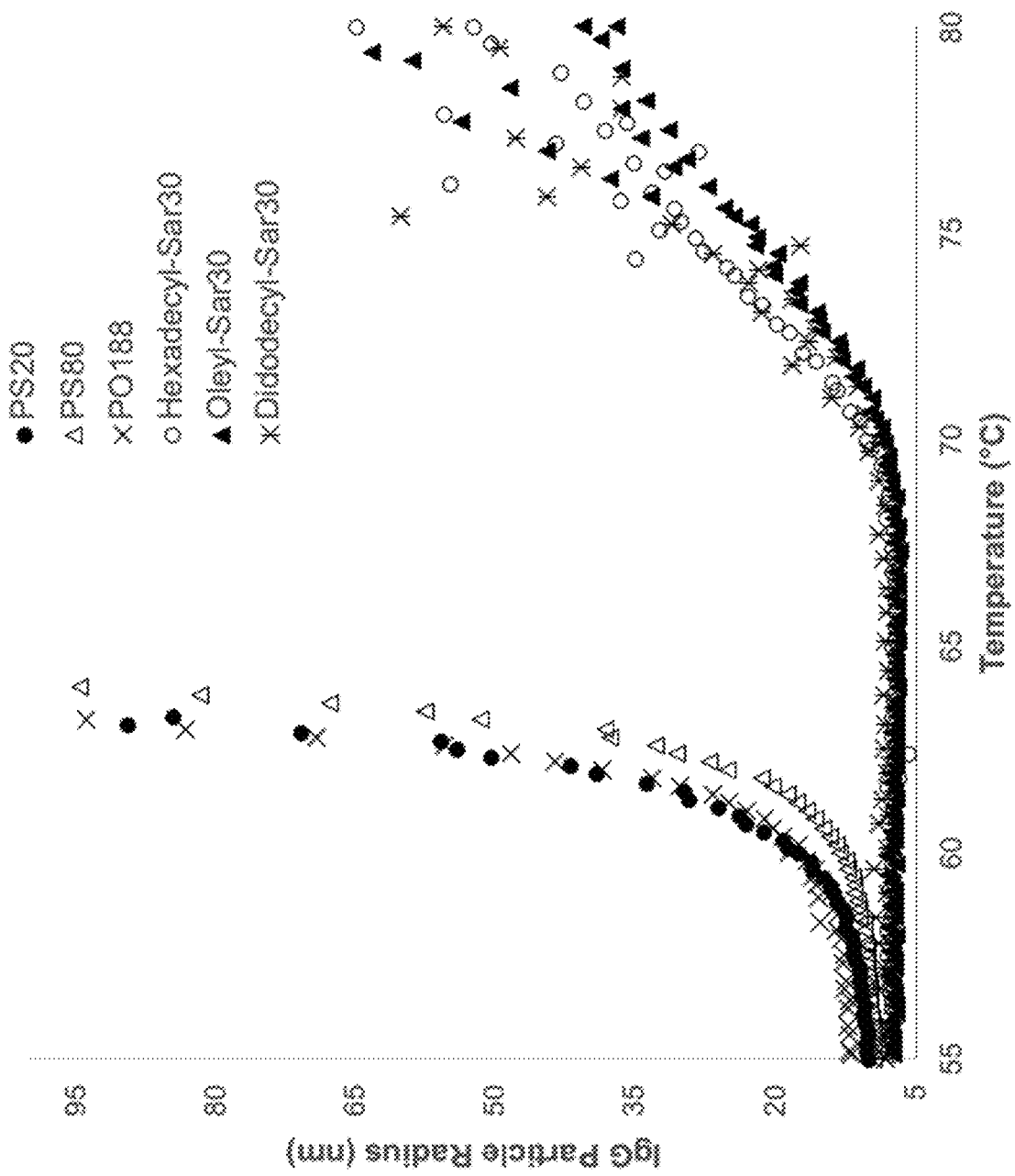
FIG. 5. Temperature ramp study of IgG (20 mg/mL, PBS, pH 7) with select PEG and poly(sarcosine) polymers (each at 20 mg/mL).
Figure 6:
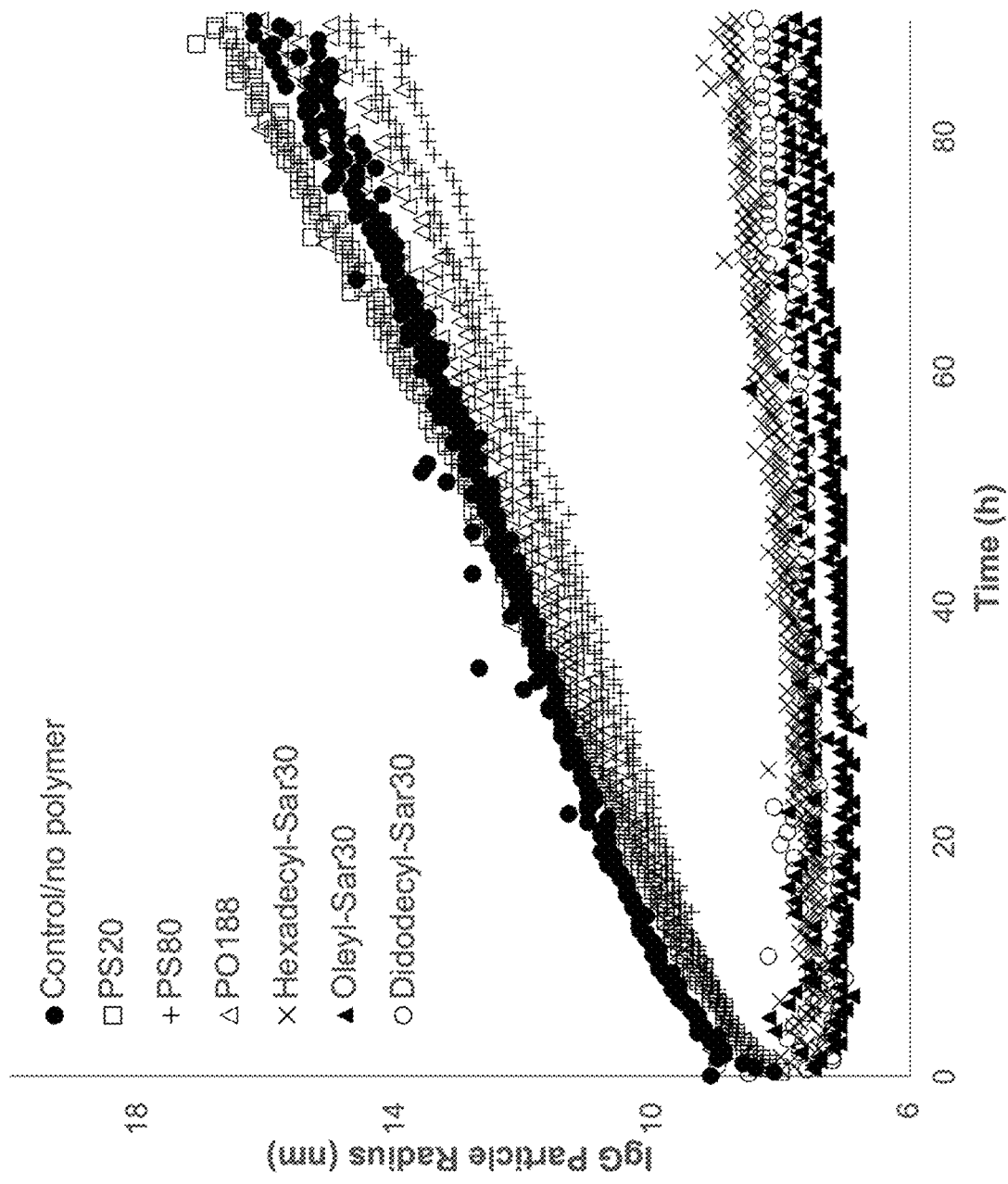
FIG. 6. Temperature hold study at 50° C. of IgG (20 mg/mL, PBS, pH 7) with select PEG and poly(sarcosine) polymers (each at 1 mg/mL).
Figure 7:
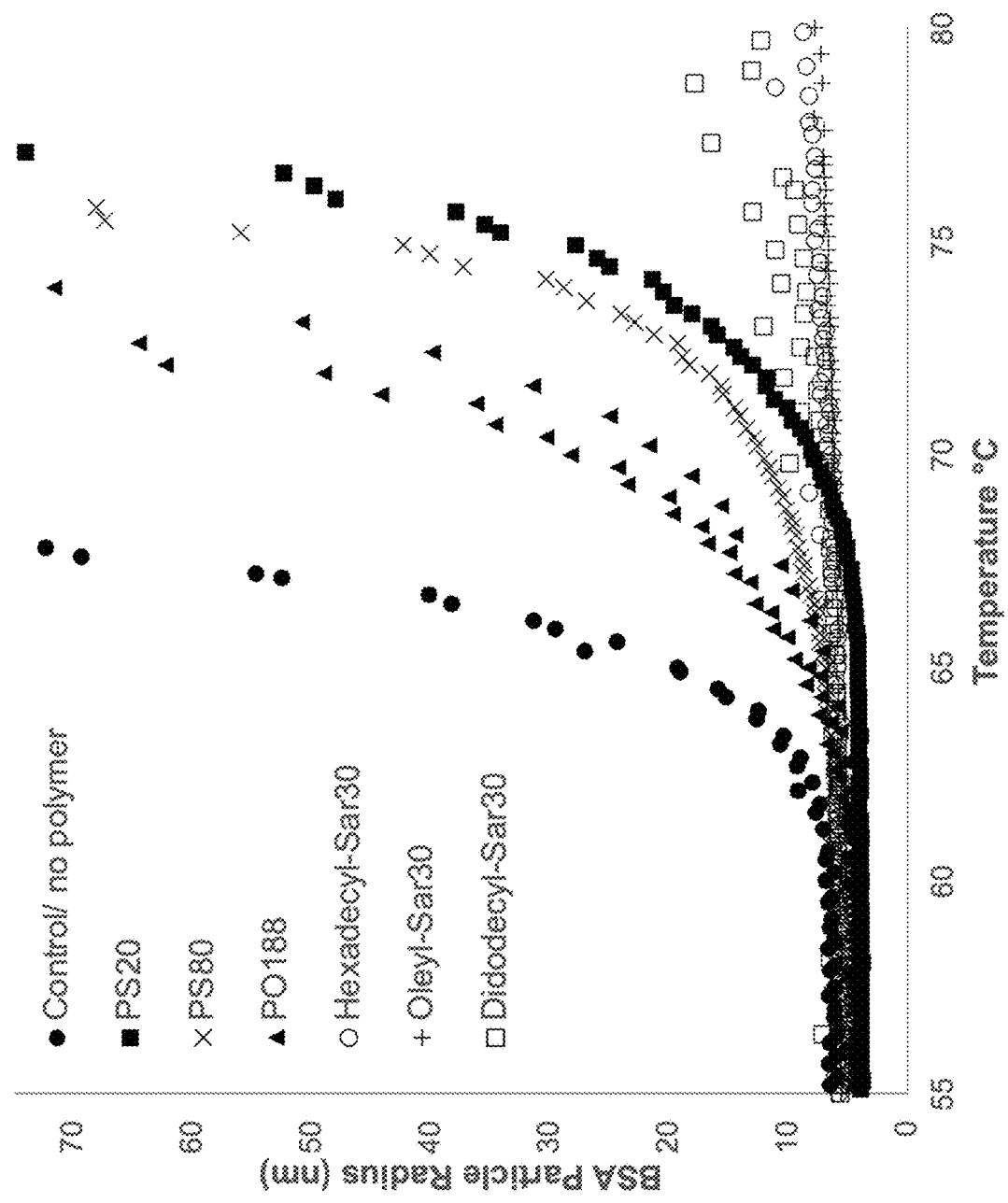
FIG. 7. Temperature ramp study of BSA (20 mg/mL, PBS, pH 7) with select PEG and poly(sarcosine) polymers (each 20 mg/mL).
Figure 8:
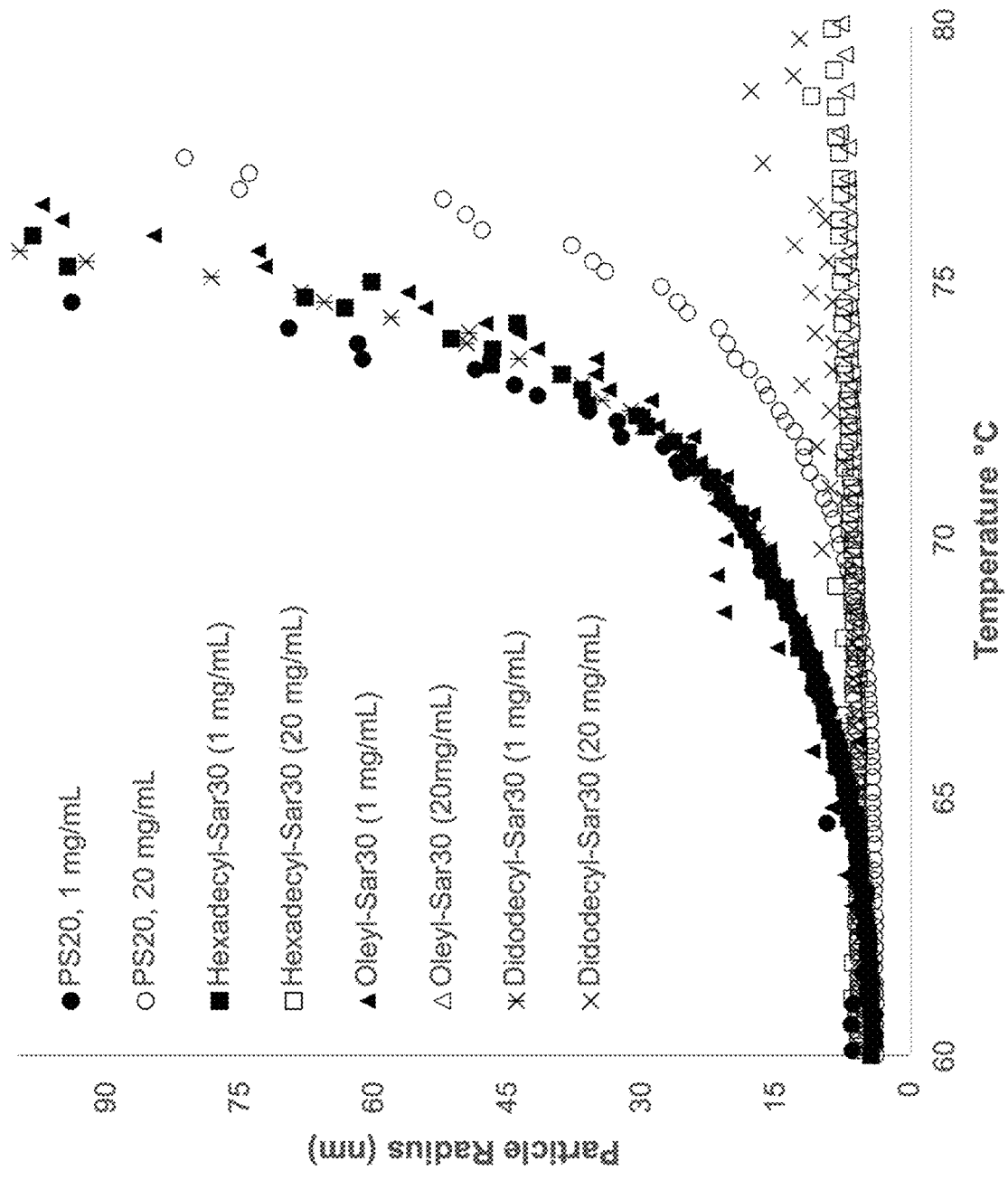
FIG. 8. Temperature ramp study of BSA (20 mg/mL, PBS, pH 7) with select PEG and poly(sarcosine) polymers (each at 1 mg/mL and 20 mg/mL).
Figure 9:
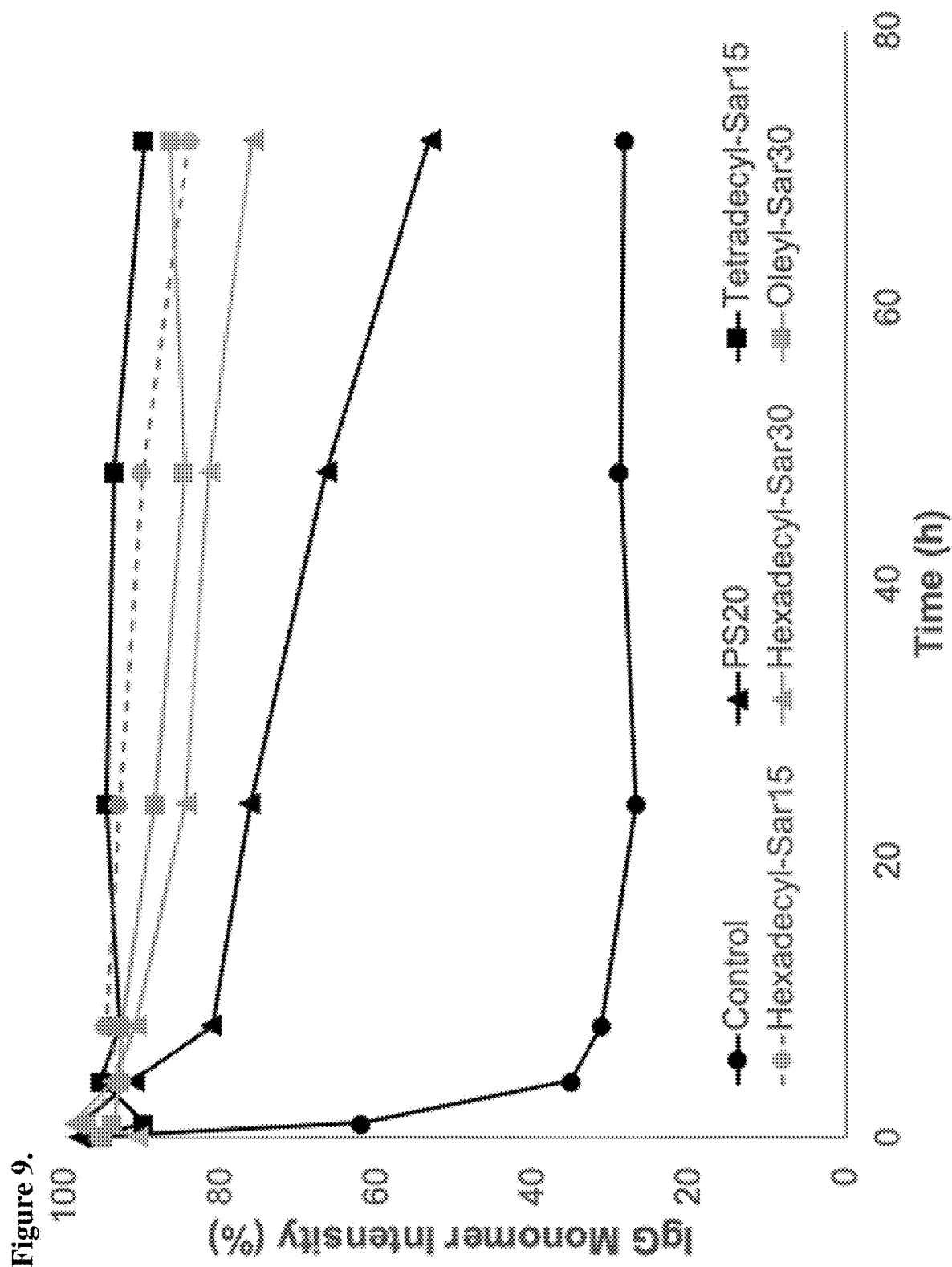
FIG. 9. Shake Stability Assay of select PEG and poly (sarcosine) polymers at 37° C. with a 200:1 IgG to polymer ratio (w/w).
Figure 10:
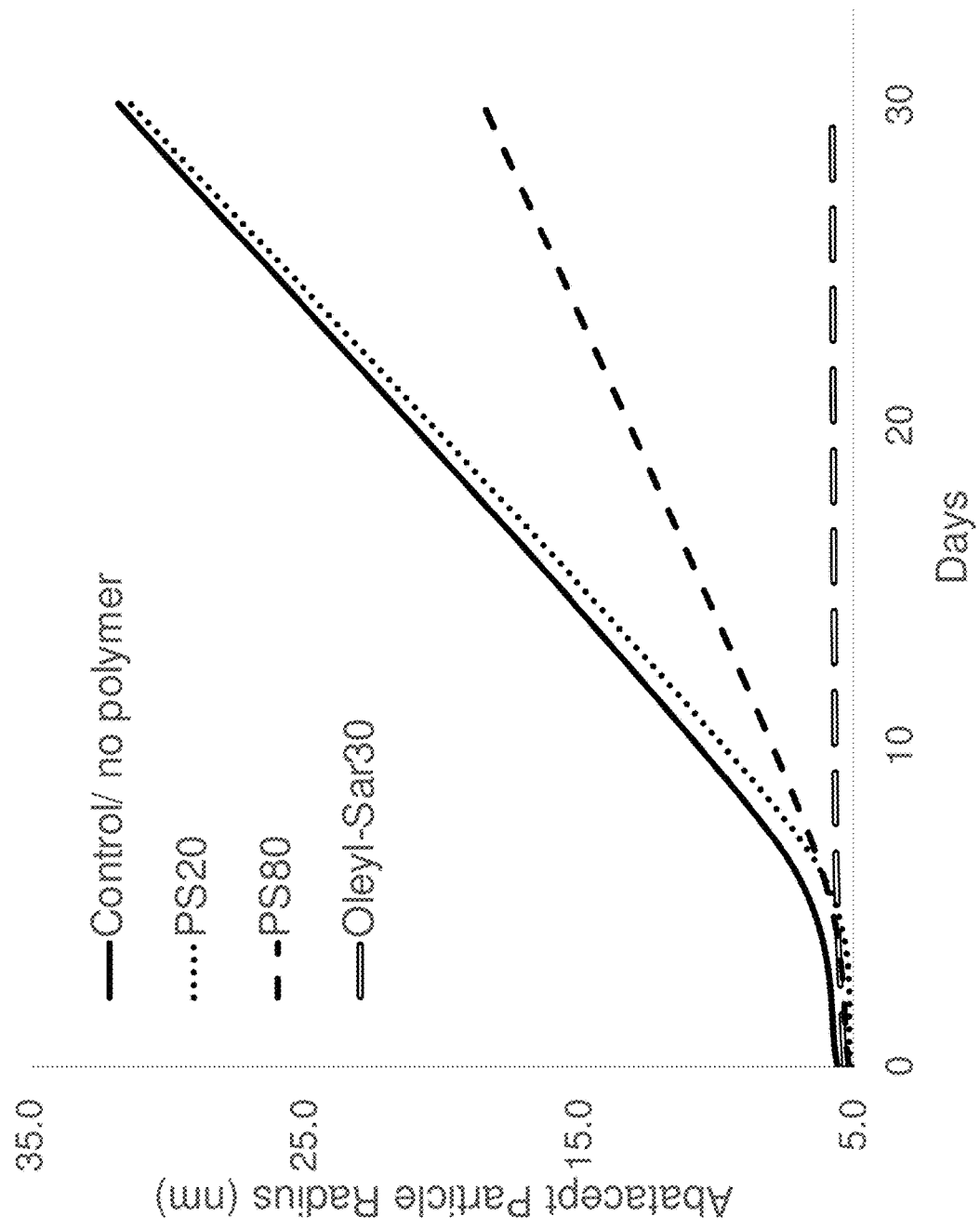
FIG. 10. Shake Stability Assay of select PEG and poly (sarcosine) polymers at 37° C. with a 20:1 abatacept to polymer ratio (w/w).
Figure 11:
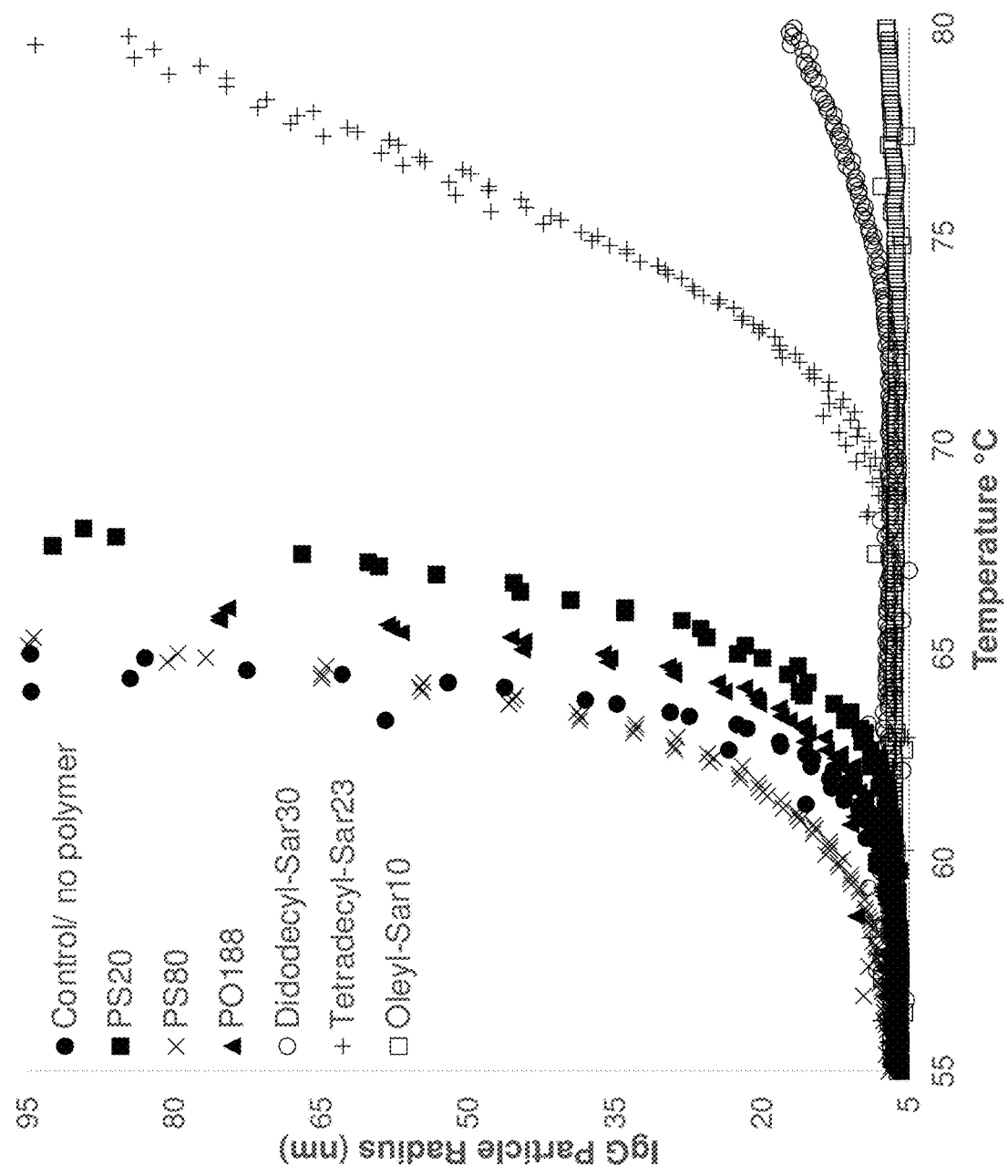
FIG. 11. Temperature ramp study of IgG (1 mg/mL, PBS, pH 7) with select PEG and poly(sarcosine) polymers (each at 1 mg/mL).
Figure 12:
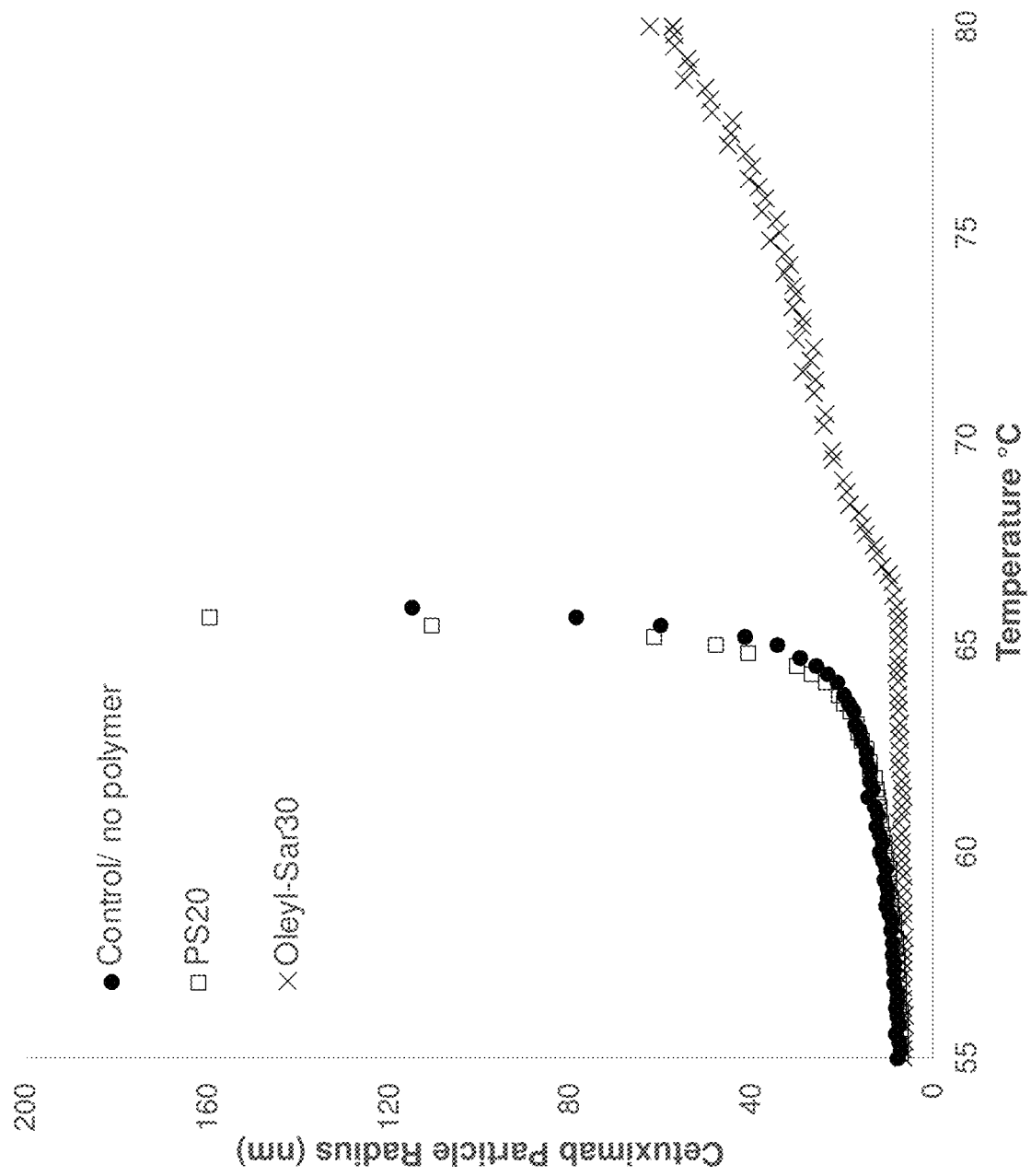
FIG. 12. Temperature ramp study of cetuximab (2 mg/mL) with select PEG and poly(sarcosine) polymers (each at 2 mg/mL).
Figure 13:
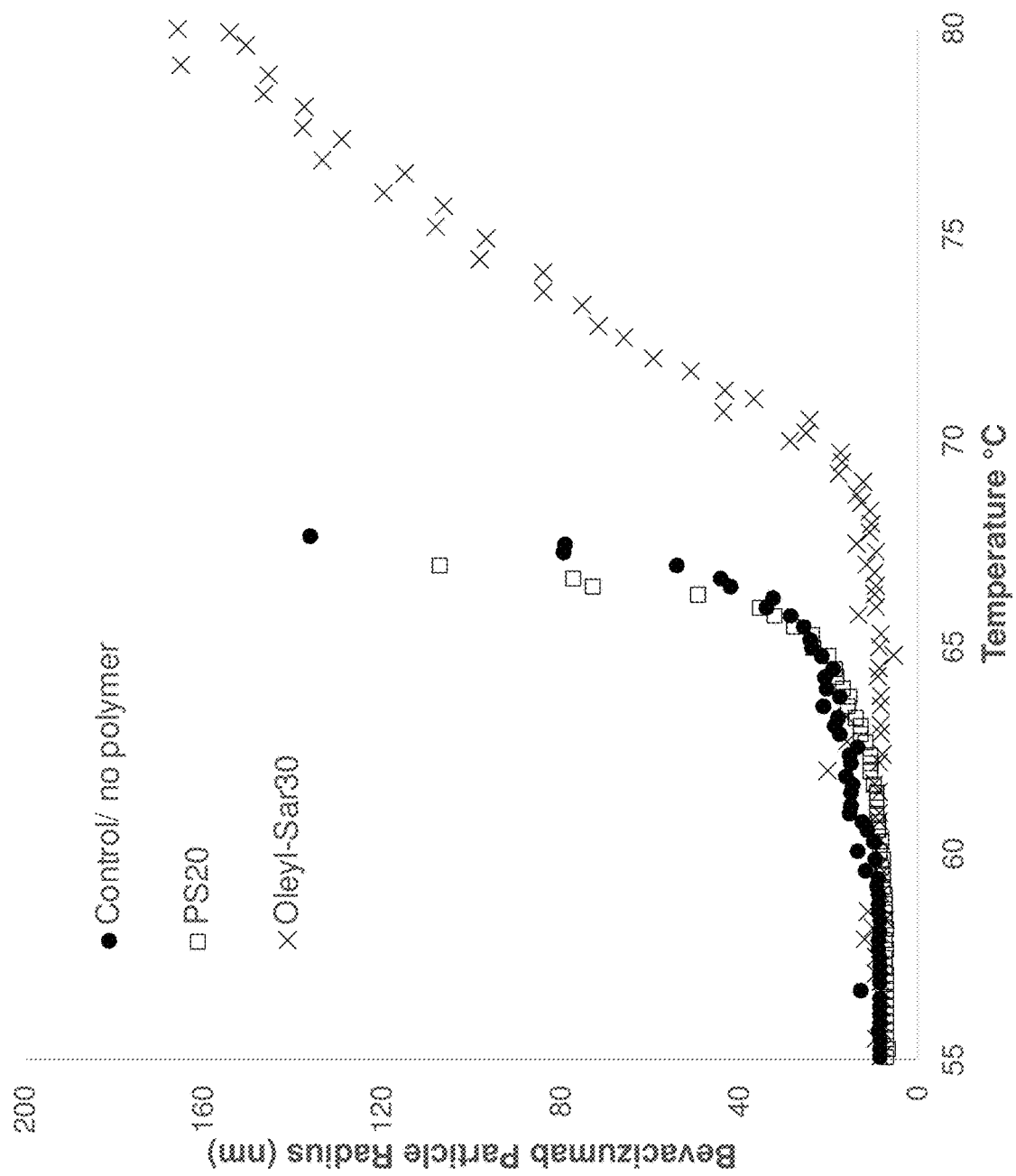
FIG. 13. Temperature ramp study of bevacizumab (5 mg/mL) with select PEG and poly(sarcosine) polymers (each at 5 mg/mL).
Figure 14:
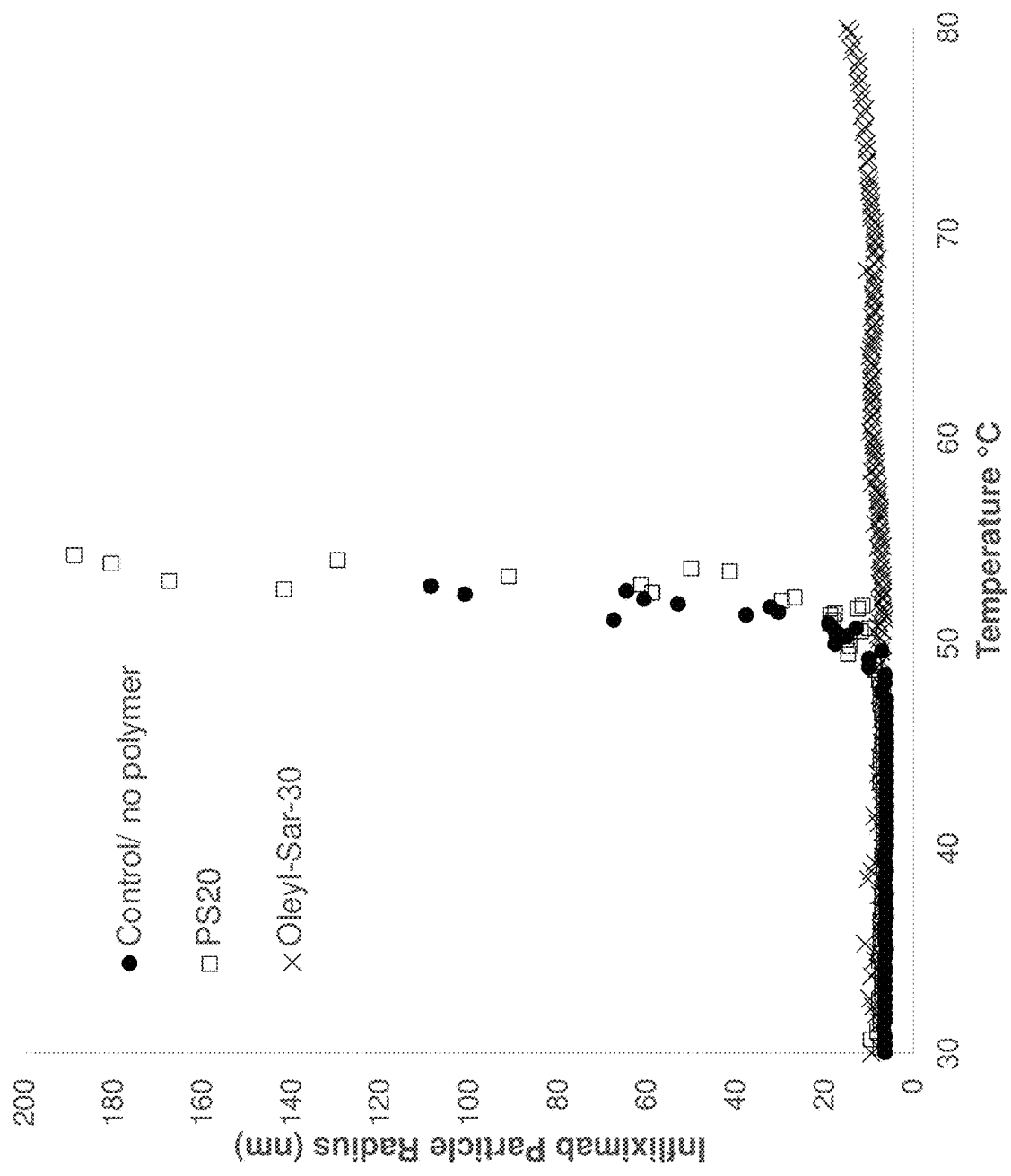
FIG. 14. Temperature ramp study of infliximab (1 mg/mL) with select PEG and poly(sarcosine) polymers (each at 1 mg/mL).
Figure 15:
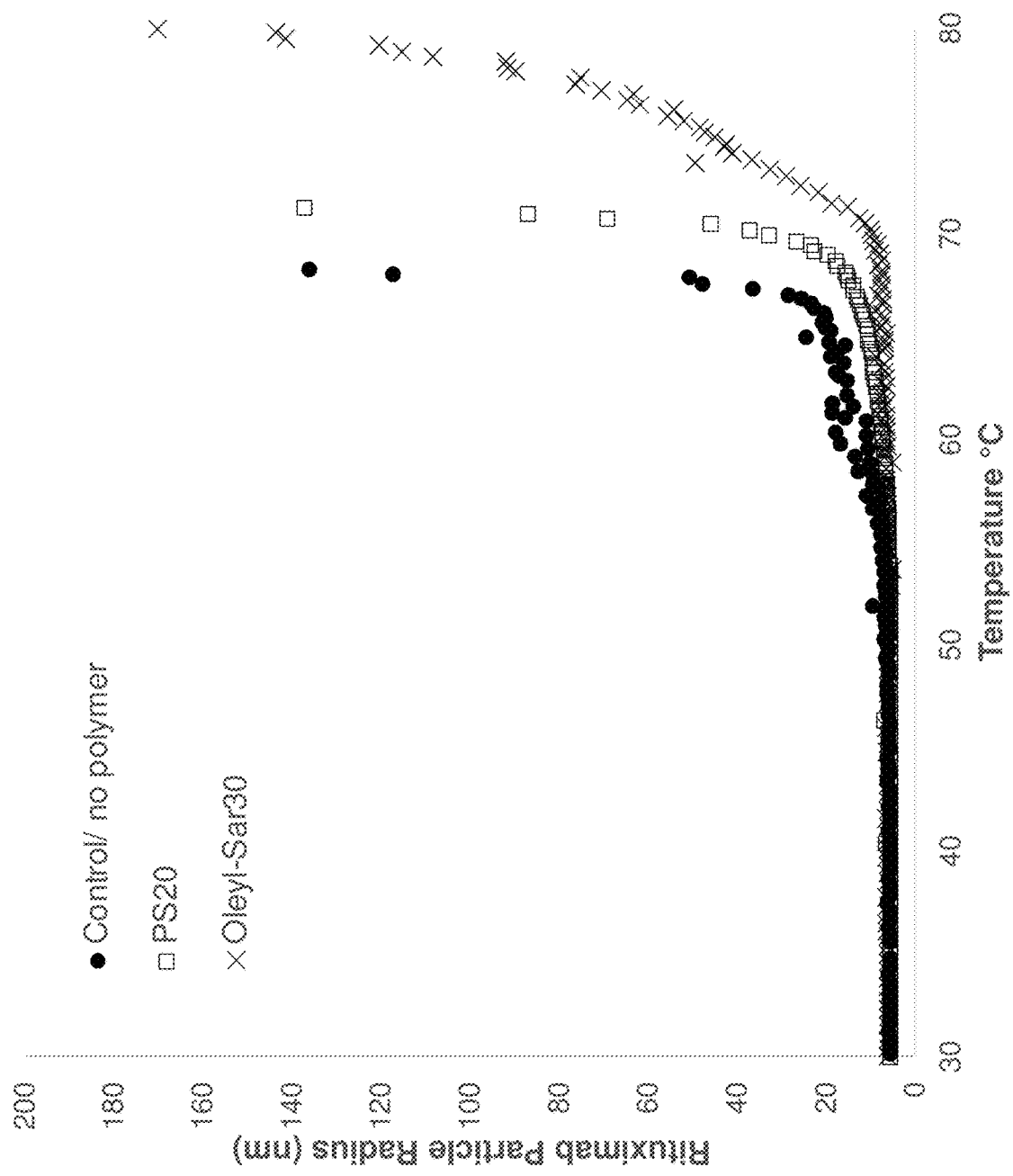
FIG. 15. Temperature ramp study of rituximab (1 mg/mL) with select PEG and poly(sarcosine) polymers (each at 1 mg/mL).
Figure 16:
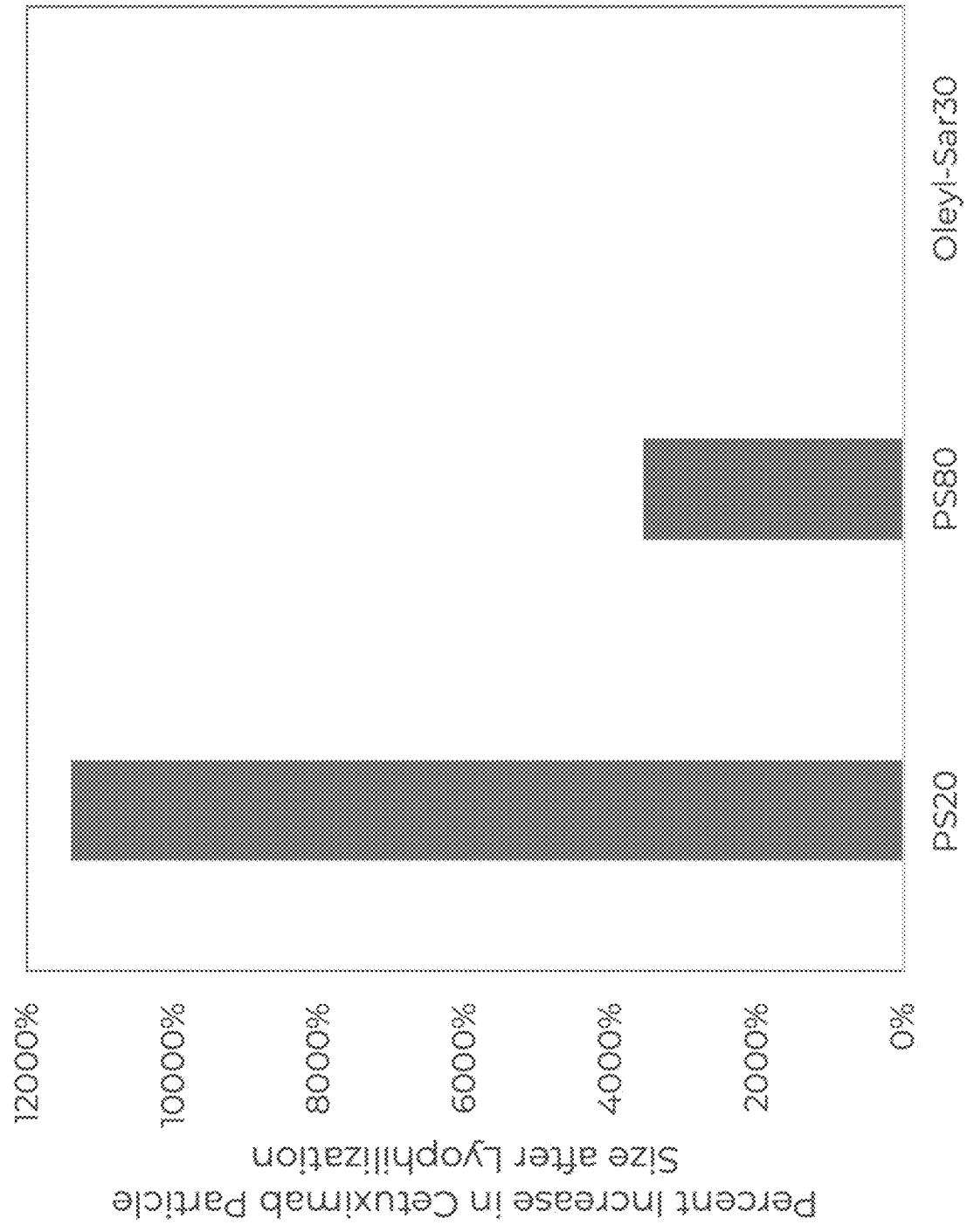
FIG. 16. Percentage increase in cetuximab particle size post-lyophilization with select polymers.
Figure 17:
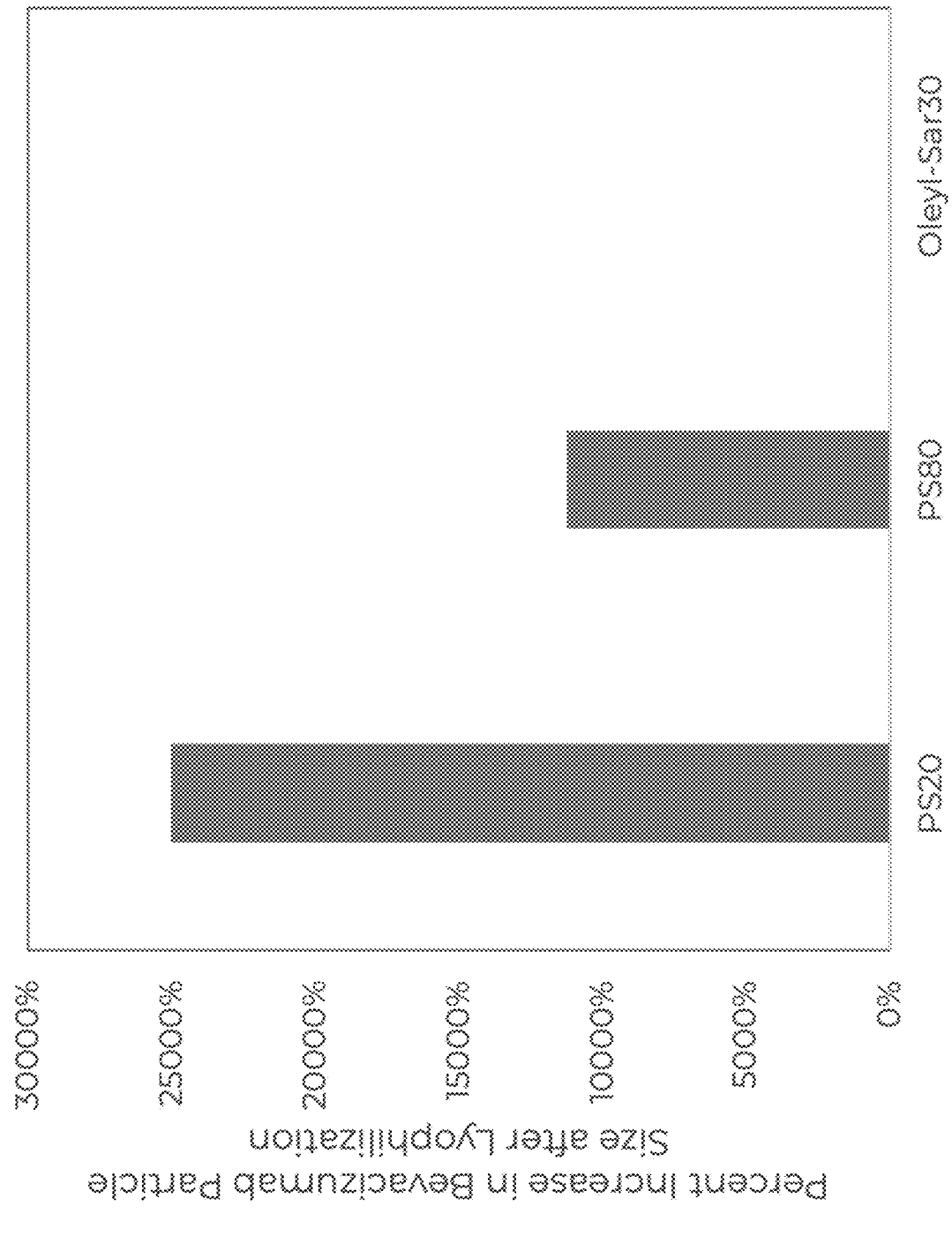
FIG. 17. Percentage increase in bevacizumab particle size post-lyophilization with select polymers.
Figure 18:
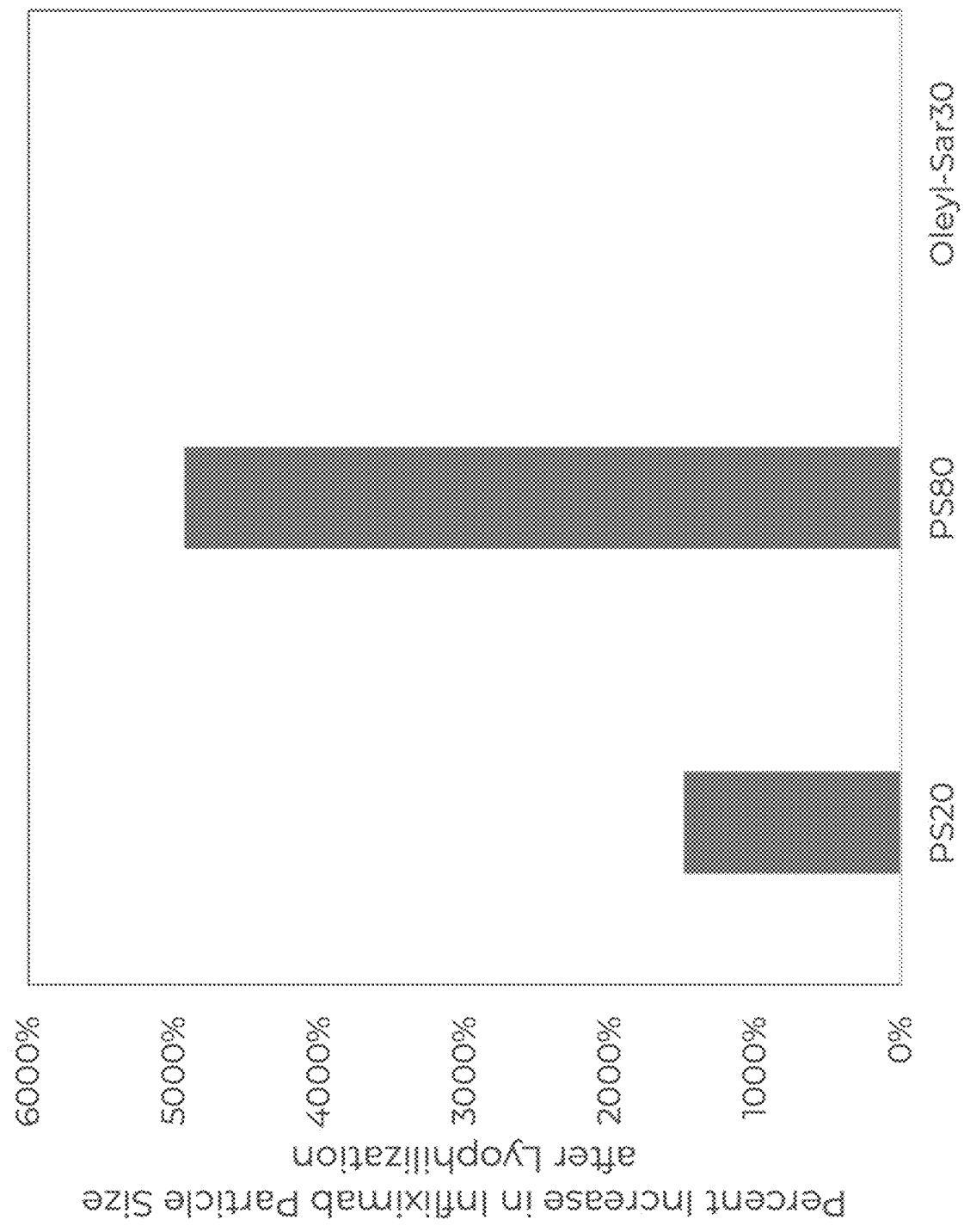
FIG. 18. Percentage increase in infliximab particle size post-lyophilization with select polymers.
Figure 19:
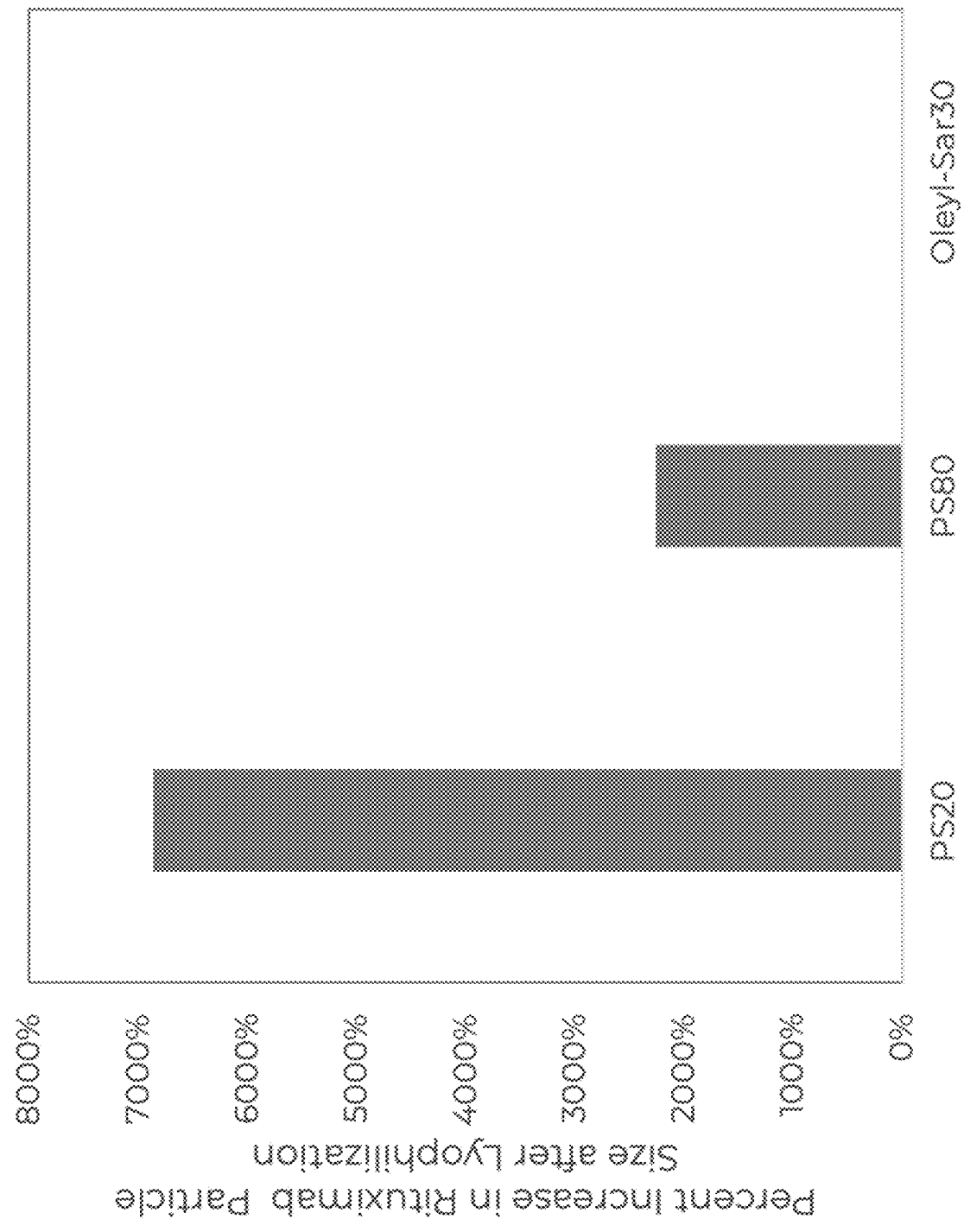
FIG. 19. Percentage increase in rituximab particle size post-lyophilization with select polymers.
Figure 20:
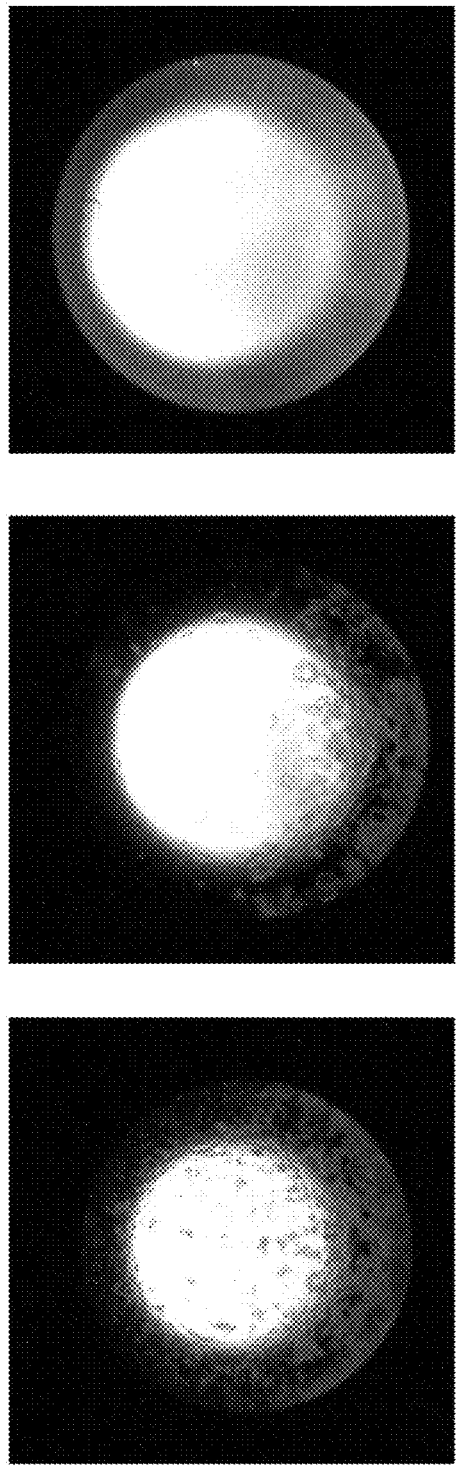
FIG. 20. Post-lyophilization images of cetuximab (0.5 mg/mL) with select polymers (each at 1 mg/mL).
Figure 21:
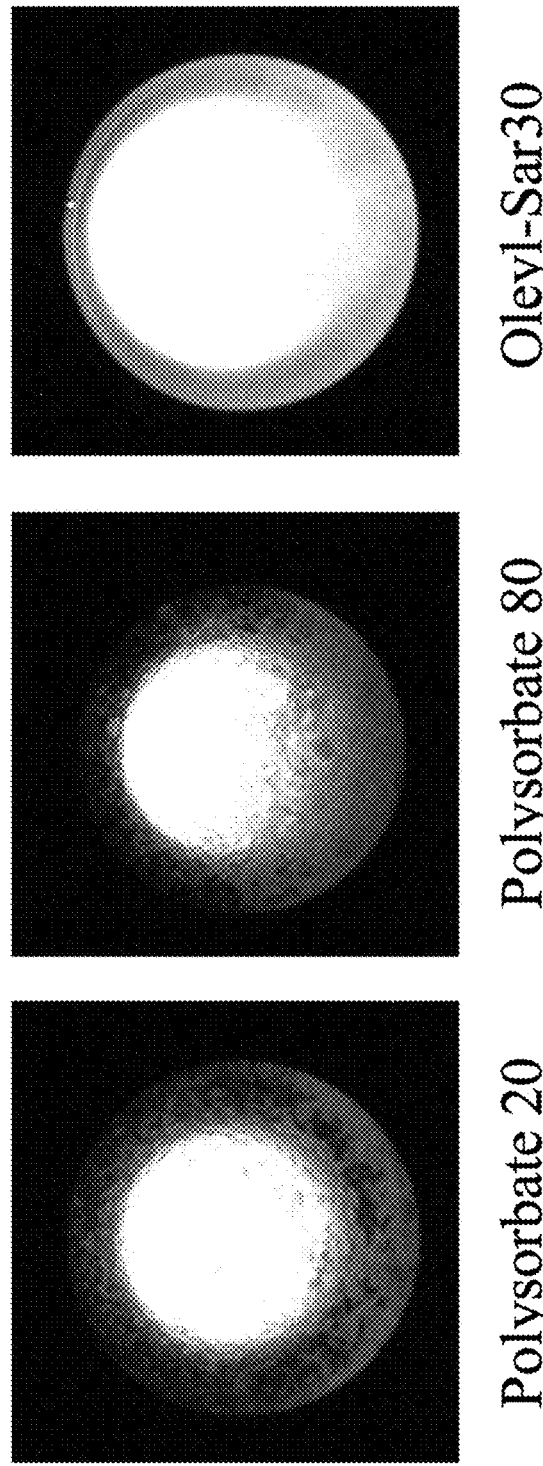
FIG. 21. Post-lyophilization images of bevacizumab (0.5 mg/mL) with select polymers (each at 1 mg/mL).
Figure 22:
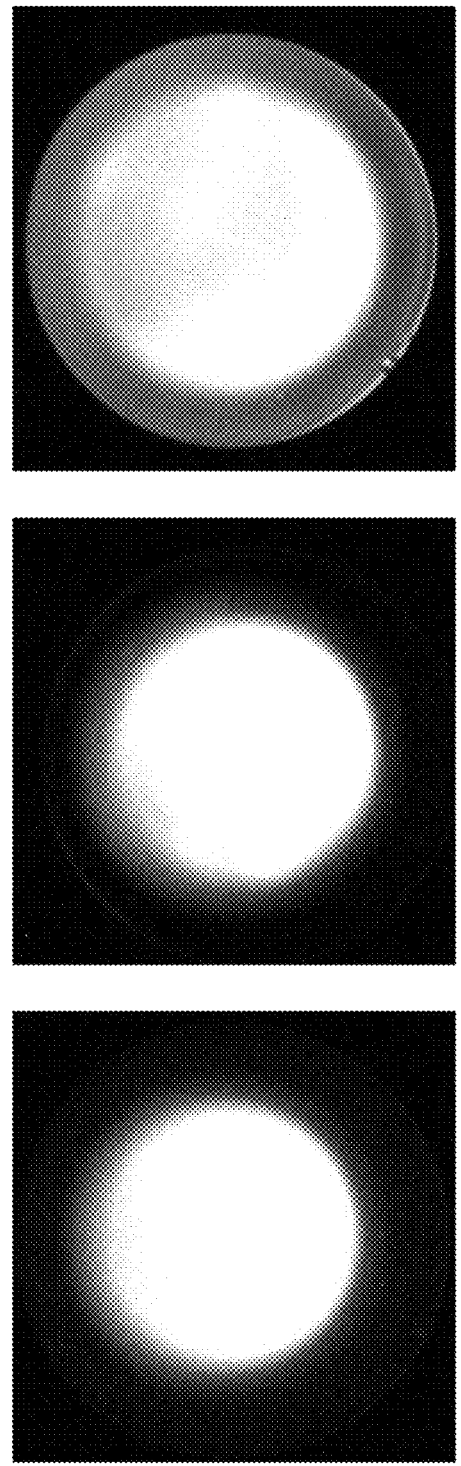
FIG. 22. Post-lyophilization images of infliximab (0.5 mg/mL) with select polymers (each at 1 mg/mL).
Figure 23:
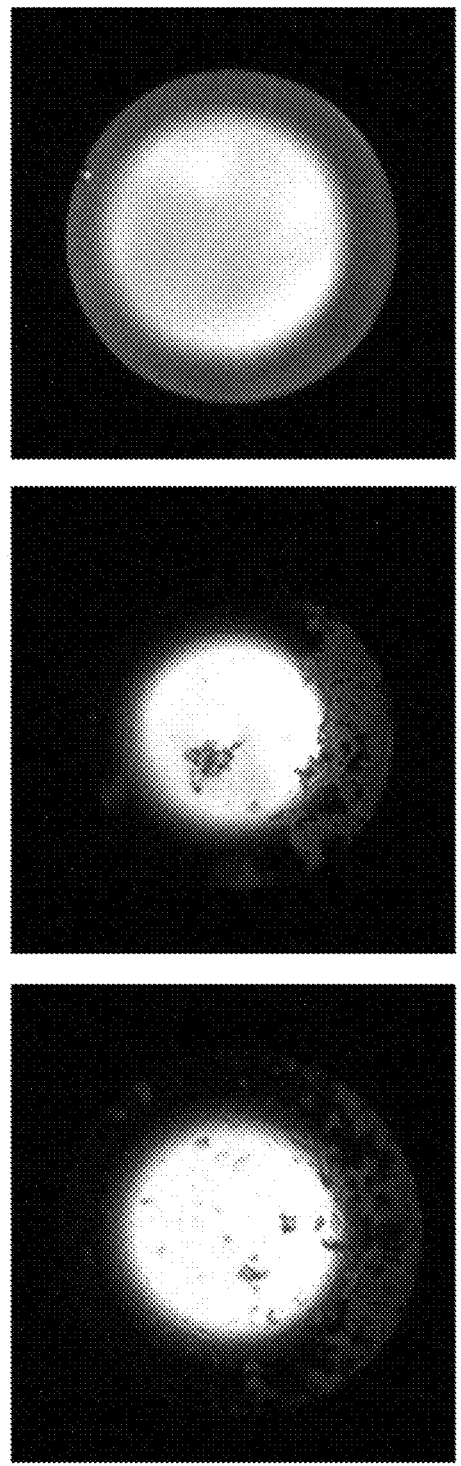
FIG. 23. Post-lyophilization images of rituximab (0.5 mg/mL) with select polymers (each at 1 mg/mL).

As described herein, the present disclosure features polymers comprising a hydrophilic poly(sarcosine) chain and a hydrophobic aliphatic group. Such polymers can be synthesized by initiating the polymerization of sarcosine N-carboxyanhydride with a hydrophobic aliphatic amine or by reacting a poly(sarcosine) polymer with a fatty acid halide, along with other methods.

Polymers of the present disclosure can behave as surfactants and thus lower the surface tension between two phases (e.g., liquid-gas, liquid-solid, etc.). Without wishing to be bound to any particular theory, it is believed that polymers of the present disclosure may outcompete proteins for absorption onto interfaces between two phases and thus decrease the likelihood for protein adsorption, which can lead to aggregation and denaturation. This property is of critical importance for pharmaceutical biologic proteins, which encounter such interfacial stresses during manufacturing, storage, and administration. In an embodiment, a protein formulation as a composition comprising said protein and a polymer of the present disclosure (e.g., a polymer of any of Formulas (I)-(V-b) or a salt thereof) exhibits improved stability and/or lower aggregation in solution compared with a protein formulation in the absence of a polymer of the present disclosure (e.g., a polymer of any of Formulas (I)-(V-b) or a salt thereof).

In some embodiments, polymers of the present disclosure contain a water-soluble hydrophilic poly(sarcosine) chain and a water-insoluble hydrophobic aliphatic portion, such as a hydrocarbon chain. The amide backbone of the poly (sarcosine) chain can adopt both cis and trans configurations, while the hydrophobic hydrocarbon chain can oscillate between coil configurations (e.g., collapsed and extended). Without wishing to be bound to any particular theory, it is believed that these two properties taken together provide polymers of the present disclosure with the ability to assume the lowest possible energy state at an interfacial surface, thus preventing adsorption by a protein.

As described herein, the present disclosure is further directed to compositions comprising a poly(sarcosine) polymer and a protein. Such compositions can decrease the aggregation and denaturation of a protein.

2. Definitions

The following are definitions of various terms used herein to describe the present disclosure and are further illustrated by the embodiments, sub-embodiments, and species disclosed herein. These definitions apply to the terms as they are used throughout this specification unless otherwise indicated in specific instances, either individually or as part of a larger group.

For purposes of this disclosure, the chemical elements are identified in accordance with the Periodic Table of the Elements, CRC Handbook of Chemistry and Physics, 100th Ed. Additionally, general principles of organic chemistry are described in: Sorrell, T. *Organic Chemistry*, 2nd Ed., Sausalito, University Science Books, 2005; and Smith, M. B. *March's Advanced Organic Chemistry: Reactions, Mechanisms, and Structure*, 7th Ed., New York, J. John Wiley & Sons, 2001, the entire contents of which are hereby incorporated by reference.

The term "about" when referring to a measurable value such as an amount, a temporal duration, and the like, refers to variations of ±20% or in some instances ±10%, or in some instances ±5%, or in some instances ±2%, or in some instances ±1%, or in some instances ±0.1% from the specified value, as such variations are appropriate to perform the present disclosures.

It is understood that the terms "CBP-1", "oleyl-NH-poly(Sar$_{15}$)", "oleylamine-Sar$_{15}$", "Oleyl-Sar15", "CH$_3$(CH$_2$)$_7$CH=CH(CH$_2$)$_7$CH$_2$NH-poly(sarcosine)$_{15}$", and a polymer having the following structure:

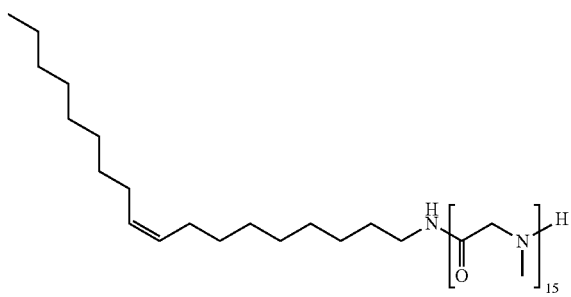

all represent the same compound and can be used interchangeably.

It is understood that the terms "CBP-2", "oleyl-NH-poly(Sar$_{30}$)", "oleylamine-Sar$_{30}$", "Oleyl-Sar30", "CH$_3$(CH$_2$)$_7$CH=CH(CH$_2$)$_7$CH$_2$NH-poly(sarcosine)$_{30}$", and a polymer having the following structure:

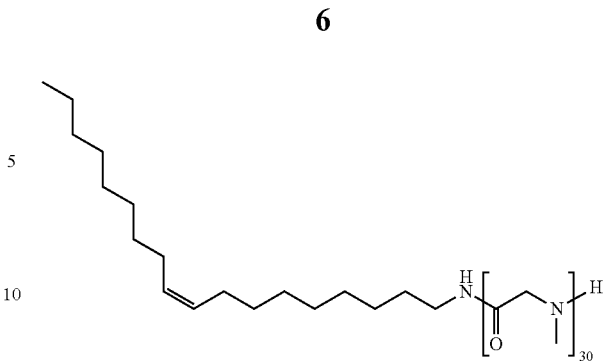

all represent the same compound and can be used interchangeably.

It is understood that the terms "CBP-3", "dodecyl-NH-poly(Sar$_{20}$)", "dodecylamine-Sar$_{20}$", "Dodecyl-Sar20", "CH$_3$(CH$_2$)$_{10}$CH$_2$NH-poly(sarcosine)$_{20}$", and a polymer having the following structure:

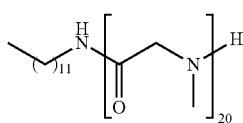

all represent the same compound and can be used interchangeably.

It is understood that the terms "CBP-4", "tetradecyl-NH-poly(Sar$_{15}$)", "tetradecylamine-Sar$_{15}$", "Tetradecyl-Sar15", "CH$_3$(CH$_2$)$_{12}$CH$_2$NH-poly(sarcosine)$_{15}$", and a polymer having the following structure:

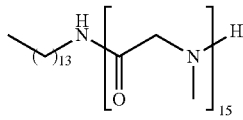

all represent the same compound and can be used interchangeably.

It is understood that the terms "CBP-5", "tetradecyl-NH-poly(Sar$_{20}$)", "tetradecylamine-Sar$_{20}$", "tetradecyl-Sar20", "CH$_3$(CH$_2$)$_{12}$CH$_2$NH-poly(sarcosine)$_{20}$", and a polymer having the following structure:

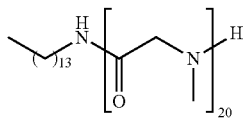

all represent the same compound and can be used interchangeably.

It is understood that the terms "CBP-6", "hexadecyl-NH-poly(Sar$_{30}$)", "hexadecylamine-Sar$_{30}$", "Hexadecyl-Sar30", "CH$_3$(CH$_2$)$_{14}$CH$_2$NH-poly(sarcosine)$_{30}$", and a polymer having the following structure:

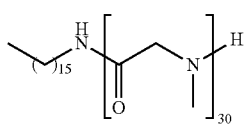

all represent the same compound and can be used interchangeably.

It is understood that the terms "CBP-7", "octadecyl-NH-poly(Sar$_{30}$)", "octadecylamine-Sar$_{30}$", Octadecyl-Sar30", "CH$_3$(CH$_2$)$_{16}$CH$_2$NH-poly(sarcosine)$_{30}$", and a polymer having the following structure:

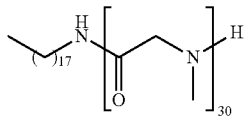

all represent the same compound and can be used interchangeably.

It is understood that the terms "CBP-8", "didecyl-N-poly(Sar$_{30}$)", "didecylamine-Sar$_{30}$", "Didecyl-Sar30", "(CH$_3$(CH$_2$)$_8$CH$_2$)$_2$—N-poly(sarcosine)$_{30}$", and a polymer having the following structure:

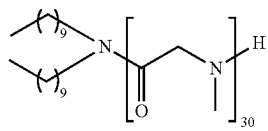

all represent the same compound and can be used interchangeably.

It is understood that the terms "CBP-9", "didodecyl-N-poly(Sar$_{30}$), "didodecylamine-Sar$_{30}$", "Didodecyl-Sar30", "(CH$_3$(CH$_2$)$_{10}$CH$_2$)$_2$—N-poly(sarcosine)$_{30}$", and a polymer having the following structure:

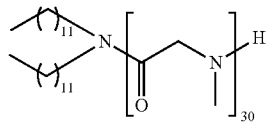

all represent the same compound and can be used interchangeably.

It is understood that the terms "CBP-10", "oleyl-NH-poly(Sar$_{10}$)", "oleylamine-Sar$_{10}$", "Oleyl-Sar10", "CH$_3$(CH$_2$)$_7$CH=CH(CH$_2$)$_7$CH$_2$NH-poly(sarcosine)$_{10}$", and a polymer having the following structure:

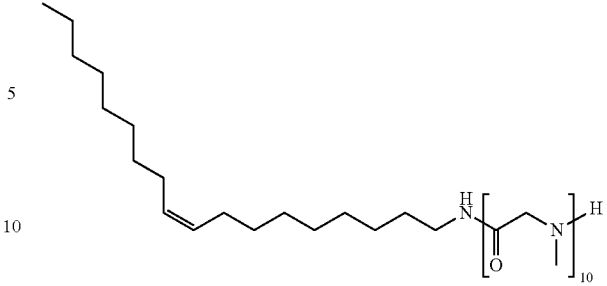

all represent the same compound and can be used interchangeably.

It is understood that the terms "CBP-11", "tetradecyl-NH-poly(Sar$_{23}$)", "tetradecylamine-Sar$_{23}$", "tetradecyl-Sar23", "CH$_3$(CH$_2$)$_{12}$CH$_2$NH-poly(sarcosine)$_{23}$", and a polymer having the following structure:

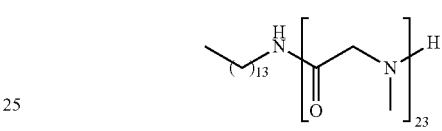

all represent the same compound and can be used interchangeably.

As used herein, the monomer repeat unit described above is a numerical value representing the average number of monomer units comprising the polymer chain. For example, a polymer represented by $(A)_{10}$ corresponds to a polymer consisting of ten "A" monomer units linked together. One of ordinary skill in the art will recognize that the number 10 in this case will represent a distribution of numbers with an average of 10. The breadth of this distribution is represented by the polydispersity index (PDI). A PDI of 1.0 represents a polymer wherein each chain length is exactly the same (e.g., a protein). A PDI of 2.0 represents a polymer wherein the chain lengths have a Gaussian distribution. Polymers of the present disclosure typically possess a PDI of less than 1.10. In some embodiments, a polymer of the present disclosure has a PDI of about 1.01, about 1.02, about 1.03, about 1.04, about 1.05, about 1.06, about 1.07, about 1.08, about 1.09, about 1.10, about 1.11, about 1.12, about 1.13, about 1.14, about 1.15, about 1.16, about 1.17, about 1.18, about 1.19, or about 1.2.

As used herein, the phrase "living polymer chain-end" refers to the terminus resulting from a polymerization reaction which maintains the ability to react further with additional monomer or with a polymerization terminator.

As used herein, the term "termination" refers to attaching a terminal group to a polymer chain-end by the reaction of a living polymer with an appropriate compound. Alternatively, the term "termination" may refer to attaching a terminal group to an amine or hydroxyl end, or derivative thereof, of the polymer chain.

As used herein, the terms "polymerization terminator", "terminator", and "terminating agent" are used interchangeably and refer to a compound that reacts with a living polymer chain-end to afford a polymer with a terminal group or alternatively may refer to a compound that reacts with an amine or hydroxyl end, or derivative thereof, of the polymer chain, to afford a polymer with a terminal group. Exemplary polymerization terminators include anhydrides, sulfonyl halides, and acid halides including, but not limited to, fatty acid halides linoleoyl chloride, lauroyl chloride, myristoyl chloride, palmitoyl chloride, steroyl chloride, and oleyl chloride. Further exemplary terminating agents include the acid chloride derivatives of elaidic acid and ricinoelic acid.

The term "leaving group" or "LG" refers to a molecule or atom that leaves with a pair of electrons during heterolytic bond cleavage. Exemplary leaving groups include halides and carboxylates.

As used herein, the term "polymerization initiator" or "initiator" refers to a compound, which reacts with, or whose anion or free base form reacts with, the desired monomer in a manner which results in polymerization of that monomer. Exemplary polymerization initiators include primary amines, secondary amines, and their corresponding salts including, but not limited to, neopentylamine, benzylamine, 4-methoxybenzylamine, N-butylamine, hexylamine, heptylamine, octylamine, decylamine, dodecylamine, tetradecylamine, hexadecylamine, octadecylamine, oleylamine, nonadecylamine, eicosylamine, dihexylamine, dioctylamine, didecylamine, didodecylamine, dioctadecylamine, and dioleylamine.

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-30 carbon atoms. In some embodiments, aliphatic groups contain 1-20 carbon atoms. In some embodiments, aliphatic groups contain 8-20 carbon atoms. In other embodiments, aliphatic groups contain 12-20 carbon atoms. In still other embodiments, aliphatic groups contain 14-20 carbon atoms, and in yet other embodiments aliphatic groups contain 16-20 carbon atoms. The number of carbon atoms present in the aliphatic groups can also be defined prior to recitation of said aliphatic group. For example, the term (C8-C20)aliphatic refers to an aliphatic group as defined herein comprising from 8 to 20 carbon atoms. It is specifically intended that the disclosure includes each and every individual sub-combination of the members of such range. In particular, the term (C1-C6) aliphatic is intended to include C1 aliphatic (e.g., methyl), C2 aliphatic (e.g., ethyl, ethylene or ethylene), C3 aliphatic, C4 aliphatic, C5 aliphatic and C6 aliphatic. Aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl. Exemplary aliphatic groups include, but are not limited to, C24 aliphatic (e.g., didodecyl), C20 aliphatic (e.g., dodecyl), C18 aliphatic (e.g., oleyl, octadecyl), C16 aliphatic (e.g., hexadecyl, dioctyl), C14 aliphatic (e.g., tetradecyl), C12 aliphatic (e.g., dodecyl, dihexyl), and C10 aliphatic (e.g., decyl).

The term "hydrophobic aliphatic group" or "hydrophobic aliphatic" as used herein, denotes a moiety which comprises 6 or more carbon atoms which has an overall hydrophobic characteristic. A hydrophobic aliphatic group may be characterized by traits including, but not limited to, a static water contact angle $\theta > 90°$). The number of carbon atoms present in the hydrophobic aliphatic groups can also be defined prior to recitation of said hydrophobic aliphatic group. For example, the term "(C6-C20)hydrophobic aliphatic group" refers to an aliphatic group as defined herein comprising from 6 to 20 carbon atoms. Exemplary hydrophobic aliphatic groups include, but are not limited to, oleyl (i.e., $CH_3(CH_2)_7CH=CH(CH_2)_7CH_2-$), tetradecyl (i.e., $CH_3(CH_2)_{12}CH_2-$), hexadecyl (i.e., $CH_3(CH_2)_{14}CH_2-$), octa- decyl (i.e., $CH_3(CH_2)_{16}CH_2-$), dodecyl (i.e., $(CH_3(CH_2)_8CH_2)_2-$), and didodecyl (i.e., $(CH_3(CH_2)_{10}CH_2)_2-$).

The term "heteroatom" means one or more of oxygen, sulfur, nitrogen, phosphorus, or silicon. This includes any oxidized form of nitrogen, sulfur, phosphorus, or silicon; the quaternized form of any basic nitrogen, or; a substitutable nitrogen of a heterocyclic ring including =N— as in 3,4-dihydro-2H-pyrrolyl, —NH— as in pyrrolidinyl, or =N(R⁺)— as in N-substituted pyrrolidinyl.

The term "aryl" used alone or as part of a larger moiety as in "aralkyl", "aralkoxy", or "aryloxyalkyl", refers to monocyclic, bicyclic, and tricyclic ring systems having a total of five to fourteen ring members, wherein at least one ring in the system is aromatic and wherein each ring in the system contains three to seven ring members. The term "aryl" may be used interchangeably with the term "aryl ring".

As described herein, compounds of the disclosure may contain "optionally substituted" moieties. In general, the term "substituted", whether preceded by the term "optionally" or not, means that one or more hydrogens of the designated moiety are replaced with a suitable substituent. In some embodiments, an "optionally substituted" group may have a suitable substituent at each substitutable position of the group, and when more than one position in any given structure may be substituted with more than one substituent selected from a specified group, the substituent may be either the same or different at every position. In some embodiments, an "optionally substituted" group refers to a group having 0-5 substituents independently selected from a specified group. In some embodiments, an "optionally substituted" group refers to a group having 0-3 substituents independently selected from a specified group. In some embodiments, an "optionally substituted" group refers to a group having 0-1 substituents independently selected from a specified group. Combinations of substituents envisioned by this disclosure are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Monovalent substituents on a substitutable carbon atom of an "optionally substituted" group are independently halogen; —(CH$_2$)$_{0-4}$R°; —(CH$_2$)$_{0-4}$OR°; —O—(CH$_2$)$_{0-4}$C(O) OR°; —(CH$_2$)$_{0-4}$CH(OR°)$_2$; —(CH$_2$)$_{0-4}$SR°; —(CH$_2$)$_{0-4}$Ph, which may be substituted with R°; —(CH$_2$)$_{0-4}$O(CH$_2$)$_{0-1}$Ph which may be substituted with R°; —CH=CHPh, which may be substituted with R°; —NO$_2$; —CN; —N$_3$; —(CH$_2$)$_{0-4}$N(R°)$_2$; —(CH$_2$)$_{0-4}$N(R°)C(O)R°; —N(R°)C(S) R°; —(CH$_2$)$_{0-4}$N(R°)C(O)NR°$_2$; —N(R°)C(S)NR°$_2$; —(CH$_2$)$_{0-4}$N(R°)C(O)OR°; —N(R°)N(R°)C(O)R°; —N(R°)N(R°)C(O)NR°$_2$; —N(R°)N(R°)C(O)OR°; —(CH$_2$)$_{0-4}$C(O)R°; —C(S)R°; —(CH$_2$)$_{0-4}$C(O)OR°; —(CH$_2$)$_{0-4}$C(O)SR°; —(CH$_2$)$_{0-4}$C(O)OSiR°$_3$; —(CH$_2$)$_{0-4}$ OC(O)R°; —OC(O)(CH$_2$)$_{0-4}$SR—, SC(S)SR°; —(CH$_2$)$_{0-4}$SC(O)R°; —(CH$_2$)$_{0-4}$C(O)NR°$_2$; —C(S)NR°$_2$; —C(S)SR°; —SC(S)SR°, —(CH$_2$)$_{0-4}$OC(O)NR°$_2$; —C(O) N(OR°)R°; —C(O)C(O)R°; —C(O)CH$_2$C(O)R°; —C(NOR°)R°; —(CH$_2$)$_{0-4}$SSR°; —(CH$_2$)$_{0-4}$S(O)$_2$R°; —(CH$_2$)$_{0-4}$S(O)$_2$OR°; —(CH$_2$)$_{0-4}$OS(O)$_2$R°; —S(O)$_2$ NR°$_2$; —(CH$_2$)$_{0-4}$S(O)R°; —N(R°)S(O)$_2$NR°$_2$; —N(R°)S (O)$_2$R°; —N(OR°)R°; —C(NH)NR°$_2$; —P(O)$_2$R°; —P(O) R°$_2$; —OP(O)R°$_2$; —OP(O)(OR°)$_2$; SiR°$_3$; —(C$_{1-20}$ straight or branched alkylene)O—N(R°)$_2$; or —(C$_{1-20}$ straight or branched alkylene)C(O)O—N(R°)$_2$, wherein each R° may be substituted as defined below and is independently hydrogen, $C_{1-20}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Monovalent substituents on R° (or the ring formed by taking two independent occurrences of R° together with their intervening atoms), are independently halogen, —$(CH_2)_{0-2}R^•$, -(haloR$^•$), —$(CH_2)_{0-2}OH$, —$(CH_2)_{0-2}OR^•$, —$(CH_2)_{0-2}CH(OR^•)_2$; —O(haloR$^•$), —CN, —$N_3$, —$(CH_2)_{0-2}C(O)R^•$, —$(CH_2)_{0-2}C(O)OH$, —$(CH_2)_{0-2}C(O)OR^•$, —$(CH_2)_{0-2}SR^•$, —$(CH_2)_{0-2}SH$, —$(CH_2)_{0-2}NH_2$, —$(CH_2)_{0-2}NHR^•$, —$(CH_2)_{0-2}NR^•_2$, —$NO_2$, —$SiR^•_3$, —$OSiR^•3$, —$C(O)SR^•$, —($C_{1-4}$ straight or branched alkylene)$C(O)OR^•$, or —$SSR^•$ wherein each R$^•$ is unsubstituted or where preceded by "halo" is substituted only with one or more halogens, and is independently selected from $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur. Such divalent substituents on a saturated carbon atom of R° include =O and =S.

Divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, $C_{1-20}$ aliphatic which may be substituted as defined below, or an unsubstituted 5-6-membered saturated, partially unsaturated, or aryl ring having 0-4 heteroatoms independently selected from nitrogen, oxygen, or sulfur. Divalent substituents that are bound to vicinal substitutable carbons of an "optionally substituted" group include: —O(CR*$_2$)$_{2-3}$O—, wherein each independent occurrence of R* is selected from hydrogen, $C_{1-20}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^•$, -(haloR$^•$), —OH, —OR$^•$, —O(haloR$^•$), —CN, —C(O)OH, —C(O)OR$^•$, —$NH_2$, —NHR$^•$, —NR$^•_2$, or —$NO_2$, wherein each R$^•$ is unsubstituted or where preceded by "halo" is substituted only with one or more halogens, and is independently $C_{1-20}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include R$^†$, —NR$^†_2$, —C(O)R$^†$, —C(O)OR$^†$, —C(O)C(O)R$^†$, —C(O)$CH_2$C(O)R$^†$, —S(O)$_2$R, —S(O)$_2$NR$^†_2$, —C(S)NR$^†_2$, —C(NH)NR$^†_2$, or —N(R$^†$)S(O)$_2$R$^†$; wherein each R is independently hydrogen, $C_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^†$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^†$ are independently halogen, —R$^•$, -(haloR$^•$), —OH, —OR$^•$, —O(haloR$^•$), —CN, —C(O)OH, —C(O)OR$^•$, —$NH_2$, —NHR$^•$, —NR$^•_2$, or —$NO_2$, wherein each R$^+$ is unsubstituted or where preceded by "halo" is substituted only with one or more halogens, and is independently $C_{1-20}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur.

In some embodiments, an "optionally substituted aliphatic" group refers to an aliphatic group as defined above, that is substituted with 0-40 substituents selected from the group consisting of halogen, hydroxy, cyano, nitro, oxo, phenyl, azido, or alkyne wherein said phenyl is substituted with 0-40 substituents selected from halogen, —$CH_3$, —$CF_2H$, —$CF_2$, —$OCH_3$ or —OH. For example, an "optionally substituted aliphatic" group may refer to a methyl group that is substituted with a $CH_2C_6H_5$ group, i.e., a benzyl group.

Protected hydroxyl groups are well known in the art and include those described in detail in Wuts, P. G. M. *Protecting Groups in Organic Synthesis,* 5$^{th}$ Ed., New York, John Wiley & Sons, 2014, the entirety of which is incorporated herein by reference. Examples of suitably protected hydroxyl groups further include, but are not limited to, esters, carbonates, sulfonates allyl ethers, ethers, silyl ethers, alkyl ethers, arylalkyl ethers, and alkoxyalkyl ethers. Examples of suitable esters include formates, acetates, proprionates, pentanoates, crotonates, and benzoates. Specific examples of suitable esters include formate, benzoyl formate, chloroacetate, trifluoroacetate, methoxyacetate, triphenylmethoxyacetate, p-chlorophenoxyacetate, 3-phenylpropionate, 4-oxopentanoate, 4,4-(ethylenedithio)pentanoate, pivaloate (trimethylacetate), crotonate, 4-methoxy-crotonate, benzoate, p-benylbenzoate, 2,4,6-trimethylbenzoate. Examples of carbonates include 9-fluorenylmethyl, ethyl, 2,2,2-trichloroethyl, 2-(trimethylsilyl)ethyl, 2-(phenylsulfonyl)ethyl, vinyl, allyl, and p-nitrobenzyl carbonate. Examples of silyl ethers include trimethylsilyl, triethylsilyl, t-butyldimethylsilyl, t-butyldiphenylsilyl, triisopropylsilyl ether, and other trialkylsilyl ethers. Examples of alkyl ethers include methyl, benzyl, p-methoxybenzyl, 3,4-dimethoxybenzyl, trityl, t-butyl, and allyl ether, or derivatives thereof. Alkoxyalkyl ethers include acetals such as methoxymethyl, methylthiomethyl, (2-methoxyethoxy)methyl, benzyloxymethyl, beta-(trimethylsilyl)ethoxymethyl, and tetrahydropyran-2-yl ether. Examples of arylalkyl ethers include benzyl, p-methoxybenzyl (MPM), 3,4-dimethoxybenzyl, O-nitrobenzyl, p-nitrobenzyl, p-halobenzyl, 2,6-dichlorobenzyl, p-cyanobenzyl, 2- and 4-picolyl ethers.

Protected amines are well known in the art and include those described in detail in Wuts, P. G. M. Greene's *Protective Groups in Organic Synthesis,* 5$^{th}$ Ed., New Jersey, J. John Wiley & Sons, 2014. Mono-protected amines further include, but are not limited to, aralkylamines, carbamates, allyl amines, amides, and the like. Examples of mono-protected amino moieties include t-butyloxycarbonylamino (—NHBOC), ethyloxycarbonylamino, methyloxycarbonylamino, trichloroethyloxycarbonylamino, allyloxycarbonylamino (—NHAlloc), benzyloxocarbonylamino (—NHCBZ), allylamino, benzylamino (—NHBn), fluorenylmethylcarbonyl (—NHFmoc), formamido, acetamido, chloroacetamido, dichloroacetamido, trichloroacetamido, phenylacetamido, trifluoroacetamido, benzamido, t-butyldiphenylsilyl, and the like. Di-protected amines include amines that are substituted with two substituents independently selected from those described above as mono-protected amines, and further include cyclic imides, such as phthalimide, maleimide, succinimide, and the like. Di-protected amines also include pyrroles and the like, 2,2,5,5-tetramethyl-[1,2,5]azadisilolidine and the like, and azide.

Protected aldehydes are well known in the art and include those described in detail in Wuts (2014). Protected aldehydes further include, but are not limited to, acyclic acetals, cyclic acetals, hydrazones, imines, and the like. Examples of such groups include dimethyl acetal, diethyl acetal, diisopropyl acetal, dibenzyl acetal, bis(2-nitrobenzyl) acetal, 1,3-dioxanes, 1,3-dioxolanes, semicarbazones, and derivatives thereof.

Protected carboxylic acids are well known in the art and include those described in detail in Wuts (2014). Protected carboxylic acids further include, but are not limited to, optionally substituted $C_{1-20}$ aliphatic esters, optionally substituted aryl esters, silyl esters, activated esters, amides, hydrazides, and the like. Examples of such ester groups include methyl, ethyl, propyl, isopropyl, butyl, isobutyl, benzyl, and phenyl ester, wherein each group is optionally substituted. Additional protected carboxylic acids include oxazolines and ortho esters.

Protected thiols are well known in the art and include those described in detail in Wuts (2014). Protected thiols further include, but are not limited to, disulfides, thioethers, silyl thioethers, thioesters, thiocarbonates, and thiocarbamates, and the like. Examples of such groups include, but are not limited to, alkyl thioethers, benzyl and substituted benzyl thioethers, triphenylmethyl thioethers, and trichloroethoxycarbonyl thioester, to name but a few.

Unless otherwise stated, structures depicted herein are also meant to include all isomeric (e.g., enantiomeric, diastereomeric, and geometric (or conformational)) forms of the structure; for example, the R and S configurations for each asymmetric center, Z and E double bond isomers, and Z and E conformational isomers. Therefore, single stereochemical isomers as well as enantiomeric, diastereomeric, and geometric (or conformational) mixtures of the present compounds are within the scope of the disclosure. Unless otherwise stated, all tautomeric forms of the compounds of the disclosure are within the scope of the disclosure. Additionally, unless otherwise stated, structures depicted herein are also meant to include compounds that differ only in the presence of one or more isotopically enriched atoms. For example, compounds having the present structures except for the replacement of hydrogen by deuterium or tritium, or the replacement of a carbon by a $^{13}$C- or $^{14}$C-enriched carbon are within the scope of this disclosure. Such compounds are useful, for example, as in neutron scattering experiments, as analytical tools or probes in biological assays.

As used herein, the term "detectable moiety" is used interchangeably with the term "label" and relates to any moiety capable of being detected (e.g., primary labels and secondary labels). A "detectable moiety" or "label" is the radical of a detectable compound.

"Primary" labels include radioisotope-containing moieties (e.g., moieties that contain $^{32}$P, $^{33}$P, $^{35}$S, or $^{14}$C), mass-tags, and fluorescent labels, and are signal-generating reporter groups which can be detected without further modifications.

"Secondary" labels include moieties such as biotin, or protein antigens, that require the presence of a second compound to produce a detectable signal. For example, in the case of a biotin label, the second compound may include streptavidin-enzyme conjugates. In the case of an antigen label, the second compound may include an antibody-enzyme conjugate. Additionally, certain fluorescent groups can act as secondary labels by transferring energy to another compound or group in a process of nonradiative fluorescent resonance energy transfer (FRET), causing the second compound or group to then generate the signal that is detected.

The terms "fluorescent label", "fluorescent group", "fluorescent compound", "fluorescent dye", and "fluorophore", as used herein, refer to compounds or moieties that absorb light energy at a defined excitation wavelength and emit light energy at a different wavelength. Examples of fluorescent compounds include, but are not limited to: Alexa Fluor dyes (Alexa Fluor 350, Alexa Fluor 488, Alexa Fluor 532, Alexa Fluor 546, Alexa Fluor 568, Alexa Fluor 594, Alexa Fluor 633, Alexa Fluor 660 and Alexa Fluor 680), AMCA, AMCA-S, BODIPY dyes (BODIPY FL, BODIPY R6G, BODIPY TMR, BODIPY TR, BODIPY 530/550, BODIPY 558/568, BODIPY 564/570, BODIPY 576/589, BODIPY 581/591, BODIPY 630/650, BODIPY 650/665), Carboxyrhodamine 6G, carboxy-X-rhodamine (ROX), Cascade Blue, Cascade Yellow, Coumarin 343, Cyanine dyes (Cy3, Cy5, Cy3.5, Cy5.5), Dansyl, Dapoxyl, Dialkylaminocoumarin, 4',5'-Dichloro-2',7'-dimethoxy-fluorescein, DM-NERF, Eosin, Erythrosin, Fluorescein, FAM, Hydroxycoumarin, IRDyes (IRD40, IRD 700, IRD 800), JOE, Lissamine rhodamine B, Marina Blue, Methoxycoumarin, Naphthofluorescein, Oregon Green 488, Oregon Green 500, Oregon Green 514, Pacific Blue, PyMPO, Pyrene, Rhodamine B, Rhodamine 6G, Rhodamine Green, Rhodamine Red, Rhodol Green, 2',4',5',7'-Tetra-bromosulfone-fluorescein, Tetramethyl-rhodamine (TMR), Carboxytetramethyl-rhodamine (TAMRA), Texas Red, Texas Red-X.

The term "substrate", as used herein refers to any material or macromolecular complex to which a polymer can be attached. Examples of commonly used substrates include, but are not limited to, glass surfaces, silica surfaces, plastic surfaces, metal surfaces, surfaces containing a metallic or chemical coating, membranes (e.g., nylon, polysulfone, silica), micro-beads (e.g., latex, polystyrene, or other polymer), porous polymer matrices (e.g., polyacrylamide gel, polysaccharide, polymethacrylate), macromolecular complexes (e.g., protein, polysaccharide).

Unless otherwise indicated, radioisotope-containing moieties are optionally substituted hydrocarbon groups that contain at least one radioisotope. Unless otherwise indicated, radioisotope-containing moieties contain from 1-40 carbon atoms and one radioisotope. In certain embodiments, radioisotope-containing moieties contain from 10-20 carbon atoms and one radioisotope.

The term "isotopic enrichment" or "isotopically enriched" refers to the relative abundance of an isotope being altered, thus producing a form of the element that has been enriched in one particular isotope and depleted in its other isotopic forms. For example, a $C^{14}$ compound is said to have been isotopically enriched.

The term "as received" when referring to the use of a solvent, reagent, resin, or other component used in a chemical reaction or isolation refers to their use in the state provided by the manufacturer without any additional isolation, and/or purification.

As used herein, the terms "protein" or "polypeptide" refer to a polymer of one or more amino acids which are connected via peptide bonds. A protein generally contains greater than 20 such amino acids. The terms include a single polypeptide chain or multiple polypeptide chains complexed together or covalently bound together (e.g., via disulfide bonds).

As used herein, the terms "drug", "therapeutic agent", "pharmaceutical", "medicine" and derivatives thereof, are used interchangeably and refer to a substance intended for use in the diagnosis, cure, mitigation, treatment, or prevention of disease.

As used herein, the terms "protein biologic", "protein drug", "protein therapeutic" and derivatives thereof, are used interchangeably and refer to one or more poly(amino acid) chains (e.g., one or more proteins) which are intended for use in the diagnosis, cure, mitigation, treatment, or prevention of disease. Exemplary protein biologics include monoclonal antibodies, polyclonal antibodies, immunoglobins, fusion proteins, anticoagulants, blood factors, bone morphogenetic proteins, engineered protein scaffolds, enzymes, growth factors, hormones, interferons, interleukins, thrombolytics, insulins, glycosylated proteins, antigens, antigen subunits, and combinations thereof.

As used herein the term "pH adjuster" refers to any pharmaceutically acceptable composition, compound, or agent, suitable for adjusting the pH of the presently described compositions without negatively affecting any property thereof. Suitable pH adjusters can comprise any pharmaceutically acceptable acid or base. Suitable pH adjusters can comprise hydrochloric acid, sulfuric acid, citric acid, acetic acid, formic acid, phosphoric acid, tartaric acid, trolamine, sodium hydroxide and potassium hydroxide.

As used herein the term "preservative" refers to any known pharmaceutically acceptable preservative that functions by inhibiting bacteria, fungi, yeast, mold, other microbe, and/or by inhibiting oxidation. Suitable preservatives include but are not limited to antimicrobial agents and/or antioxidants. In some embodiments, a suitable preservative is a preservative known in the art for stabilizing a particular vaccine. In some embodiments, a suitable preservative is a preservative known in the art for stabilizing a particular protein biologic composition. Suitable antimicrobial agents can include but are not limited to benzoates, benzyl alcohol, sodium benzoate, sorbates, propionates, and nitrites. Suitable antioxidants can include but are not limited to vitamin C, butylated hydroxytoluene (BHT), sulphites, and vitamin E.

As used herein, "unit dosage form" or "unit dose form" refers to a physically discrete unit of a formulation appropriate for the subject to be treated. It will be understood, however, that the total daily usage of the compositions of the present disclosure will be decided by the attending physician within the scope of sound medical judgement. The specific effective dose level for any particular subject or organism will depend on a variety of factors including the disorder being treated and the severity of the disorder; activity of specific active agent employed; specific composition employed; age, body weight, general health, sex and diet of the subject; time of administration, and rate of excretion of the specific active agent employed; duration of treatment, drugs/and or additional therapies used in combination or coincidental with specific compound(s) employed and like factors well known in the medical arts.

As used herein, a "drug product" means a therapeutic agent, and one or more "excipients" selected from, but not limited to, tonicity agents, cryoprotectants, stabilizing agents, antiadherents, binders, coatings, colors, disintegrants, flavors, glidants, lubricants, preservatives, sorbents, sweeteners, vehicles, surfactants, and poly(sarcosine) polymers. As appreciated by those skilled in the art, the amounts of each excipient will depend on the therapeutic agent, the route of administration, the desired biological endpoint, the target cell or tissue.

As used herein, a "cryoprotectant" or "cryoprotective agent" refers to compounds which either prevent freezing or prevent damage, or alteration to other compounds related to freezing. This includes, but is not limited to sugars, monosaccharides, disaccharides, polyalcohols, amino acids, polyvinyl pyrrolidine, polyethylene glycol, mannitol, sorbitol, sucrose, glucose, raffinose, sucralose, lactose, trehalose, dextran, and dextrose.

As used herein, a "surfactant" is a compound capable of lowering the surface tension between two phases (e.g., air-liquid interface) including, but not limited to, amphiphilic compounds. In certain embodiments, the surfactant is an amphiphilic polymer comprising a hydrophilic poly(sarcosine) chain and a hydrophobic aliphatic chain.

As used herein, a "therapeutically effective amount" means an amount of a substance (e.g., a therapeutic agent, composition, and/or formulation) that elicits a desired biological response. In some embodiments, a therapeutically effective amount of a substance is an amount that is sufficient, when administered as part of a dosing regimen to a subject suffering from or susceptible to a disease, disorder, and/or condition, to treat, diagnose, slow the progression of and/or delay the onset of the disease, disorder, and/or condition. As will be appreciated by those of ordinary skill in this art, the effective amount of a substance may vary depending on such factors as the desired biological endpoint, the substance to be delivered, the target cell or tissue, etc. For example, the effective amount of compound in a formulation to treat a disease, disorder, and/or condition is the amount that alleviates, ameliorates, relieves, inhibits, slows the progression of delays onset of, reduces severity of and/or reduces incidence of one or more symptoms or features of the disease, disorder, and/or condition. In some embodiments, a "therapeutically effective amount" is at least a minimal amount of a compound, or composition containing a compound, which is sufficient for treating one or more symptoms of a disease or disorder.

The term "subject", as used herein, means a mammal, and includes human and animal subjects, such as domestic animals (e.g., horses, dogs, cats, etc.). In an embodiment, the subject is a human.

As used herein, the terms "treatment," "treat," and "treating" refer to partially or completely alleviating, inhibiting, delaying onset of, slowing the progression of, ameliorating and/or relieving a disease or disorder, or one or more symptoms of the disease or disorder, as described herein. In some embodiments, treatment may be administered after one or more symptoms have developed. In some embodiments, the term "treating" includes preventing, slowing, or halting the progression of a disease or disorder. In some embodiments, treatment may be administered in the absence of symptoms. For example, treatment may be administered to a susceptible individual prior to the onset of symptoms (e.g., in light of a history of symptoms and/or in light of genetic or other susceptibility factors). Treatment may also be continued after symptoms have resolved, for example to prevent or delay their recurrence. Thus, in some embodiments, the term "treating" includes preventing relapse or recurrence of a disease or disorder.

The term "parenteral" or "parenterally" as used herein includes subcutaneous, intravenous, intramuscular, intra-articular, intra-synovial, intrasternal, intrathecal, intrahepatic, intralesional and intracranial injection or infusion techniques for administration. Preferably, the compositions are administered intraperitoneally or intravenously. Sterile injectable forms of the compositions of this disclosure may be aqueous or oleaginous suspension. These suspensions may be formulated according to techniques known in the art using dispersing or wetting agents and suspending agents. The sterile injectable preparation may also be a sterile injectable solution or suspension in a non-toxic parenterally acceptable diluent or solvent, for example as a solution in 1,3-butanediol. Among the acceptable vehicles and solvents that may be employed are water, Ringer's solution and isotonic sodium chloride solution.

The term "in solution" when in reference to a protein, refers to a liquid medium in which the protein is distributed continuously forming a homogenous mixture.

3. Description of Exemplary Embodiments

3.1 Polymers

In some aspects, the present disclosure relates to polymers comprising a hydrophilic poly(sarcosine) chain and a hydrophobic aliphatic group. In certain embodiments, the disclosure provides a polymer of Formula I:

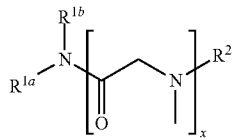

or a salt thereof, wherein:
$R^{1a}$ an optionally substituted (C1-C20)aliphatic group;
$R^{1b}$ is H or an optionally substituted (C1-C20)aliphatic group;
$R^2$ is H or an optionally substituted (C1-C20)aliphatic group; and
x is 5-250.

In certain embodiments, the disclosure provides a polymer of Formula I:

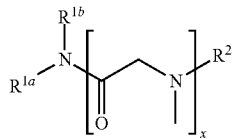

wherein:
$R^{1a}$ an optionally substituted (C1-C20)aliphatic group;
$R^{1b}$ is H or an optionally substituted (C1-C20)aliphatic group;
$R^2$ is H or an optionally substituted (C1-C20)aliphatic group; and
x is 5-250.

In some embodiments, the present disclosure relates to polymers of Formula I wherein $R^{1a}$ is an aliphatic group that comprises 1 or more carbon atoms which has an overall hydrophobic characteristic. In some embodiments, the present disclosure relates to polymers of Formula I wherein $R^{1b}$ is an aliphatic group that comprises 1 or more carbon atoms which has an overall hydrophobic characteristic. In some embodiments, the present disclosure relates to polymers of Formula I wherein $R^2$ is an aliphatic group that comprises 1 or more carbon atoms which has an overall hydrophobic characteristic.

In some embodiments, $R^{1a}$ is an aliphatic group that comprises an alkenyl group (e.g., a (C2-C20)alkenyl). In some embodiments, $R^{1b}$ is an aliphatic group that comprises an alkenyl group (e.g., a (C2-C20)alkenyl). In some embodiments, In some embodiments, $R^{1a}$ is H and $R^{1b}$ is an aliphatic group that comprises an alkenyl group (e.g., a (C2-C20)alkenyl). In some embodiments, $R^{1b}$ is an aliphatic group that comprises an alkenyl group (e.g., a (C2-C20) alkenyl) and $R^{1a}$ is H. In any and all embodiments, an alkenyl group contains a double bond that may have cis or trans geometry. In any and all embodiments, an alkenyl group comprises all Z and E double bond isomers and all Z and E conformational isomers.

As described above, the present disclosure relates to polymers wherein the hydrophilic chain comprises a polymer of N-methyl glycine (i.e. poly(sarcosine)). The present disclosure further contemplates other N-alkyl glycines which could be used to produce a water-soluble chain (see: Robinson, J. W. et al. *Macromolecules* 2013, 46(3), 580). In some embodiments, the present disclosure includes polymers wherein the hydrophilic chain is poly(N-methyl glycine), poly(N-ethyl glycine), poly(N-{n-propyl}) glycine, poly(N-isopropyl) glycine, or poly(N-allyl) glycine. In some aspects, the present disclosure also includes mixtures of two or more N-alkyl glycines used to construct the water-soluble chain, such as a mixture of N-methyl glycine and N-ethyl glycine.

Also as described above, in some embodiments one or more of $R^{1a}$, $R^{1b}$, and $R^2$ in a polymer of Formula I are optionally and independently substituted. For instance, in some embodiments, such optional and independent substitutions envisioned by the present disclosure include, but are not limited to, optionally substituted benzyl groups, optionally substituted hydrocarbons, optionally substituted silyl groups, poly(amino acid) polymers, poly(ethylene glycol) polymers, poly(N-isopropylacrylamide) polymers, poly(acrylamide) polymers, poly(2-oxazoline) polymers, poly(ethylenimine), poly(acrylic acid) polymers, poly(methacrylate) polymers, poly(vinyl alcohol) polymers, poly(vinylpyrrolidone) polymers, and their corresponding amine salts. In some embodiments, each of $R^{1a}$, $R^{1b}$, and $R^2$ is optionally and independently substituted with (C1-C20) alkyl, (C2-C20)alkenyl, (C2-C20)alkynyl, halogen, hydroxy, cyano, or oxo. In some embodiments, $R^{1a}$ is optionally and independently substituted with (C1-C20) alkyl, (C2-C20)alkenyl, (C2-C20)alkynyl, halogen, hydroxy, cyano, or oxo. In some embodiments, $R^{1b}$ is optionally and independently substituted with (C1-C20) alkyl, (C2-C20)alkenyl, (C2-C20)alkynyl, halogen, hydroxy, cyano, or oxo. In some embodiments, $R^2$ is optionally and independently substituted with (C1-C20)alkyl, (C2-C20)alkenyl, (C2-C20)alkynyl, halogen, hydroxy, cyano, or oxo.

In some embodiments, the $R^{1a}$ aliphatic group is selected from (C1-C20)alkyl, (C2-C20)alkenyl, (C2-C20)alkynyl or (C3-C20)cycloalkyl, wherein the (C1-C20)alkyl, (C2-C20) alkenyl, (2-20) alkynyl, or (C3-C20)cycloalkyl are substituted with 0-20 halogen, hydroxy, cyano, nitro, oxo or phenyl, wherein said phenyl is substituted with 0-3 substituents selected from halogen, —CH$_3$, —CF$_2$H, —CF$_3$, —OCH$_3$ or —OH.

In some embodiments, the $R^{1a}$ aliphatic group is as defined and described above, and has at least one point of unsaturation. In some such embodiments, $R^2$ is H.

In some embodiments, the $R^{1b}$ aliphatic group is selected from (C1-C20)alkyl, (C2-C20)alkene, (C2-C20)alkyne or (C3-C20)cycloalkyl, wherein the (C1-C20)alkyl, (C2-C20)alkenyl, (C2-C20)alkynyl or (C3-C20)cycloalkyl are substituted with 0-20 halogen, hydroxy, cyano, nitro, oxo or phenyl groups, wherein said phenyl is substituted with 0-3 substituents selected from halogen, —CH$_3$, —CF$_2$H, —CF$_3$, —OCH$_3$ or —OH.

In some embodiments, the $R^{1b}$ aliphatic group is as defined and described above, and has at least one point of unsaturation. In some such embodiments, $R^2$ is H.

In some embodiments, $R^{1a}$ is an aliphatic group selected from (C1-C20)alkyl and (C2-C20)alkenyl, $R^{1b}$ is H, and $R^2$ is H. In some embodiments $R^{1a}$ is an aliphatic group is selected from (C1-C20)alkyl and (C2-C20)alkenyl, $R^{1b}$ is an aliphatic group is selected from (C1-C20)alkyl and (C2-C20)alkenyl, and $R^2$ is H. In some embodiments $R^{1a}$ is an aliphatic group is selected from (C1-C20)alkyl and (C2-C20)alkenyl, $R^{1b}$ is an aliphatic group is selected from (C1-C20)alkyl and (C2-C20)alkenyl, and $R^2$ is an aliphatic group is selected from (C1-C20)alkyl and (C2-C20)alkenyl.

In some embodiments, the present disclosure envisions substitutions at $R^{1a}$, $R^{1b}$, and $R^2$ of a polymer of Formula I which may add functionality which would otherwise not be present, including, but not limited to, a detectable moiety, a fluorescent label, or a substrate. Those skilled in the art will recognize that isotopically enriched materials can be useful probes in biological assays, such as quantitative whole-body autoradiography (QWBA) assays useful for determining the distribution of a composition in an animal. In certain embodiments, $R^{1a}$, $R^{1b}$, or $R^2$ is isotopically enriched. In some embodiments, $R^{1a}$ contains a $^{14}$C isotopically enriched hydrocarbon. In some embodiments, $R^2$ contains a $^{14}$C isotopically enriched hydrocarbon.

In certain embodiments, the disclosure provides a polymer of Formula II:

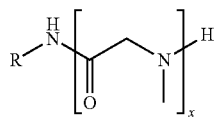

or a salt thereof, wherein:
R is an optionally substituted (C12-C20)hydrophobic aliphatic group; and x is 5-50.

In certain embodiments, the disclosure provides a polymer of Formula II:

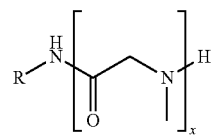

wherein:
R is an optionally substituted (C12-C20)hydrophobic aliphatic group; and x is 5-50.

In some such embodiments, R is CH$_3$—(CH$_2$)y-, wherein y is 11-19.

In some such embodiments, R is CH$_3$(CH$_2$)$_7$CH=CH(CH$_2$)$_7$CH$_2$—.

In some such embodiments, x is 15. In some such embodiments, x is 30.

In certain embodiments, the disclosure provides a polymer of Formula III:

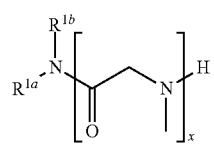

or a salt thereof, wherein:
$R^{1a}$ is an optionally substituted (C6-C20)hydrophobic aliphatic group;
$R^{1b}$ is an optionally substituted (C6-C20)hydrophobic aliphatic group; and x is 5-50.

In certain embodiments, the disclosure provides a polymer of Formula III:

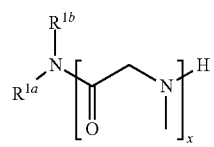

wherein:
$R^{1a}$ is an optionally substituted (C6-C12)hydrophobic aliphatic group;
$R^{1b}$ is an optionally substituted (C6-C12)hydrophobic aliphatic group; and x is 5-50.

In some such embodiments, $R^{1a}$ is CH$_3$—(CH$_2$)$_y$—, $R^{1b}$ is CH$_3$—(CH$_2$)$_z$—, y is 5-19, and z is 5-19. In some such embodiments, $R^{1a}$ is CH$_3$—(CH$_2$)$_y$—, $R^{1b}$ is CH$_3$—(CH$_2$)$_z$—, y is 5-11, and z is 5-11.

In certain embodiments, the disclosure provides a polymer of Formula IV:

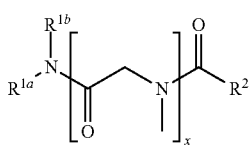

or a salt thereof, wherein:
$R^{1a}$ is an optionally substituted (C1-C6)aliphatic group;
$R^{1b}$ is H, or an optionally substituted (C1-C6)aliphatic group;
$R^2$ is an optionally substituted (C11-19)hydrophobic aliphatic group; and x is 5-50.

In certain embodiments, the disclosure provides a polymer of Formula IV:

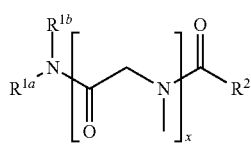

wherein:
$R^{1a}$ is an optionally substituted (C1-C6)aliphatic group;
$R^{1b}$ is H, or an optionally substituted (C1-C6)aliphatic group;
$R^2$ is an optionally substituted (C11-19)hydrophobic aliphatic group; and x is 5-50.

In some such embodiments, $R^2$ is —$(CH_2)_y$—$CH_3$, wherein y is 10-18.

In some such embodiments, $R^2$ is —$(CH_2)_7CH$=$CH(CH_2)_7CH_3$.

In some embodiments, the disclosure provides a polymer selected from Formula (V-a) or (V-b):

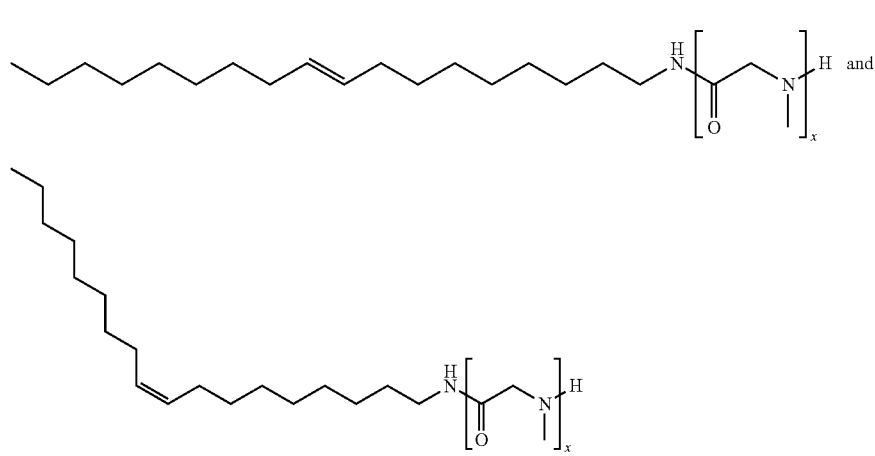

or a salt thereof, wherein x is 2-250.

In some embodiments, the disclosure provides a polymer of the following structure:

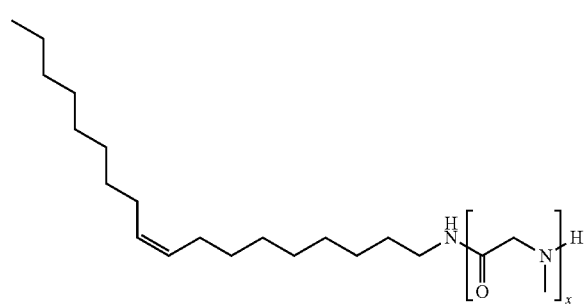

or a salt thereof, wherein x is 5-90.

In some embodiments, the disclosure provides a polymer of the following structure:

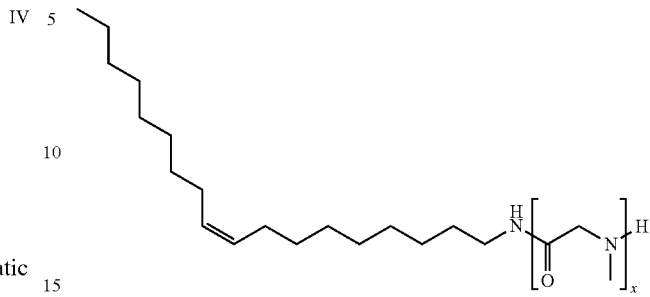

wherein x is 5-90.

For any of Formulas (V-a) and (V-b), in some such embodiments, x is between 5-80, 5-75, 5-70, 5-65, 5-60, 5-55, 5-50, 5-45, 5-40, 5-35, 5-30, 5-25, 5-20, 5-15, and 5-10. In some such embodiments, x is between 10-90, 10-85, 10-80, 10-75, 10-70, 10-65, 10-60, 10-55, 10-50, 10-45, 10-40, 10-35, 10-30, 10-25, 10-20, and 10-15. In some such embodiments, x is between 20-90, 20-75, 20-60, 20-50, 20-35, 25-90, 25-75, 25-50, 30-90, 30-60, 35-90, 35-80, 35-70, 35-60, 35-50, 40-90, 45-70, 50-90, and 50-75.

In some such embodiments, x is greater than 10. In some such embodiments, x is greater than 20. In some such embodiments, x is greater than 30. In some such embodiments, x is greater than 40. In some such embodiments, x is greater than 50. In some such embodiments, x is greater than 60. In some such embodiments, x is greater than 70. In some such embodiments, x is greater than 80. In some such embodiments, x is greater than 90. In some such embodiments, x is greater than 100. In some such embodiments, x is less than 100. In some such embodiments, x is less than 90. In some such embodiments, x is less than 80. In some such embodiments, x is less than 70. In some such embodiments, x is less than 60. In some such embodiments, x is less than 50. In some such embodiments, x is less than 40. In some such embodiments, x is less than 30. In some such embodiments, x is less than 20. In some such embodiments, x is less than 10.

In some such embodiments, x is 5. In some such embodiments, x is 10. In some such embodiments, x is 15. In some such embodiments, x is 20. In some such embodiments, x is 25. In some such embodiments, x is 30. In some such embodiments, x is 35. In some such embodiments, x is 40. In some such embodiments, x is 45. In some such embodiments, x is 50. In some such embodiments, x is 55. In some such embodiments, x is 60. In some such embodiments, x is 65. In some such embodiments, x is 70. In some such embodiments, x is 75. In some such embodiments, x is 80. In some such embodiments, x is 85. In some such embodiments, x is 90.

In some embodiments, the present disclosure provides a polymer of any of the following structures for use in accord with the present invention:

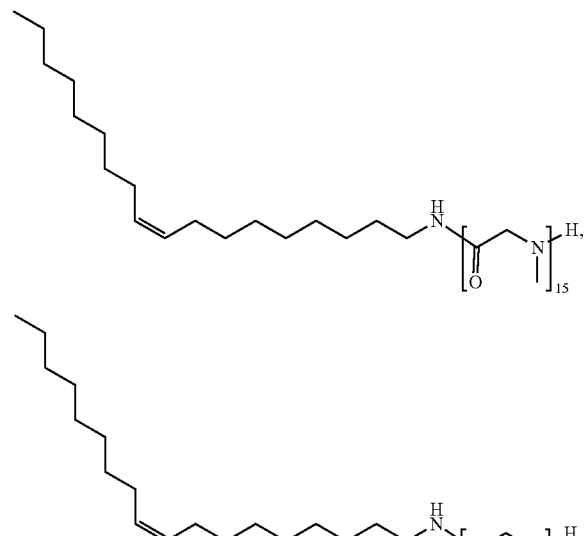

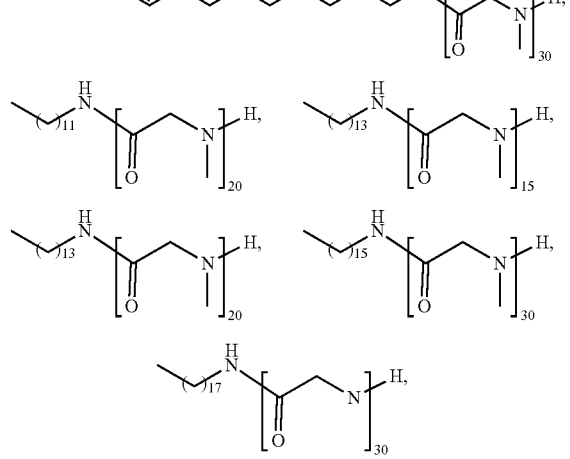

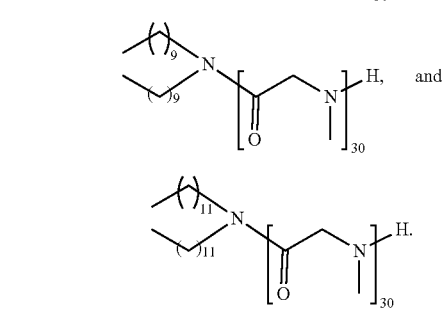

In some embodiments, the present disclosure provides a polymer of the following structure:

In some embodiments, the present disclosure provides a polymer of the following structure:

In some embodiments, the present disclosure provides a polymer of the following structure:

In some embodiments, the present disclosure provides a polymer of the following structure:

In some embodiments, the present disclosure provides a polymer of the following structure:

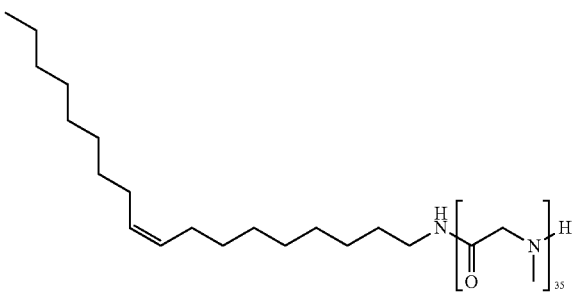

In some embodiments, the present disclosure provides a polymer of the following structure:

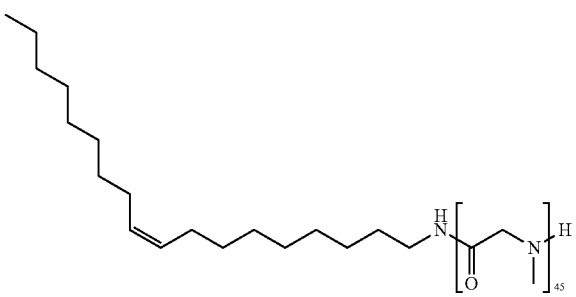

In some embodiments, the present disclosure provides a polymer of the following structure:

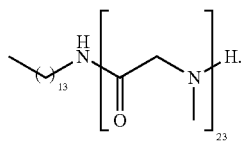

3.2 Synthesis of Polymers

In certain embodiments the disclosure provides methods for preparing a polymer of Formula II. One embodiment of a general method for preparing said polymer is depicted in Scheme 1 and comprises initiating polymerization of sarcosine NCA (Formula VI) with a suitable amine-containing initiator (Formula V) to provide a polymer of Formula II.

Scheme 1

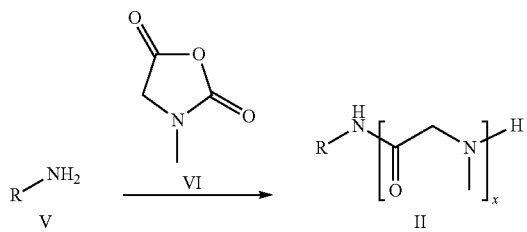

Those skilled in the art will recognize that many amines of Formula V can serve as initiators for the polymerization of sarcosine NCA. Initiators of Formula V envisioned by the disclosure include optionally substituted (C12-C20)hydrophobic aliphatic amines and their corresponding amine salts derived from anions including, but not limited to, halides, organic acids (e.g., acetic acid, trifluoroacetic acid), and tetrafluoroborate.

In some embodiments, the initiator of Formula V is an alkyl amine of Formula Va:

wherein x=11-19.

In some embodiment, the initiator of Formula V is oleylamine (i.e., $CH_3(CH_2)_7CH=CH(CH_2)_7CH_2-NH_2$).

In certain embodiments the disclosure provides methods for preparing a polymer of Formula III. One embodiment of a general method for preparing said polymer is depicted in Scheme 2 and comprises initiating polymerization of sarcosine NCA of Formula VI with a suitable secondary amine-containing initiator of Formula VII, to provide a polymer of Formula III, wherein each of $R^{1a}$, $R^{1b}$, and x are defined and described herein.

Scheme 2

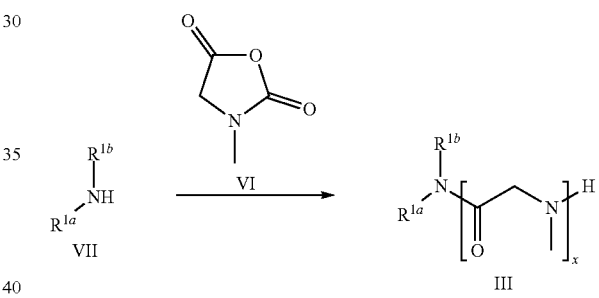

Those skilled in the art will recognize that many secondary amines of Formula VII can serve as initiators for the polymerization of sarcosine NCA depicted in Scheme 2. Initiators of Formula VII envisioned by the disclosure include those in which $R^{1a}$ is an optionally substituted (C6-C20)hydrophobic aliphatic group and $R^{2a}$ is optionally substituted (C6-C20)hydrophobic aliphatic group. In some embodiments the initiator of Formula VII is an amine salt derived from anions including, but not limited to, halides, organic acids (e.g., acetic acid, trifluoroacetic acid), and tetrafluoroborate.

In some embodiments, the initiator of Formula VII is an alkyl secondary amine of the structure Formula VIIa:

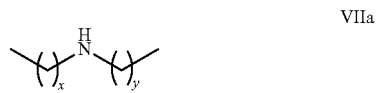

wherein: x=5-19; and y=5-19. In some embodiments, x=6-12; and y=6-12.

In certain embodiments the disclosure provides methods for preparing a polymer of Formula IV. One embodiment of a general method for preparing said polymer is depicted in Scheme 3 and comprises the following steps: (1) initiating polymerization of sarcosine NCA of Formula VI with a suitable amine-containing initiator of Formula VII, and (2) adding a terminating agent represented by Formula VIII to provide a polymer of Formula IV, wherein each of $R^{1a}$, $R^{1b}$, $R^2$, LG, and x are defined and described herein.

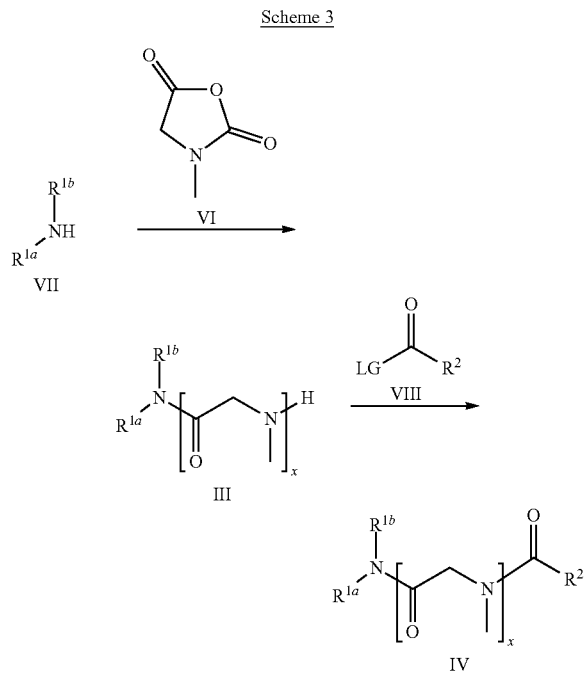

Scheme 3

Those skilled in the art will recognize that many amines of Formula VII can serve as initiators for the polymerization of sarcosine NCA depicted in Scheme 3. Initiators of Formula VII envisioned by the disclosure include those in which $R^{1a}$ is an optionally substituted (C1-C6)aliphatic group, and $R^{2a}$ is H, or an optionally substituted (C1-C6) aliphatic group. In some embodiments the initiator of Formula VII is an amine salt derived from anions including, but not limited to, halides, organic acids (e.g., acetic acid, trifluoroacetic acid), and tetrafluoroborate.

In some embodiments, the initiator of Formula VII is neopentylamine, N-butylamine, or benzylamine.

Those skilled in the art will recognize that many terminating agents, in addition to those of Formula VIII, are capable of reacting with the terminal amine of a compound represented by Formula III and its corresponding anion. Terminating agents envisioned by the disclosure include anhydrides, sulfonyl halides, other acylating agents, and other groups that contain a leaving group (LG) that is susceptible to nucleophilic displacement.

In some embodiments, the terminating agent is an acyl chloride of Formula VIIIa represented by the following structure:

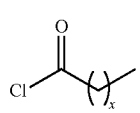

VIIIa wherein x is an optionally substituted (C12-C20)hydrophobic aliphatic group.

In some embodiments, the terminating agent of Formula VIII is oleyl chloride (i.e., $CH_3(CH_2)_7CH\!=\!CH(CH_2)_7CO\!-\!Cl$).

Those skilled in the art will recognize that treatment of a compound of Formula III with a terminating agent may be performed at the conclusion of the polymerization with sarcosine NCA of Formula VI without the isolation of a compound of Formula III in a process described as a "one-pot" synthesis. Alternatively, treatment with a terminating group may be performed after isolation of a compound of Formula III from a reaction mixture in a "multi-step" process. In certain embodiments, a compound of Formula IV is prepared in a one-pot process. In certain embodiments, a compound of Formula IV is prepared in a multi-step process.

In certain embodiments, the sarcosine NCA is added to a solution of the polymerization initiator. In certain embodiments, the polymerization initiator is added to a solution of sarcosine NCA.

In certain embodiments, the sarcosine NCA is added as a solid.

In certain embodiments, sarcosine NCA is added as a solution. In certain embodiments, sarcosine NCA is added as an N,N-dimethylacetamide (DMAc) solution. In certain embodiments, sarcosine NCA is added as an N,N-dimethylformamide (DMF) solution.

In certain embodiments, the process depicted in Scheme 1, Scheme 2, or Scheme 3 is performed in a single solvent. In certain embodiments, the solvent will be capable of solubilizing the starting materials, living polymerization chain, and the final polymer such that all the material remains in solution for the duration of the process. In some embodiments, a suitable solvent comprises an amide-containing solvent. In certain embodiments the solvent is or comprises N,N-dimethylformamide (DMF). In certain embodiments, the solvent is or comprises N,N-dimethylacetamide (DMAc).

One skilled in the art will recognize that many amines are suitable for the initiation of a polymerization reaction with sarcosine NCA in a process depicted in Scheme 1, Scheme 2, or Scheme 3. Initiators envisioned by the present disclosure include, but are not limited to, optionally substituted benzylamines, optionally substituted hydrocarbon amines, optionally substituted silylamines, poly(amino acid) polymers, poly(ethylene glycol) polymers, poly(N-isopropylacrylamide) polymers, poly(acrylamide) polymers, poly(2-oxazoline) polymers, poly(ethylenimine), poly(acrylic acid) polymers, poly(methacrylate) polymers, poly(vinyl alcohol) polymers, poly(vinylpyrrolidone) polymers, and their corresponding amine salts.

In some embodiments, the disclosure relates to a method to prepare a compound of Formula I, Formula II, Formula III, or Formula IV using reagents, solvents, resins, and other components used in a chemical reaction or isolation as received. In some embodiments, said compound is prepared without measures taken to exclude air and/or moisture (e.g., Schlenk techniques). Those skilled in the art will appreciate the advantage of NCA polymerization reactions under these conditions as it reduces costs and increases the robustness of such processes.

The present disclosure also relates to the isolation of a polymer of Formula I, Formula II, Formula III, or Formula IV from a reaction mixture using anti-solvent. In some embodiments, isolation occurs using a single anti-solvent. In some embodiments, the ratio of reaction mixture to anti-solvent is such to minimize the total amount used. Those skilled in the art will recognize the advantage of using a minimal amount of anti-solvent as it reduces cost and complexity and increases the scale of preparation. Such reaction mixture to anti-solvent ratios contemplated by the present disclosure include, but are not limited to, 1:0.25, 1:0.5, 1:1, 1:1.5, 1:2, 1:3, 1:4, 1:5, 1:10.

The present disclosure also relates to the use of a single reaction solvent and a single anti-solvent. Those skilled in the art will recognize the advantage of using only two solvents total for the preparation of a compound of Formula I, Formula II, Formula III, or Formula IV, as this will minimize costs, especially on commercial scale under Good Manufacturing Practice (GMP) guidance, as a minimal number of solvents will need to be sourced and quantified during release testing. In certain embodiments the anti-solvent is selected from a list including, but not limited to, a ketone-containing solvent, a hydroxyl-containing solvent, an ester-containing solvent, an ether-containing solvent, a hydrocarbon solvent, an aromatic solvent, and an aqueous solvent.

Anti-solvents envisioned in the disclosure include, but are not limited to, methyl ethyl ketone, acetone, butanone, ethanol, methanol, isopropanol, butanol, tert-butanol, methyl acetate, butyl acetate, diethyl ether, dioxane, tetrahydrofuran, hexane, heptane, toluene, water, and aqueous buffer solutions. In some embodiments, the anti-solvent is tert-butyl methyl ether. In some embodiments, the anti-solvent is ethyl acetate.

The present disclosure also relates to the treatment of a polymer of Formula I, Formula II, Formula III, or Formula IV to a lyophilization process. In some embodiments, the lyophilization is performed from an aqueous solution. In certain embodiments, the lyophilization is performed from an aqueous solution containing tert-butanol.

The present disclosure also relates to the treatment of a polymer of Formula I, Formula II, Formula III, or Formula IV to a spray-drying process. In some embodiments, the spray-drying is performed from an aqueous solution. In certain embodiments, the lyophilization is performed from an aqueous solution containing tert-butanol. In certain embodiments, the lyophilization is performed from methanol.

3.3 Polymer and Protein Compositions

In certain embodiments, the present disclosure relates to compositions comprising a protein and polymer of Formula I, Formula II, Formula III, or Formula IV. Without wishing to be bound by any particular theory, it is believed that polymers of the present disclosure outcompete proteins for absorption onto interfaces between two phases and thus decrease the likelihood for protein adsorption which can lead to aggregation and denaturation. This property is of critical importance in formulating pharmaceutical biologic proteins which encounter such interfacial stresses during manufacturing, storage, and administration.

In some embodiments, the present disclosure provides compositions comprising:
(i) a polymer of Formula I:

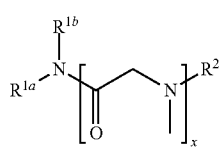

I or a salt thereof, wherein:

$R^{1a}$ is an optionally substituted (C1-C20)aliphatic group;

$R^{1b}$ is H or an optionally substituted (C1-C20)aliphatic group;

$R^2$ is H or an optionally substituted (C1-C20)aliphatic group; and x is 5-250; and (ii) a protein.

In some embodiments, the present disclosure provides compositions comprising:
(i) a polymer of Formula I:

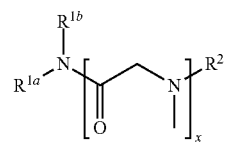

I wherein:

$R^{1a}$ is an optionally substituted (C1-C20)aliphatic group;

$R^{1b}$ is H or an optionally substituted (C1-C20)aliphatic group;

$R^2$ is H or an optionally substituted (C1-C20)aliphatic group; and x is 5-250; and (ii) a protein.

In some embodiments, a composition comprises:
(i) a polymer of Formula II:

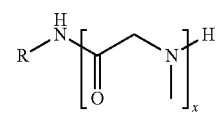

II or a salt thereof, wherein:

R is an optionally substituted (C12-C20)hydrophobic aliphatic group; and x is 5-50; and (ii) a protein.

In some embodiments, a composition comprises:
(i) a polymer of Formula II:

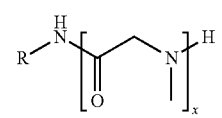

II or a salt thereof, wherein:

R is an optionally substituted (C12-C20)hydrophobic aliphatic group; and x is 5-50; and (ii) a protein.

In some embodiments, a composition comprises:
(i) a polymer of Formula II:

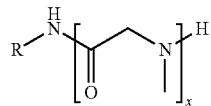
II wherein:
R is an optionally substituted (C12-C20)hydrophobic aliphatic group; and
x is 5-50; and
(ii) a protein.

In some such embodiments, R is $CH_3$—$(CH_2)_y$— and y is 11-19.

In some such embodiments, R is $CH_3(CH_2)_7CH=CH(CH_2)_7CH_2$—.

In some embodiments, the composition comprises:
(i) a polymer of Formula III:

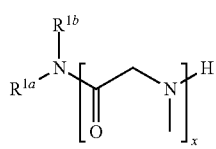
III or a salt thereof, wherein:
$R^{1a}$ is an optionally substituted (C6-C20)hydrophobic aliphatic group;
$R^{1b}$ is an optionally substituted (C6-C20)hydrophobic aliphatic group; and
x is 5-50; and
(ii) a protein.

In some embodiments, the composition comprises:
(i) a polymer of Formula III:

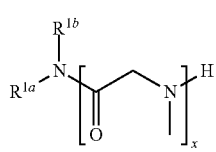
III wherein:
$R^{1a}$ is an optionally substituted (C6-C12)hydrophobic aliphatic group;
$R^{1b}$ is an optionally substituted (C6-C12)hydrophobic aliphatic group; and
x is 5-50; and
(ii) a protein.

In some such embodiments, the polymer is of Formula III, wherein:
$R^{1a}$ is $CH_3$—$(CH_2)_y$—;
$R^{1b}$ is $CH_3$—$(CH_2)_z$—;
y is 5-19; and
z is 5-19.

In some such embodiments, the polymer is of Formula III, wherein:
$R^{1a}$ is $CH_3$—$(CH_2)_y$—;
$R^{1b}$ is $CH_3$—$(CH_2)_z$—;
y is 5-11; and
z is 5-11.

In some embodiments, a composition comprises:
(i) a polymer of Formula IV:

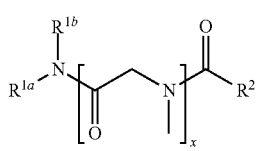
IV or a salt thereof, wherein:
$R^{1a}$ is an optionally substituted (C1-C6)aliphatic group;
$R^{1b}$ is H, or an optionally substituted (C1-C6)aliphatic group;
$R^2$ is an optionally substituted (C11-19)hydrophobic aliphatic group; and
x is 5-50; and
(ii) a protein.

In some embodiments, a composition comprises:
(i) a polymer of Formula IV:

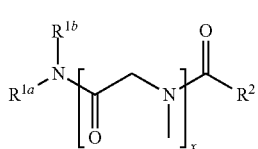
IV wherein:
$R^{1a}$ is an optionally substituted (C1-C6)aliphatic group;
$R^{1b}$ is H, or an optionally substituted (C1-C6)aliphatic group;
$R^2$ is an optionally substituted (C11-19)hydrophobic aliphatic group; and
x is 5-50; and
(ii) a protein.

In some such embodiments, $R^2$ is —$(CH_2)_y$—$CH_3$, and y is 10-18.

In some such embodiments, $R^2$ is $R^2$ is —$(CH_2)_7CH=CH(CH_2)_7CH_3$.

In some embodiments, a composition is any of those described above and herein, further comprising one or more of: water, a preservative, and a pH adjuster.

In some embodiments, a composition is any of those described above and herein, wherein the protein is a biologic. Exemplary such proteins are described above and herein and are known to those of skill in the biological arts.

In some embodiments, a composition comprises:
(i) a polymer selected from Formula (V-a) or (V-b):

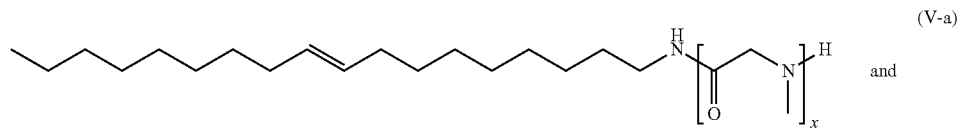

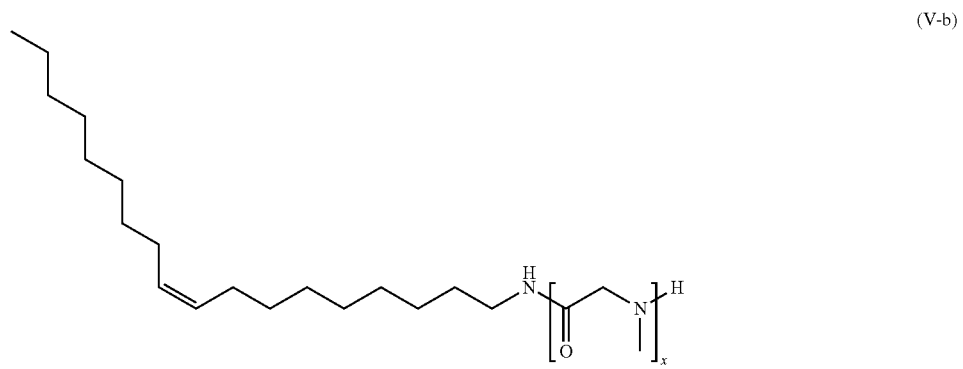

or a salt thereof, wherein x is 2-250; and
(ii) a protein.

In some embodiments, a composition comprises:
(i) a polymer of the following structure:

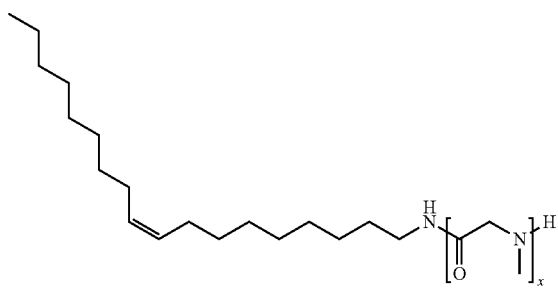

or a salt thereof, wherein x is 2-250; and
(ii) a protein.

In some embodiments, a composition comprises:
(i) a polymer of the following:

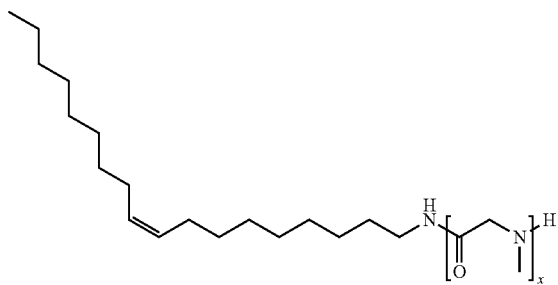

wherein x is 5-90; and
(ii) a protein.

In some such embodiments, x is between 5-80, 5-75, 5-70, 5-65, 5-60, 5-55, 5-50, 5-45, 5-40, 5-35, 5-30, 5-25, 5-20, 5-15, and 5-10. In some such embodiments, x is between 10-90, 10-85, 10-80, 10-75, 10-70, 10-65, 10-60, 10-55, 10-50, 10-45, 10-40, 10-35, 10-30, 10-25, 10-20, and 10-15. In some such embodiments, x is between 20-90, 20-75, 20-60, 20-50, 20-35, 25-90, 25-75, 25-50, 30-90, 30-60, 35-90, 35-80, 35-70, 35-60, 35-50, 40-90, 45-70, 50-90, and 50-75.

In some such embodiments, x is greater than 10. In some such embodiments, x is greater than 20. In some such embodiments, x is greater than 30. In some such embodiments, x is greater than 40. In some such embodiments, x is greater than 50. In some such embodiments, x is greater than 60. In some such embodiments, x is greater than 70. In some such embodiments, x is greater than 80. In some such embodiments, x is greater than 90. In some such embodiments, x is greater than 100. In some such embodiments, x is less than 100. In some such embodiments, x is less than 90. In some such embodiments, x is less than 80. In some such embodiments, x is less than 70. In some such embodiments, x is less than 60. In some such embodiments, x is less than 50. In some such embodiments, x is less than 40. In some such embodiments, x is less than 30. In some such embodiments, x is less than 20. In some such embodiments, x is less than 10.

In some such embodiments, x is 5. In some such embodiments, x is 10. In some such embodiments, x is 15. In some such embodiments, x is 20. In some such embodiments, x is 25. In some such embodiments, x is 30. In some such embodiments, x is 35. In some such embodiments, x is 40. In some such embodiments, x is 45. In some such embodiments, x is 50. In some such embodiments, x is 55. In some such embodiments, x is 60. In some such embodiments, x is 65. In some such embodiments, x is 70. In some such embodiments, x is 75. In some such embodiments, x is 80. In some such embodiments, x is 85. In some such embodiments, x is 90.

In some embodiments, a composition is any of those described above and herein, wherein the polymer is of the following structure:

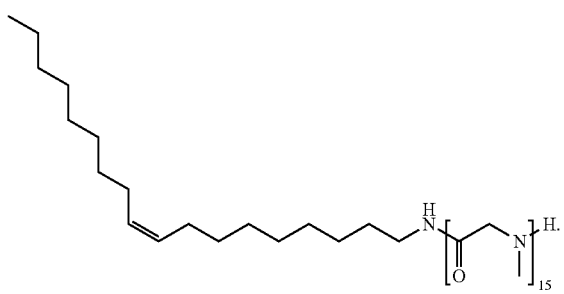

In some embodiments, a composition comprises a polymer of the following structure:

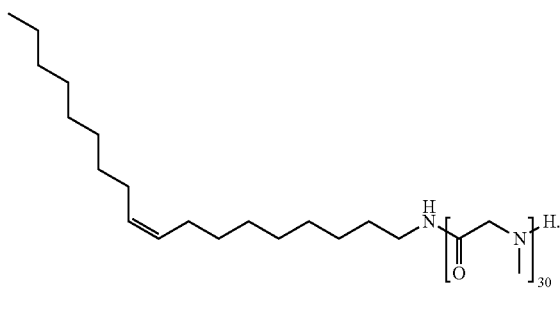

In some embodiments, a composition is any of those described above and herein, wherein the polymer is of the following structure:

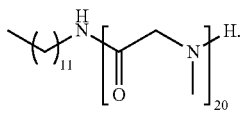

In some embodiments, a composition is any of those described above and herein, wherein the polymer is of the following structure:

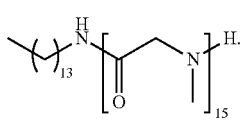

In some embodiments, a composition is any of those described above and herein, wherein the polymer is of the following structure:

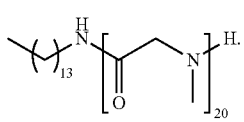

In some embodiments, a composition is any of those described above and herein, wherein the polymer is of the following structure:

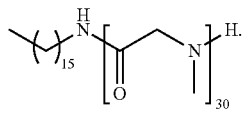

In some embodiments, a composition is any of those described above and herein, wherein the polymer is of the following structure:

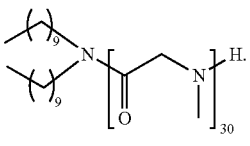

In some embodiments, a composition is any of those described above and herein, wherein the polymer is of the following structure:

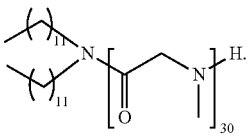

In some embodiments, a composition is any of those described above and herein, wherein the polymer is of the following structure:

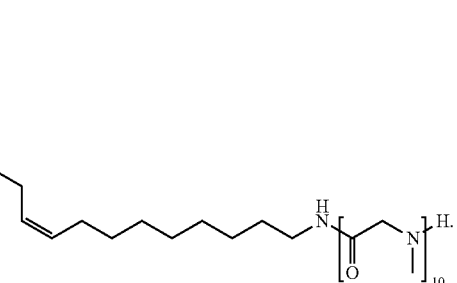

In some embodiments, a composition is any of those described above and herein, wherein the polymer is of the following structure:

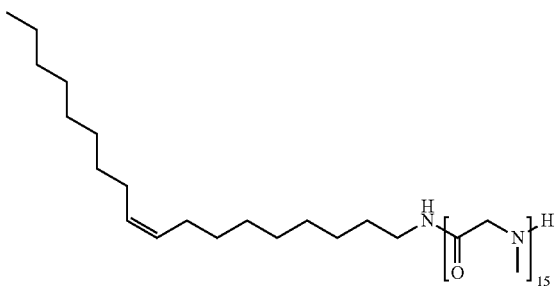

In some embodiments, a composition is any of those described above and herein, wherein the polymer is of the following structure:

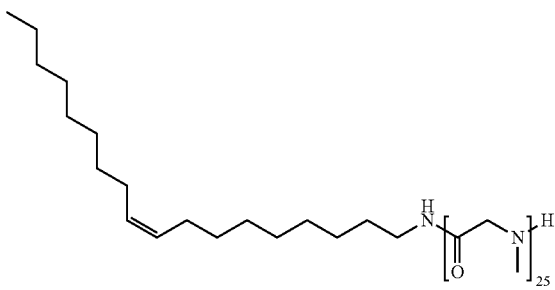

In some embodiments, a composition is any of those described above and herein, wherein the polymer is of the following structure:

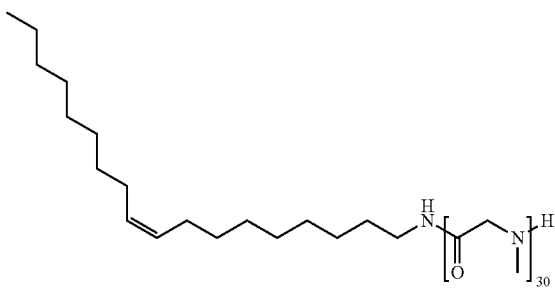

In some embodiments, a composition is any of those described above and herein, wherein the polymer is of the following structure:

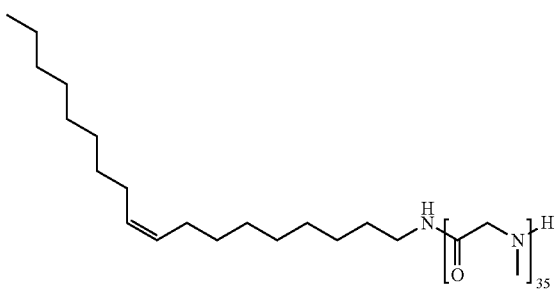

In some embodiments, a composition is any of those described above and herein, wherein the polymer is of the following structure:

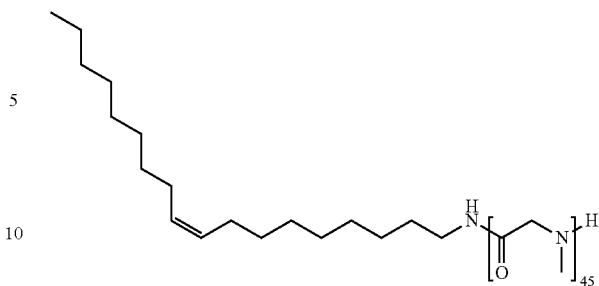

In some embodiments, a composition is any of those described above and herein, wherein the polymer is of the following structure:

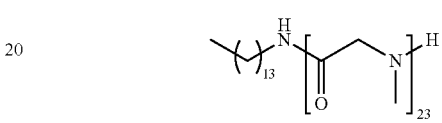

In some embodiments, a composition is any of those described above and herein, wherein the polymer is of Formula I, wherein $R^{1a}$ is an optionally substituted $C_{12}$ aliphatic group, $R^{1b}$ is H or an optionally substituted $C_{12}$ aliphatic group, $R^2$ is H, and x is 23. In some embodiments, a composition is any of those described above and herein, wherein the polymer is of Formula I, wherein $R^{1a}$ is a $C_{12}$ aliphatic group, $R^{1b}$ is H, $R^2$ is H, and x is 23. In some embodiments, a composition is any of those described above and herein, wherein the polymer is of Formula I, wherein $R^{1a}$ is —(CH$_2$)$_{11}$CH$_3$, $R^{1b}$ is H, $R^2$ is H, and x is 23.

In certain embodiments, the present disclosure provides compositions comprising a protein and a polymer of Formula I, Formula II, Formula III, Formula IV, Formula (V-a), or Formula (V-b), in which the protein is pharmaceutically active (i.e., a biologic protein). Such compositions may further comprise one or more excipients, as defined herein. In certain embodiments, the present disclosure provides compositions comprising a protein and a polymer of Formula I, Formula II, Formula III, or Formula IV in which the protein is pharmaceutically active (i.e., a biologic protein). Such compositions may further comprise one or more excipients, as defined herein.

In certain embodiments, compositions of the present disclosure may be provided as drug products useful for the treatment of a patient in need thereof. Compositions of the disclosure may provide a therapeutically effective amount of a protein biologic suitable for the treatment of a subject in need thereof. In some embodiments, the subject is a human.

In certain embodiments, the disclosure provides compositions comprising one or more proteins and a polymer of Formula I, Formula II, Formula III, Formula IV, Formula (V-a), or Formula (V-b), wherein the weight ratio of protein to polymer is between about 0.01:1 to about 500:1. In certain embodiments, the disclosure provides compositions comprising one or more proteins and a polymer of Formula I, Formula II, Formula III, or Formula IV wherein the weight ratio of protein to polymer is between about 0.01:1 to about 500:1. In some embodiments of the disclosure, the weight ratio of protein to polymer is between about 10:1 to about 250:1. In some embodiments, the weight ratio of protein to polymer is about 1:0.1 to about 1:1. In some embodiments, the weight ratio of protein to polymer is about 1:0.1, about 1:0.2, about 1:0.3, about 1:0.4, about 1:0.5, about 1:0.6, about 1:0.7, about 1:0.8, about 1:0.9, about 1:1, about 1.1:1, about 1.2:1, about 1.3:1, about 1.4:1, or about 1.5:1. In some embodiments, the weight ratio of protein to polymer is about 1.5:1, about 2:1, about 2.5:1, about 3:1, about 3.5:1, about 4:1, about 4.5:1, about 5:1, about 5.5:1, about 6:1, about 6.5:1, about 7:1, about 7.5:1, about 8:1, about 8.5:1, about 9:1, about 9.5:1, or about 10:1.

Certain embodiments of the disclosure are provided as pharmaceutically acceptable compositions. Such compositions include, but are not limited to, pills, tablets, capsules, suppositories, creams, aerosols, syrups, film, skin patch, dermal patch, vaginal ring, eye drop. In some embodiments the pharmaceutically acceptable composition is a lyophilized powder. In some embodiments, the pharmaceutically acceptable composition is an aqueous solution or suspension.

Certain embodiments of the disclosure are provided as pharmaceutically acceptable compositions packaged in a prefilled syringe, auto-injector, pen injector, or needle free system.

The disclosure also provides compositions that are administered to a patient in need thereof. Routes of administration include, but are not limited to, parenterally, orally, sublingually, buccally, rectally, vaginally, by the ocular route, by the otic route, nasally, inhalation, nebulization, cutaneously, topically, systemically, or transdermally. In some embodiments, the compositions of the disclosure are formulated as part of an implant or device, or formulated for slow or extended release. In some embodiments, the route of administration is intravenous. In some embodiments the route of administration is via a central venous catheter. In some embodiments the route of administration is via a peripheral venous catheter. In some embodiments the route of administration is subcutaneous.

In certain embodiments of the disclosure, the compositions are formulated for oral administration, e.g., in the form of capsules, cachets, pills, tablets, lozenges (using a flavored basis, usually sucrose and acacia or tragacanth), powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia) and the like.

In some embodiments, in solid dosage forms for oral administration (capsules, tablets, pills, dragees, powders, granules, and the like), the compositions of the disclosure are mixed with one or more pharmaceutically acceptable carriers, such as sodium citrate or dicalcium phosphate, and/or any of the following: (1) fillers or extenders, such as starches, lactose, sucrose, glucose, mannitol, and/or silicic acid; (2) binders, such as, for example, carboxymethylcellulose, alginates, gelatin, polyvinyl pyrrolidone, sucrose, and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, cetyl alcohol and glycerol monostearate; (8) absorbents, such as kaolin and bentonite clay; (9) lubricants, such a talc, calcium stearate, magnesium stearate, solid polyethylene glycols, sodium lauryl sulfate, and mixtures thereof; and (10) coloring agents. In some embodiments, the solid dosage form is a capsules, tablets, or pills, wherein the pharmaceutical compositions comprises one or more buffering agents. Solid compositions of a similar type may also be employed as fillers in soft and hard-filled gelatin capsules using such excipients as lactose or milk sugars, as well as polyethylene glycols and the like.

In some embodiments, drug products of this disclosure are formulated as liquid dosage forms for oral administration. Liquid dosage forms for oral administration include, but are not limited to, pharmaceutically acceptable emulsions, microemulsions, solutions, suspensions, syrups and elixers. In some embodiments, a liquid dosage form comprises inert diluents commonly used in the art such as water or other solvents, solubilizing agents and emulsifiers, such as ethanol, isopropyl alcohol, ethyl carbonate, ethyl acetate, benzyl alcohol, benzyl benzoate, propylene glycol, 1,3-butyline glycol, oils (e.g., cottonseed, groundnut, corn, germ, olive, castor and sesame oils), glycerol, tetrahydrofuryl alcohol, polyethylene glycols and fatty acid esters or sorbitan, and mixtures thereof. In some embodiments, oral compositions comprise adjuvants such as wetting agents, emulsifying and suspending agents, sweetening, flavoring, coloring, perfuming and preservative agents.

In certain embodiments, compositions of the disclosure are formulated for parenteral administration. For instance, in some embodiments, compositions of the disclosure are formulated for parenteral administration by including one or more pharmaceutically acceptable sterile isotonic aqueous or non-aqueous solutions, dispersions, suspensions or emulsions, or sterile powders which, in some embodiments, are reconstituted into sterile injectable solutions or dispersions just prior to use. In some embodiments, compositions for parenteral administration contain antioxidants, buffers, bacteriostats, and/or solutes which render the formulation isotonic with the blood of the intended recipient or suspending or thickening agents. Examples of suitable aqueous and non-aqueous vehicles for use in the pharmaceutical compositions of the disclosure include water, Ringer's solution, an isotonic salt solution, ethanol, polyols (such as 1,3-butanediol, glycerol, propylene glycol, polyethylene glycol, and the like), and suitable mixtures thereof, vegetable oils, such as olive oil, and injectable organic esters, such as ethyl oleate. In some embodiments, compositions of the disclosure are intended for parenteral administration, and comprise a vehicle selected from water, 1,3-butanediol, Ringer's solution or an isotonic sodium chloride solution.

In some embodiments, compositions of the disclosure are formulated for slow, controlled, and/or extended release. The term "extended release" is widely recognized in the art of pharmaceutical sciences and is used herein to refer to controlled release of an active compound or agent from a dosage form to an environment over (throughout or during) an extended period of time, e.g., greater than or equal to one hour. In some embodiments, an extended-release dosage form will release drug at a substantially constant rate over an extended period of time or a substantially constant amount of drug will be released incrementally over an extended period of time. The term "extended release" used herein includes the terms "controlled release," "prolonged release," "sustained release," "delayed release," or "slow release" as these terms are used in the pharmaceutical sciences. In some embodiments, the extended-release dosage is administered in the form of a patch or a pump.

3.4 Specific Examples
The present disclosure further envisions polymers of the following structures:
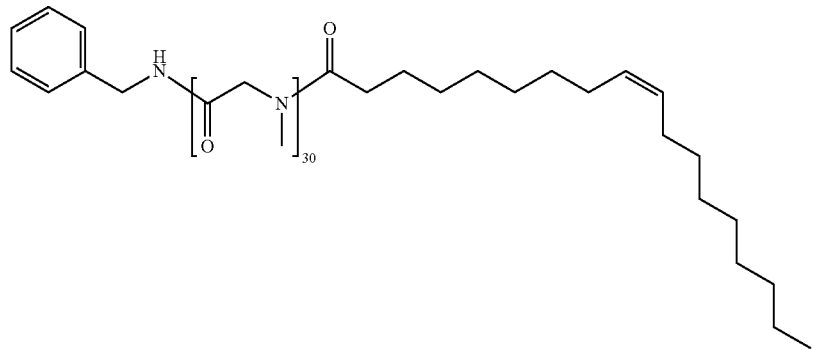
IX
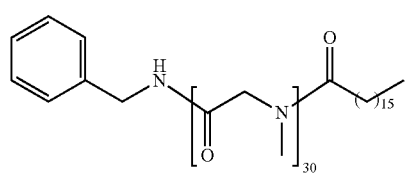
X
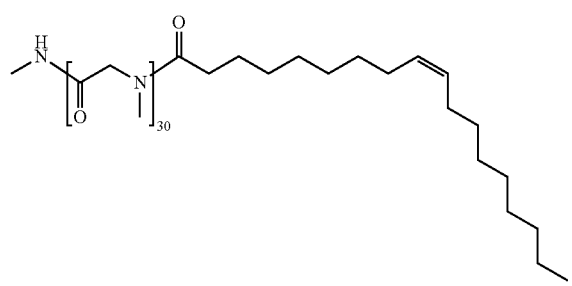
XI
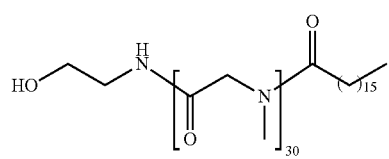
XII
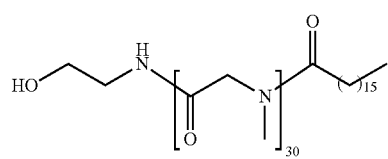
XIII
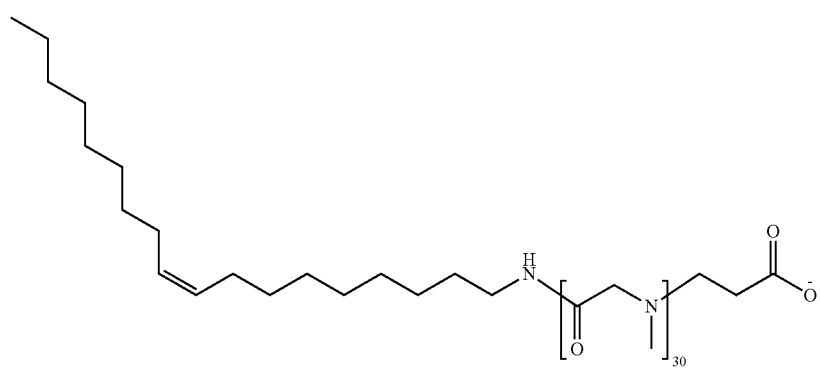
XIV -continued
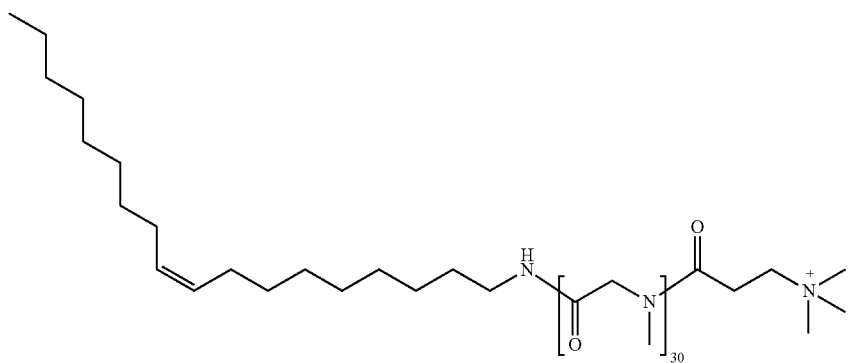
XV
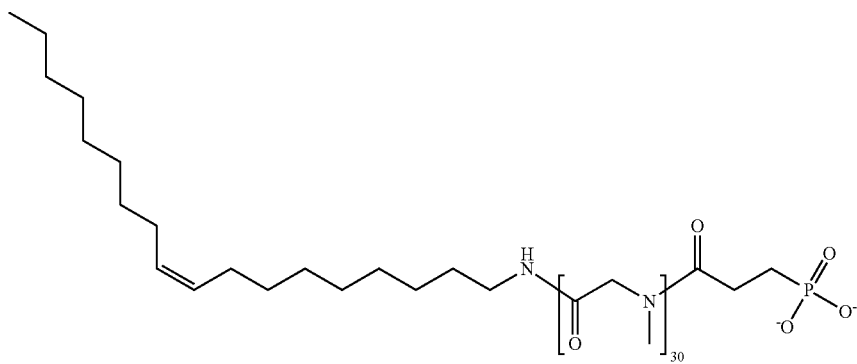
XVI
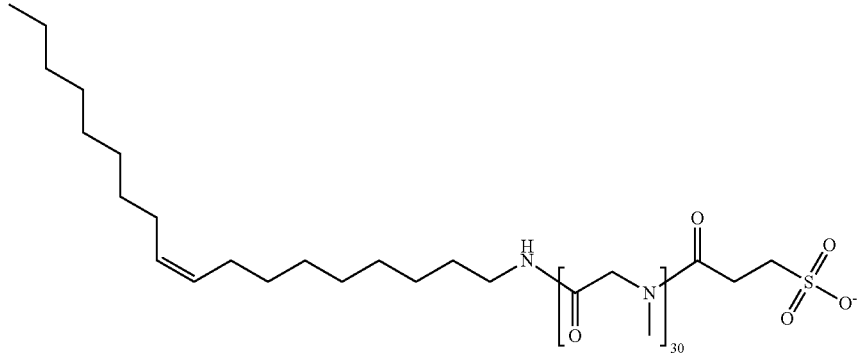
XVII
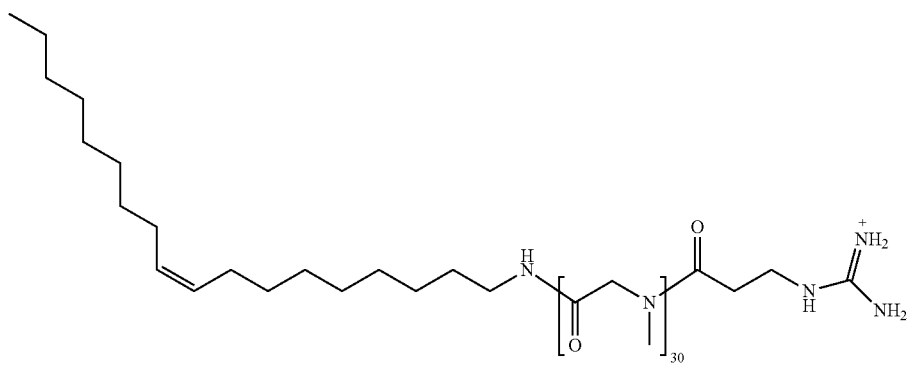
XVIII XV
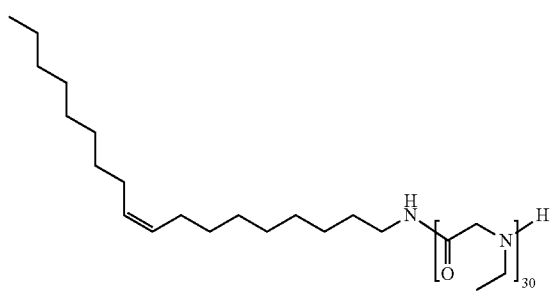
XVI
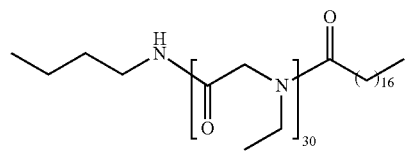
XVII
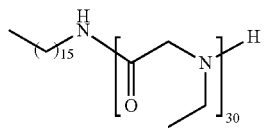
XVIII
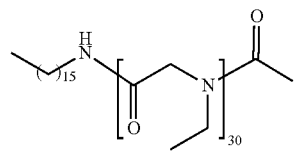
XIX
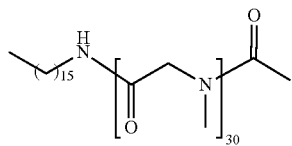
XX
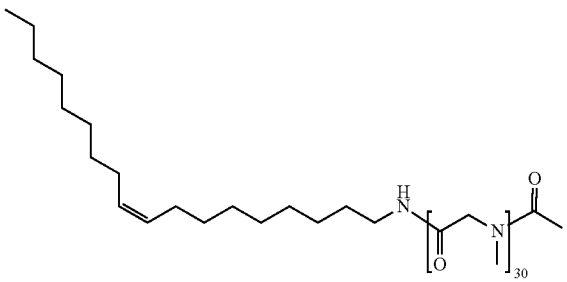
XXI
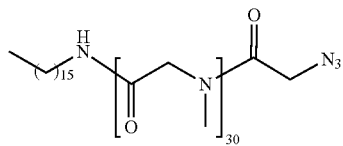
XXII
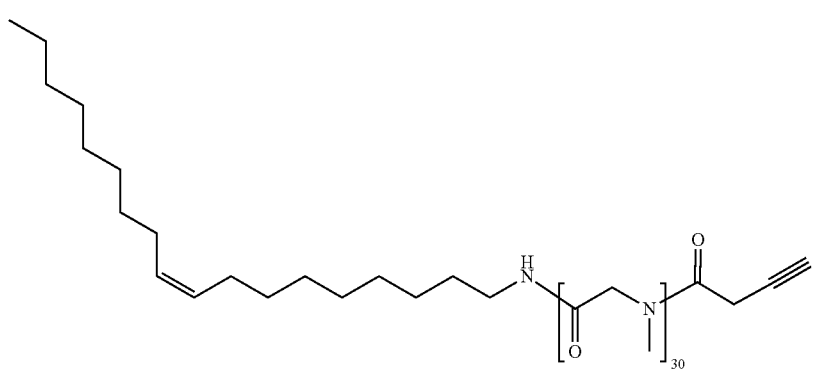

-continued
XXIII
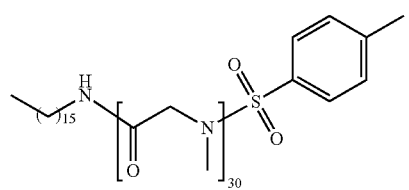
XXIV
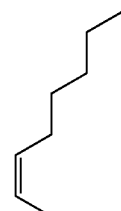
XXV
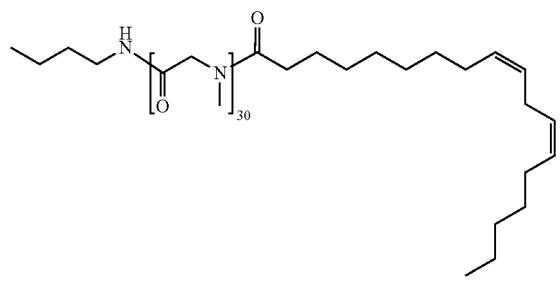
XXVI
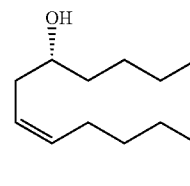
XXVII
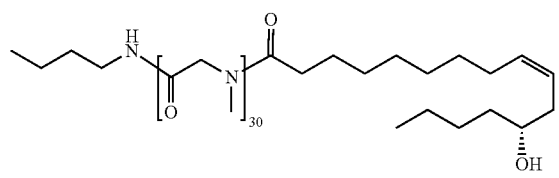
XXVIII
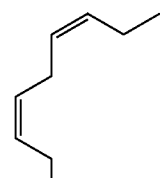
XXIX
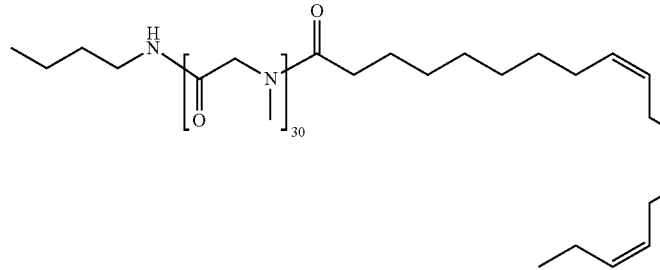
XXX
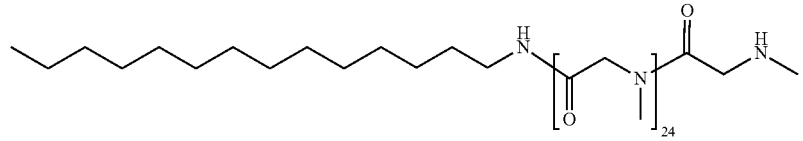
XXXI
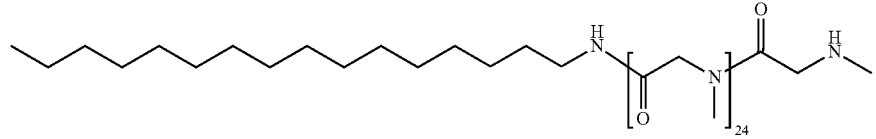

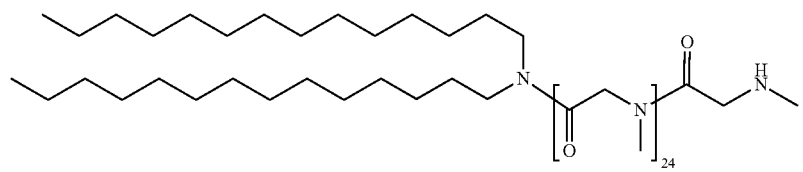

XXXII

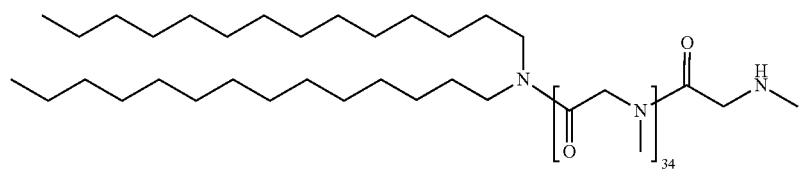

XXXIII

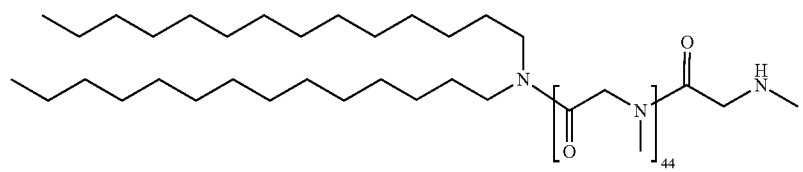

XXXIV

The present disclosure envisions compositions comprising a protein and a polymer selected from Formula IX to Formula XXXIV.

Examples

In order for the disclosure to be more fully understood, the following examples are set forth. It will be understood that these examples are for illustrative purposes only and are not to be construed as limiting this disclosure in any manner.

The following abbreviations are used: bovine serum albumin (BSA); immunoglobin G (IgG), sourced from bovine unless otherwise stated; Fourier-transform infrared spectroscopy (FT-IR); attenuated total reflectance (ATR); nuclear magnetic resonance (NMR); gel permeation chromatography (GPC); dynamic light scattering (DLS); revolutions per minute (RPM); UV-Vis (ultraviolet-visible); high-performance liquid chromatography (HPLC); N,N-dimethylformamide (DMF); N,N-dimethylacetamide (DMAc); methyl tert-butyl ether (MTBE); dimethyl sulfoxide (DMSO); polyethersulfone (PES); polydispersity index (PDI); sarcosine N-carboxyanhydride (Sar NCA); polysorbate 20 (PS20); polysorbate 80 (PS80); poloxamer 188 (PO188); phosphate buffered saline (PBS); polyethylene glycol (PEG).

In the Examples, unless otherwise stated, short-hand names for certain compositions are used. For example, "Octadecyl-NH-poly(Sar$_{15}$)" and "Octadecyl-Sar15" are short-hand for octadecyl hydrocarbon chain covalently attached via an amide bond to a poly(sarcosine) chain with 15 repeating units terminating in a hydrogen, as depicted in the following structure:

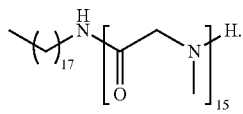

In another example, "Dihexyl-N-poly(Sar$_{15}$)" and "Dihexyl-Sar15" are short-hand for two hexyl hydrocarbon chains covalently attached via an amide bond to a poly(sarcosine) chain with 15 repeating units terminating in a hydrogen, as depicted in the following structure:

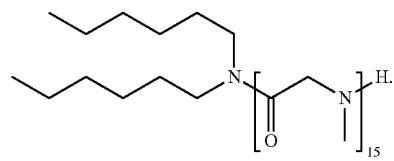

In another example, "N-Butyl-NH-poly(Sar$_{30}$)-Lauroyl" and "Butyl-Sar30-Lauroyl" are short-hand for an N-butyl hydrocarbon chain covalently attached via an amide bond to a poly(sarcosine) chain with 30 repeating units terminating in an amide bond to a saturated hydrocarbon with lauroyl hydrocarbon chain, as depicted in the following structure:

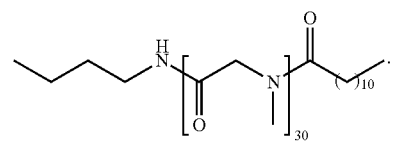

1. Analytical Methods

The following analytical methods were used to characterize the compounds of the present disclosure.

(IR) Spectroscopy—All samples were analyzed using a PerkinElmer Spectrum 100 FT-IR Spectrometer equipped with Universal ATR Sampling Accessory (Diamond/ZnSe). When using IR to monitor a reaction, an aliquot of approximately 100 μL was taken and measured directly. Solid samples were measured without further manipulation.

NMR Spectroscopy—All samples were analyzed in a 400 MHz spectrometer with the following parameters: 45° pulse, 2 second acquisition time, 5 second recycle delay, with 16-32 transients.

GPC Analysis—Samples were analyzed using a Shimadzu LC-20AD pump connected in series to: 2×PSS GRAM analytical 100 Å, 8×300 mm, 10 μm columns; 1×PSS GRAM analytical 1000 Å, 8×300 mm, 10 μm column; a Wyatt TREOS II Light Scattering Detector, and a Wyatt Optilab T-rEX refractive index detector. A mobile phase of DMF supplemented with LiBr (50 mM) at a flow rate of 1.0 mL was used to elute the analytes. The temperature of the columns was maintained at 45° C. Typically, run times of 45 minutes were employed.

HPLC Analysis—Samples were analyzed using a Shimadzu LC-20AT pump connected to a Shimadzu SPD-20A UV-Vis detector. The column used was a Waters Ultrahydrogel DP 120 Å, 6 μm, 7.8 mm×300 mm. A mobile phase of 80:20 (v/v) methanol: water supplemented with 0.1% (v/v) trifluoroacetic acid at a flow rate of 1.0 mL was used to elute the analytes. Samples were prepared at 1 mg/mL in the mobile phase and the wavelength of the detector was set to 220 nm and 225 nm. Typically, run times of 15 minutes were employed.

General Procedure for Shake Stability Assay—The following is a general procedure for this assay and modifications to protein, concentrations, amounts, times, and temperatures are noted when applicable. Stock solutions of a protein (e.g., IgG or BSA) at 40 mg/mL, and each polymer excipient at 2 mg/mL were prepared in phosphate buffer (25 mM sodium phosphate buffer, 150 mM NaCl, pH 5.0) and then filtered through a syringe-driven 0.22 μm PES filter. For each stability assay, an applicable amount of protein, polymer excipient, and phosphate buffer were combined to a final volume of 1.5 mL unless otherwise noted. For example, 750 μL of 40 mg/mL protein stock, 75 μL of 2 mg/mL polymer excipient stock, and 675 μL of phosphate buffer were combined for assays with a protein concentration of 20 mg/mL and polymer excipient concentration of 0.1 mg/mL. Stability assays solutions were prepared in a 2 mL clear serum vial (USP Type 1 borosilicate glass, 15×32 mm, 13 mm crimp) and capped with a stopper (bromobutyl rubber stopper, 13 mm). The vials were placed in an orbital shaker set to 37° C. and 120 RPM. At each time point a 150 μL aliquot was transferred to a 96-well plate (Greiner Bio-One, Sensoplate microplate, glass bottom, black). Data was collected on a Dynamic Light Scattering (DLS) instrument (Wyatt Technology, DynaPro Plate Reader III) with the following parameters: 1 second acquisition time, 5 acquisitions, 25° C. Data were processed with DYNAMICS (Wyatt Technology, v8.0).

General Procedure for Temperature Ramp Study—The following is a general procedure for this assay and modifications to protein, concentrations, amounts, times, and temperatures are noted when applicable. Stock solutions of protein (e.g., IgG or BSA) at 2 mg/mL, and each polymer excipient at 2 mg/mL were prepared in phosphate buffer (25 mM sodium phosphate buffer, 150 mM NaCl, pH 7.0) and then filtered through a syringe-driven 0.22 μm PES filter. For each temperature ramp assay, an applicable amount of protein, polymer excipient, and phosphate buffer were combined in a scintillation vial to a final volume of 0.8 mL unless otherwise noted. For example, 400 μL of 2 mg/mL protein stock, 400 μL of 2 mg/mL polymer excipient stock, were combined for assays with a protein concentration of 1 mg/mL and polymer excipient concentration of 1 mg/mL. An aliquot (35 μL) of each sample was transferred to a 384-well plate (Aurora, round 384 IQ-LV, black cycloolefin polymer, 188 micron clear film bottom, ultra flat) and then sealed with clear sealing tape. Data was collected on a DLS instrument (Wyatt Technology, DynaPro Plate Reader III) with the following parameters: 1 second acquisition time, 5 acquisitions, temperature ramp from 25° C. to 80° C. at a rate of 0.05° C./minute. Data was processed with DYNAMICS (Wyatt Technology, v8.0).

General Procedure for Temperature Hold Study—The following is a general procedure for this assay and modifications to protein, concentrations, amounts, times, and temperatures are noted when applicable. Stock solutions of protein (e.g., IgG or BSA) at 40 mg/mL, and each polymer excipient at 2 mg/mL were prepared in phosphate buffer (25 mM sodium phosphate buffer, 150 mM NaCl, pH 7.0) and then filtered through a syringe-driven 0.22 μm PES filter. For each temperature hold assay, an applicable amount of protein, polymer excipient, and phosphate buffer were combined in a scintillation vial to a final volume of 0.8 mL unless otherwise noted. For example, 400 μL of 40 mg/mL protein stock, 400 μL of 2 mg/mL polymer excipient stock, were combined for assays with a protein concentration of 20 mg/mL and polymer excipient concentration of 1 mg/mL. An aliquot (35 μL) of each sample was transferred to a 384-well plate (Aurora, round 384 IQ-LV, black cycloolefin polymer, 188 micron clear film bottom, ultra flat) and then sealed with clear sealing tape. Data was collected on a DLS instrument (Wyatt Technology, DynaPro Plate Reader III) with the following parameters: 1 second acquisition time, 5 acquisitions, temperature held at 50° C. for 92 hours. Data was processed with DYNAMICS (Wyatt Technology, v8.0).

General Procedure for Lyophilization Study—The following is a general procedure for this assay and modifications to protein, concentrations, amounts, times, and temperatures are noted when applicable. Stock solutions of protein (e.g., IgG, abatacept, cetuximab, etc.) at 0.5 mg/mL, and each polymer excipient at a range of 0.1 to 2.0 mg/mL were prepared in phosphate buffer (25 mM sodium phosphate buffer, pH 7.0). For each lyophilization study, an applicable amount of protein, polymer excipient, and phosphate buffer were combined in an Eppendorf tube to a final volume of 1.0 mL unless otherwise noted. For example, 100 μL of 5 mg/mL protein stock, 250 μL of 2 mg/mL polymer excipient stock and 650 μL phosphate buffer, were combined for assays with a protein concentration of 0.5 mg/mL and polymer excipient concentration of 0.5 mg/mL. Each aliquot was then filtered through a syringe-driven 0.22 μm PES filter. An aliquot (35 μL) of each sample was transferred to a 384-well plate (Aurora, round 384 IQ-LV, black cycloolefin polymer, 188 micron clear film bottom, ultra flat). Data was collected on a DLS instrument (Wyatt Technology, DynaPro Plate Reader III) with the following parameters: 1 second acquisition time, 5 acquisitions, temperature held at 25° C. Data was processed with DYNAMICS (Wyatt Technology, v8.0). For each solution, 0.2 mL was then placed in a 2 mL serum vial and lyophilized (Frozen for 2 hours at ~30° C.; vacuum at 180-250 mTorr; primary drying at 25° C. for 4 hours; secondary drying at 40° C. for 36 hours). The lyophile was reconstituted with 0.2 mL of filtered deionized water. An aliquot (35 μL) of each sample was transferred to a 384-well plate and the particle size after lyophilization measured as described previously in this paragraph. An image of each well is captured by the DYNAMICS software.

2. Polymer Synthesis Examples

Example 1—Preparation of Neopentyl-NH-poly(Sar$_{15}$)

A 25 mL round-bottom flask was charged with neopentylamine (90 mg, 1.032 mmol, 1 equiv.) and N,N-dimethylacetamide (DMAc) (10 mL). The reaction flask was then placed in a jacketed reaction beaker equipped to a circulating isopropanol/water bath with the temperature set to 15° C. The solution was stirred and allowed to equilibrate for ~10 mins before the addition of sarcosine N-carboxyanhydride (Sar NCA) (1.78 g, 15.5 mmol, 15 equiv.). IR spectroscopy was used to monitor the reaction progression via disappearance of the carbonyl stretches at ~1850 and 1778 cm$^{-1}$. After stirring overnight, the reaction mixture was transferred to a beaker using DMAc (2 mL) to rinse the reaction flask. While stirring vigorously with an overhead stirrer, methyl tert-butyl ether (MTBE) (120 mL, ~10 volumes) was added slowly over 10-15 seconds. The precipitation was stirred for 1-2 mins before the stirring was stopped and the material was allowed to settle before collected via vacuum filtration in a medium porosity fritted glass funnel. The semi-dry material was slurried briefly on the frit with an additional MTBE (60 mL, 5 volumes). The product was dried in vacuum oven at ~50° C. for 2 days to yield 1.07 g (89.9%) of the title compound as a white dense powder. GPC (DMF, 50 mM LiBr) Mn=1,129 Da, Mp=1,158 Da, PDI=1.02; Purity (HPLC)=92.4%.

Example 2—Preparation of Neopentyl-NH-poly(Sar$_{30}$)

Following the general procedure of Example 1 with the following reagent equivalents and amounts: neopentylamine (45 mg, 1 equiv.), sarcosine NCA (1.78 g, 30 equiv.), DMAc (10 mL). This yielded the title compound as a dense white solid (1.09 g, 95.1%). GPC (DMF, 50 mM LiBr) Mn=1,972 Da, Mp=2,038 Da, PDI=1.02; Purity (HPLC)=95.3%.

Example 3—Preparation of Neopentyl-NH-poly(Sar$_{60}$)

Following the general procedure of Example 1 with the following reagent equivalents and amounts: neopentylamine (40 mg, 1 equiv.), sarcosine NCA (3.17 g, 60 equiv.), DMAc (12 mL). This yielded the title compound as a dense white solid (1.89 g, 94.6%). GPC (DMF, 50 mM LiBr) Mn=3,627 Da, Mp=3,668 Da, PDI=1.01; Purity (HPLC)=92.6%.

Example 4—Preparation of Neopentyl-NH-poly(Sar$_{120}$)

Following the general procedure of Example 1 with the following reagent equivalents and amounts: neopentylamine (20 mg, 1 equiv.), sarcosine NCA (3.17 g, 120 equiv.), DMAc (12 mL). This yielded the title compound as a dense white solid (1.84 g, 93.1%). GPC (DMF, 50 mM LiBr) Mn=5,847 Da, Mp=6,017 Da, PDI=1.02; Purity (HPLC)=96.8%.

Example 5—Preparation of Neopentyl-NH-poly(Sar$_{175}$)

Following the general procedure of Example 1 with the following reagent equivalents and amounts: neopentylamine (4 mg, 1 equiv.), sarcosine NCA (924 mg, 175 equiv.), DMAc (2 mL). GPC (DMF, 50 mM LiBr) Mn=6,546 Da, Mp=7,104 Da, PDI=1.04.

Example 6—Preparation of Neopentyl-NH-poly(Sar$_{240}$)

Following the general procedure of Example 1 with the following reagent equivalents and amounts: neopentylamine (10 mg, 1 equiv.), sarcosine NCA (3.17 g, 240 equiv.), DMAc (12 mL). This yielded the title compound as a dense off-white solid (0.680 g, 34.6%). GPC (DMF, 50 mM LiBr) Mn=7,842 Da, Mp=8,481 Da, PDI=1.06; Purity (HPLC)=91.1%.

Example 7—Preparation of Neopentyl-NH-poly(Sar$_{480}$)

Following the general procedure of Example 1 with the following reagent equivalents and amounts: neopentylamine (5 mg, 1 equiv.), sarcosine NCA (3.17 g, 480 equiv.), DMAc (12 mL). This yielded the title compound as a dense off-white solid (1.90 g, 96.8%). GPC (DMF, 50 mM LiBr) Mn=8,036 Da, Mp=9,742 Da, PDI=1.11; Purity (HPLC)=94.4%.

Example 8—Preparation of 4-Methoxybenzyl-NH-poly(Sar$_{15}$)

A 25 mL round-bottom flask was charged with 4-methoxybenzylamine (140 mg, 1.02 mmol, 1 equiv.) and N,N-dimethylacetamide (DMAc) (12 mL). The reaction flask was then placed in a jacketed reaction beaker equipped to a circulating isopropanol/water bath with the temperature set to 15° C. The solution was stirred and allowed to equilibrate for ~10 mins before the addition of sarcosine N-carboxyanhydride (Sar NCA) (1.76 g, 15.3 mmol, 15 equiv.). IR spectroscopy was used to monitor the reaction progression via disappearance of the carbonyl stretches at ~1850 and 1778 cm$^{-1}$. After stirring overnight, the reaction mixture was transferred to a beaker using DMAc (5 mL) to rinse the reaction flask. While stirring vigorously with an overhead stirrer, methyl tert-butyl ether (MTBE) (120 mL, ~7 volumes) was added slowly over 10-15 seconds. The precipitation was stirred for 1-2 mins before the stirring was stopped and the material was allowed to settle before collected via vacuum filtration in a medium porosity fritted glass funnel. The semi-dry material was slurried briefly on the frit with an additional MTBE (50 mL). The product was dried in vacuum oven at ~50° C. for 2 days to yield 1.21 g (98.6%) of the title compound as a dense white powder. GPC (DMF, 50 mM LiBr) Mn=1,261 Da, Mp=1,341 Da, PDI=1.02; Purity (HPLC)=94.7%.

Example 9—Preparation of 4-Methoxybenzyl-NH-poly(Sar$_{30}$)

Following the general procedure of Example 8 with the following reagent equivalents and amounts: 4-methoxybenzylamine (70 mg, 1 equiv.), sarcosine NCA (1.76 g, 30 equiv.), DMAc (12 mL). This yielded the title compound as a dense white solid (1.03 g, 89.0%). GPC (DMF, 50 mM LiBr) Mn=2,212 Da, Mp=2,278 Da, PDI=1.01; Purity (HPLC)=97.4%.

Example 10—Preparation of Octyl-NH-poly(Sar$_{15}$)

A 25 mL round-bottom flask was charged with octylamine (130 mg, 1.01 mmol, 1 equiv.) and N,N-dimethylacetamide (DMAc) (12 mL). The reaction flask was then placed in a jacketed reaction beaker equipped to a circulating isopropanol/water bath with the temperature set to 15° C. The solution was stirred and allowed to equilibrate for ~10 mins before the addition of sarcosine N-carboxyanhydride (Sar NCA) (1.74 g, 15.2 mmol, 15 equiv.). IR spectroscopy was used to monitor the reaction progression via disappearance of the carbonyl stretches at ~1850 and 1778 cm$^{-1}$. After stirring overnight, the reaction mixture was transferred to a beaker using DMAc (5 mL) to rinse the reaction flask. While stirring vigorously with an overhead stirrer, methyl tert-butyl ether (MTBE) (120 mL, ~7 volumes) was added slowly over 15-20 seconds. The precipitation was stirred for 1-2 mins before the stirring was stopped and the material was allowed to settle before collected via vacuum filtration in a medium porosity fritted glass funnel. The semi-dry material was slurried briefly on the frit with an additional MTBE (50 mL). The material was dried in vacuum oven at ~50° C. for 2 days. This yielded 993 mg (82.8%) of the title compound as a dense white powder. GPC (DMF, 50 mM LiBr) Mn=1,048 Da, Mp=1,149 Da, PDI=1.03; Purity (HPLC)=98.2%.

Example 11—Preparation of Octyl-NH-poly(Sar$_{30}$)

Following the general procedure of Example 10 with the following reagent equivalents and amounts: octylamine (65 mg, 1 equiv.), sarcosine NCA (1.74 g, 30 equiv.), DMAc (12 mL). This yielded the title compound as a dense white solid (1.02 g, 89.5%). GPC (DMF, 50 mM LiBr) Mn=1,995 Da, Mp=2,041 Da, PDI=1.01; Purity (HPLC)=97.5%.

Example 12—Preparation of Decyl-NH-poly(Sar$_{15}$)

A 25 mL round-bottom flask was charged with decylamine (154 mg, 0.979 mmol, 1 equiv.) and N,N-dimethylacetamide (DMAc) (12 mL). The reaction flask was then placed in a jacketed reaction beaker equipped to a circulating isopropanol/water bath with the temperature set to 15° C. The solution was stirred and allowed to equilibrate for ~10 mins before the addition of sarcosine N-carboxyanhydride (Sar NCA) (1.69 g, 14.7 mmol, 15 equiv.). IR spectroscopy was used to monitor the reaction progression via disappearance of the carbonyl stretches at ~1850 and 1778 cm$^{-1}$. After stirring overnight, the reaction mixture was transferred to a beaker using DMAc (2×2.5 mL) to rinse the reaction flask. While stirring vigorously with an overhead stirrer, methyl tert-butyl ether (MTBE) (120 mL, ~7 volumes) was added slowly over 15-20 seconds. The precipitation was stirred for 1-2 mins before the stirring was stopped and the material was allowed to settle before collected via vacuum filtration in a medium porosity fritted glass funnel. The semi-dry material was slurried briefly on the frit with an additional MTBE (50 mL). The material was dried in vacuum oven at ~50° C. for 2 days. This yielded 145 mg (12.1%) of the title compound as a dense white powder. GPC (DMF, 50 mM LiBr) Mn=1,148 Da, Mp=1,181 Da, PDI=1.01; Purity (HPLC)=98.5%.

Example 13—Preparation of Decyl-NH-poly(Sar$_{30}$)

Following the general procedure of Example 12 with the following reagent equivalents and amounts: decylamine (77 mg, 1 equiv.), sarcosine NCA (1.69 g, 30 equiv.), DMAc (12 mL). This yielded the title compound as a dense white solid (800 mg, 71.4%). GPC (DMF, 50 mM LiBr) Mn=1,895 Da, Mp=1,922 Da, PDI=1.01; Purity (HPLC)=97.6%.

Example 14—Preparation of Dodecyl-NH-poly(Sar$_{15}$)

A 25 mL round-bottom flask was charged with dodecylamine (180 mg, 0.971 mmol, 1 equiv.) and N,N-dimethylacetamide (DMAc) (12 mL). The reaction flask was then placed in a jacketed reaction beaker equipped to a circulating isopropanol/water bath with the temperature set to 25° C. The solution was stirred and allowed to equilibrate for ~10 mins before the addition of sarcosine N-carboxyanhydride (Sar NCA) (1.68 g, 14.6 mmol, 15 equiv.). IR spectroscopy was used to monitor the reaction progression via disappearance of the carbonyl stretches at ~1850 and 1778 cm$^{-1}$. After stirring overnight, the reaction mixture was transferred to a beaker using DMAc (2×2.5 mL) to rinse the reaction flask. While stirring vigorously with an overhead stirrer, methyl tert-butyl ether (MTBE) (120 mL, ~7 volumes) was added slowly over 15-20 seconds. The precipitation was stirred for 1-2 mins before the stirring was stopped and the material was allowed to settle before collected via vacuum filtration in a medium porosity fritted glass funnel. The semi-dry material was slurried briefly on the frit with an additional MTBE (50 mL). The material was dried in vacuum oven at ~50° C. for 2 days. This yielded 1.15 g (94.5%) of the title compound as a dense white powder. GPC (DMF, 50 mM LiBr) Mn=1,178 Da, Mp=1,251 Da, PDI=1.02; Purity (HPLC)=98.9%.

Example 15—Preparation of Dodecyl-NH-poly(Sar$_{20}$)

Following the general procedure of Example 14 with the following reagent equivalents and amounts: dodecylamine (180 mg, 1 equiv.), sarcosine NCA (2.24 g, 20 equiv.), DMAc (15 mL). This yielded the title compound as a dense white solid (1.34 g, 85.8%). GPC (DMF, 50 mM LiBr) Mn=1,358 Da, Mp=1,411 Da, PDI=1.01; Purity (HPLC) =98.2%.

Example 16—Preparation of Dodecyl-NH-poly(Sar$_{30}$)

Following the general procedure of Example 14 with the following reagent equivalents and amounts: dodecylamine (90 mg, 1 equiv.), sarcosine NCA (1.68 g, 30 equiv.), DMAc (12 mL). This yielded the title compound as a dense white solid (1.02 g, 90.7%). GPC (DMF, 50 mM LiBr) Mn=2,077 Da, Mp=2,132 Da, PDI=1.01; Purity (HPLC)=97.8%.

Example 17—Preparation of Tetradecyl-NH-poly(Sar$_{15}$)

A 25 mL round-bottom flask was charged with tetradecylamine (210 mg, 0.984 mmol, 1 equiv.) and N,N-dimethylacetamide (DMAc) (12 mL). The reaction flask was then placed in a jacketed reaction beaker equipped to a circulating isopropanol/water bath with the temperature set to 25° C. The solution was stirred and allowed to equilibrate for ~10 mins before the addition of sarcosine N-carboxyanhydride (Sar NCA) (1.70 g, 14.8 mmol, 15 equiv.). IR spectroscopy was used to monitor the reaction progression via disappearance of the carbonyl stretches at ~1850 and 1778 cm$^{-1}$. After stirring overnight, the reaction mixture was transferred to a beaker using DMAc (2×2.5 mL) to rinse the reaction flask. While stirring vigorously with an overhead stirrer, methyl tert-butyl ether (MTBE) (120 mL, ~7 volumes) was added slowly over 15-20 seconds. The precipitation was stirred for 1-2 mins before the stirring was stopped and the material was allowed to settle before collected via vacuum filtration in a medium porosity fritted glass funnel. The semi-dry material was slurried briefly on the frit with an additional MTBE (50 mL). The material was dried in vacuum oven at ~50° C. for 2 days. This yielded 1.07 g (85.0%) of the title compound as a dense white powder. GPC (DMF, 50 mM LiBr) Mn=1,187 Da, Mp=1,225 Da, PDI=1.01; Purity (HPLC)=98.5%.

Example 18—Preparation of Tetradecyl-NH-poly($Sar_{20}$)

Following the general procedure of Example 17 with the following reagent equivalents and amounts: tetradecylamine (250 mg, 1 equiv.), sarcosine NCA (2.70 g, 20 equiv.), DMAc (15 mL). This yielded the title compound as a dense white solid (1.81 g, 94.5%). GPC (DMF, 50 mM LiBr) Mn=1,418 Da, Mp=1,475 Da, PDI=1.01; Purity (HPLC)=97.3%.

Example 19—Preparation of Tetradecyl-NH-poly($Sar_{30}$)

Following the general procedure of Example 17 with the following reagent equivalents and amounts: tetradecylamine (105 mg, 1 equiv.), sarcosine NCA (1.70 g, 30 equiv.), DMAc (12 mL). This yielded the title compound as a dense white solid (1.09 g, 94.5%). GPC (DMF, 50 mM LiBr) Mn=1,989 Da, Mp=2,025 Da, PDI=1.01; Purity (HPLC)=97.3%.

Example 20—Preparation of Hexadecyl-NH-poly($Sar_{15}$)

A 25 mL round-bottom flask was charged with hexadecylamine (320 mg, 1.33 mmol, 1 equiv.) and N,N-dimethylacetamide (DMAc) (64 mL). The mixture was heated with a heat gun while swirling by hand and then submerged in a sonicating water bath until a clear solution was obtained. The reaction flask was then placed in a jacketed reaction beaker equipped to a circulating isopropanol/water bath with the temperature set to 25° C. The solution was stirred and allowed to equilibrate for ~10 mins before the addition of sarcosine N-carboxyanhydride (Sar NCA) (2.29 g, 19.9 mmol, 15 equiv.). IR spectroscopy was used to monitor the reaction progression via disappearance of the carbonyl stretches at ~1850 and 1778 $cm^{-1}$. After stirring overnight, the reaction mixture was transferred to a beaker using DMAc (4 mL) to rinse the reaction flask. While stirring vigorously with an overhead stirrer, methyl tert-butyl ether (MTBE) (340 mL, 5 volumes) was added slowly over 15-20 seconds. The precipitation was stirred for 3-5 mins before the stirring was stopped and the material was allowed to settle before collected via vacuum filtration in a medium porosity fritted glass funnel. The semi-dry material was slurried briefly on the frit with an additional MTBE (2×50 mL). The material was dried in vacuum oven at ~50° C. for 2 days. The crude product was dissolved in methanol (25 mL) and then precipitated by the addition of MTBE (100 mL, 4 volumes) while stirring vigorously. The product was collected via vacuum filtration in a medium porosity fritted glass funnel and then dried in a vacuum oven at ~50° C. for 2 days. This yielded 224 mg (12.9%) of the title compound as a white dense powder. GPC (DMF, 50 mM LiBr) Mn=1,247 Da, Mp=1,322 Da, PDI=1.01; Purity (HPLC)=97.7%.

Example 21—Preparation of Hexadecyl-NH-poly($Sar_{30}$)

Following the general procedure of Example 20 with the following reagent equivalents and amounts: hexadecylamine (160 mg, 1 equiv.), sarcosine NCA (2.29 g, 30 equiv.), DMAc (47 mL). This yielded the title compound as a dense white solid (0.767 g, 48.8%). GPC (DMF, 50 mM LiBr) Mn=2,003 Da, Mp=2,080 Da, PDI=1.01; Purity (HPLC) = 97.9%.

Example 22—Preparation of Hexadecyl-NH-poly($Sar_{60}$)

Following the general procedure of Example 20 with the following reagent equivalents and amounts: hexadecylamine (80 mg, 1 equiv.), sarcosine NCA (2.29 g, 60 equiv.), DMAc (20 mL). This yielded the title compound as a dense white solid (1.39 g, 93.1%). GPC (DMF, 50 mM LiBr) Mn=3,470 Da, Mp=3,534 Da, PDI=1.01; Purity (HPLC)=99.8%.

Example 23—Preparation of Hexadecyl-NH-poly($Sar_{120}$)

Following the general procedure of Example 20 with the following reagent equivalents and amounts: hexadecylamine (40 mg, 1 equiv.), sarcosine NCA (2.29 g, 120 equiv.), DMAc (16 mL). This yielded the title compound as a dense white solid (1.35 g, 92.9%). GPC (DMF, 50 mM LiBr) Mn=5,480 Da, Mp=5,572 Da, PDI=1.02; Purity (HPLC)=99.9%.

Example 24—Preparation of Hexadecyl-NH-poly($Sar_{240}$)

Following the general procedure of Example 20 with the following reagent equivalents and amounts: hexadecylamine (20 mg, 1 equiv.), sarcosine NCA (2.29 g, 240 equiv.), DMAc (16 mL). This yielded the title compound as a dense white solid (1.34 g, 93.5%). GPC (DMF, 50 mM LiBr) Mn=7,132 Da, Mp=7,898 Da, PDI=1.07; Purity (HPLC)=99.9%.

Example 25—Preparation of Hexadecyl-NH-poly($Sar_{480}$)

Following the general procedure of Example 20 with the following reagent equivalents and amounts: hexadecylamine (10 mg, 1 equiv.), sarcosine NCA (2.29 g, 480 equiv.), DMAc (16 mL). This yielded the title compound as a dense white solid (1.24 g, 87.1%). GPC (DMF, 50 mM LiBr) Mn=7,922 Da, Mp=9,265 Da, PDI=1.10; Purity (HPLC)=99.9%.

Example 26—Preparation of Octadecyl-NH-poly($Sar_{15}$)

A 25 mL round-bottom flask was charged with octadecylamine (270 mg, 1.00 mmol, 1 equiv.) and N,N-dimethylacetamide (DMAc) (10 mL). The mixture was heated with a heat gun while swirling by hand and then submerged in a sonicating water bath until a clear solution was obtained. The reaction flask was then placed in a jacketed reaction beaker equipped to a circulating isopropanol/water bath with the temperature set to 30° C. The solution was stirred and allowed to equilibrate for ~5 mins before the addition of sarcosine N-carboxyanhydride (Sar NCA) (1.73 g, 15.0 mmol, 15 equiv.). IR spectroscopy was used to monitor the reaction progression via disappearance of the carbonyl stretches at ~1850 and 1778 $cm^{-1}$. After stirring 3 hrs, the reaction mixture was transferred to a beaker using DMAc (4 mL) to rinse the reaction flask. While stirring vigorously with an overhead stirrer, methyl tert-butyl ether (MTBE)

(340 mL, 5 volumes) was added slowly over 15-20 seconds. The precipitation was stirred for 3-5 mins before the stirring was stopped and the material was allowed to settle before collected via vacuum filtration in a medium porosity fritted glass funnel. The semi-dry material was slurried briefly on the frit with an additional MTBE (2×50 mL). The material was dried in vacuum oven at ~50° C. for 2 days. The crude product was dissolved in methanol (25 mL) and then precipitated by the addition of MTBE (100 mL, 4 volumes) while stirring vigorously. The product was collected via vacuum filtration in a medium porosity fritted glass funnel and then dried in a vacuum oven at ~50° C. for 2 days. This yielded 1.08 g (80.8%) of the title compound as a white dense powder. GPC (DMF, 50 mM LiBr) Mn=1,197 Da, Mp=1216 Da, PDI=1.01; Purity (HPLC)=96.7%.

Example 27—Preparation of Octadecyl-NH-poly(Sar$_{30}$)

Following the general procedure of Example 26 with the following reagent equivalents and amounts: octadecylamine (135 mg, 1 equiv.), sarcosine NCA (1.73 g, 30 equiv.), DMAc (10 mL). This yielded 1.18 g (91.1%) of the title compound as a dense white solid. GPC (DMF, 50 mM LiBr) Mn=1,911 Da, Mp=1,905 Da, PDI=1.01; Purity (HPLC)=95.7%.

Example 28—Preparation of Oleyl-NH-poly(Sar$_{30}$)

A 100 mL round-bottom flask was charged with oleylamine (436 mg, 1.63 mmol, 1 equiv.) and N,N-dimethylacetamide (DMAc) (40 mL). The mixture was heated with a heat gun while swirling by hand and then submerged in a sonicating water bath until a clear and colorless solution was obtained. The reaction flask was then placed in a jacketed reaction beaker equipped to a circulating isopropanol/water bath with the temperature set to 15° C. The solution was stirred and allowed to equilibrate for ~10 mins before the addition of sarcosine N-carboxyanhydride (Sar NCA) (5.63 g, 48.9 mmol, 30 equiv.). IR spectroscopy was used to monitor the reaction progression via disappearance of the carbonyl stretches at ~1850 and 1778 cm$^{-1}$. After stirring overnight, the reaction mixture was transferred to a beaker using DMAc (2×2.5 mL) to rinse the reaction flask. While stirring vigorously with an overhead stirrer, methyl tert-butyl ether (MTBE) (225 mL, 5 volumes) was added slowly over 30-60 seconds. The precipitation was stirred for 3-5 mins before the stirring was stopped and the material was allowed to settle before collected via vacuum filtration in a medium porosity fritted glass funnel. The semi-dry material was slurried briefly on the frit with an additional MTBE (50 mL×2, 2 volumes total). The product was dried in vacuum oven at ~50° C. for 2 days to yield 3.60 g (92.1%) of the title compound as a white dense powder. GPC (DMF, 50 mM LiBr) Mn=2,034 Da, Mp=2,055 Da, PDI=1.01; Purity (HPLC)=97.7%.

Example 29—Preparation of Oleyl-NH-poly(Sar$_{10}$)

Following the general procedure of Example 28 with the following reagent equivalents and amounts: oleylamine (300 mg, 1 equiv.), sarcosine NCA (1.29 g, 10 equiv.). This yielded the title compound as a dense white solid (0.703 g, 64.1%). GPC (DMF, 50 mM LiBr) Mn=930 Da, Mp=965 Da, PDI=1.01; Purity (HPLC)=93.5%.

Example 30—Preparation of Oleyl-NH-poly(Sar$_{15}$)

Following the general procedure of Example 28 with the following reagent equivalents and amounts: oleylamine (200 mg, 1 equiv.), sarcosine NCA (1.29 g, 15 equiv.). This yielded the title compound as a dense white solid (0.850 g, 85.3%). GPC (DMF, 50 mM LiBr) Mn=1,249 Da, Mp=1,272 Da, PDI=1.01; Purity (HPLC)=98.3%.

Example 31—Preparation of Oleyl-NH-poly(Sar$_{20}$)

Following the general procedure of Example 28 with the following reagent equivalents and amounts: oleylamine (150 mg, 1 equiv.), sarcosine NCA (1.29 g, 20 equiv.). This yielded the title compound as a dense white solid (0.853 g, 90.0%). GPC (DMF, 50 mM LiBr) Mn=1,485 Da, Mp=1,518 Da, PDI=1.01; Purity (HPLC)=98.4%.

Example 32—Preparation of Oleyl-NH-poly(Sar$_{45}$)

Following the general procedure of Example 28 with the following reagent equivalents and amounts: oleylamine (66.6 mg, 1 equiv.), sarcosine NCA (1.29 g, 45 equiv.). This yielded the title compound as a dense white solid (0.850 g, 98.5%). GPC (DMF, 50 mM LiBr) Mn=2,736 Da, Mp=2,766 Da, PDI=1.01; Purity (HPLC)=97.7%.

Example 33—Preparation of Oleyl-NH-poly(Sar$_{60}$)

Following the general procedure of Example 28 with the following reagent equivalents and amounts: oleylamine (50 mg, 1 equiv.), sarcosine NCA (1.29 g, 60 equiv.). This yielded the title compound as a dense white solid (0.817 g, 96.4%). GPC (DMF, 50 mM LiBr) Mn=3,637 Da, Mp=3,682 Da, PDI=1.02; Purity (HPLC)=98.0%.

Example 34—Preparation of Oleyl-NH-poly(Sar$_{120}$)

Following the general procedure of Example 28 with the following reagent equivalents and amounts: oleylamine (25 mg, 1 equiv.), sarcosine NCA (1.29 g, 120 equiv.). This yielded the title compound as a dense white solid (0.817 g, 99.4%). GPC (DMF, 50 mM LiBr) Mn=5,389 Da, Mp=5,684 Da, PDI=1.05; Purity (HPLC)=97.%.

Example 35—Preparation of Dihexyl-N-poly(Sar$_{15}$)

A 25 mL round-bottom flask was charged with dihexylamine (184 mg, 0.993 mmol, 1 equiv.) and N,N-dimethylacetamide (DMAc) (10 mL). The reaction flask was then placed in a jacketed reaction beaker equipped to a circulating isopropanol/water bath with the temperature set to 18° C. The solution was stirred and allowed to equilibrate for ~5 mins before the addition of sarcosine N-carboxyanhydride (Sar NCA) (1.71 g, 14.9 mmol, 15 equiv.). IR spectroscopy was used to monitor the reaction progression via disappearance of the carbonyl stretches at ~1850 and 1778 cm$^{-1}$. After stirring overnight, the reaction mixture was transferred to a beaker using DMAc (2×2 mL) to rinse the reaction flask. While stirring vigorously with an overhead stirrer, methyl tert-butyl ether (MTBE) (100 mL, ~7 volumes) was added slowly over 5-10 seconds. The precipitation was stirred for 1-2 mins before the stirring was stopped and the material was allowed to settle before collected via vacuum filtration in a medium porosity fritted glass funnel. The semi-dry material was slurried briefly on the frit with an additional MTBE (35 mL). The material was dried in vacuum oven at ~50° C. for 2 days. This yielded 978 mg (78.8%) of the title compound as a dense white powder. GPC (DMF, 50 mM LiBr) Mn=1,209 Da, Mp=1,234 Da, PDI=1.01; Purity (HPLC)=98.6%.

Example 36—Preparation of Dihexyl-N-poly(Sar$_{30}$)

Following the general procedure of Example 35 with the following reagent equivalents and amounts: dihexylamine (92 mg, 1 equiv.), sarcosine NCA (1.71 g, 30 equiv.), DMAc (10 mL). This yielded the title compound as a dense white solid (890 mg, 77.4%). GPC (DMF, 50 mM LiBr) Mn=1,861 Da, Mp=1,904 Da, PDI=1.01; Purity (HPLC)=96.8%.

Example 37—Preparation of Dioctyl-N-poly(Sar$_{15}$)

A 25 mL round-bottom flask was charged with dioctylamine (240 mg, 0.994 mmol, 1 equiv.) and N,N-dimethylacetamide (DMAc) (10 mL). The reaction flask was then placed in a jacketed reaction beaker equipped to a circulating isopropanol/water bath with the temperature set to 18° C. The solution was stirred and allowed to equilibrate for ~5 mins before the addition of sarcosine N-carboxyanhydride (Sar NCA) (1.71 g, 14.9 mmol, 15 equiv.). IR spectroscopy was used to monitor the reaction progression via disappearance of the carbonyl stretches at ~1850 and 1778 cm$^{-1}$. After stirring overnight, the reaction mixture was transferred to a beaker using DMAc (2×2 mL) to rinse the reaction flask. While stirring vigorously with an overhead stirrer, methyl tert-butyl ether (MTBE) (100 mL, ~7 volumes) was added slowly over 5-10 seconds. The precipitation was stirred for 1-2 mins before the stirring was stopped and the material was allowed to settle before collected via vacuum filtration in a medium porosity fritted glass funnel. The semi-dry material was slurried briefly on the frit with an additional MTBE (35 mL). The material was dried in vacuum oven at ~50° C. for 2 days. This yielded 896 mg (69.0%) of the title compound as a dense white powder. GPC (DMF, 50 mM LiBr) Mn=1,242 Da, Mp=1,265 Da, PDI=1.01; Purity (HPLC)=98.0%.

Example 38—Preparation of Dioctyl-N-poly(Sar$_{30}$)

Following the general procedure of Example 37 with the following reagent equivalents and amounts: dioctylamine (120 mg, 1 equiv.), sarcosine NCA (1.71 g, 30 equiv.), DMAc (10 mL). This yielded the title compound as a dense white solid (860 mg, 72.9%). GPC (DMF, 50 mM LiBr) Mn=1,879 Da, Mp=1,939 Da, PDI=1.01; Purity (HPLC)=98.3%.

Example 39—Preparation of Didodecyl-N-poly(Sar$_{30}$)

A 25 mL round-bottom flask was charged with didodecylamine (150 mg, 0.424 mmol, 1 equiv.) and N,N-dimethylacetamide (DMAc) (10 mL). The reaction flask was then placed in a jacketed reaction beaker equipped to a circulating isopropanol/water bath with the temperature set to 40° C. The solution was stirred and allowed to equilibrate for ~5 mins before the addition of sarcosine N-carboxyanhydride (Sar NCA) (1.46 g, 12.7 mmol, 30 equiv.). IR spectroscopy was used to monitor the reaction progression via disappearance of the carbonyl stretches at ~1850 and 1778 cm$^{-1}$. After stirring for 2 hours, the reaction mixture was transferred to a beaker using DMAc (2×2 mL) to rinse the reaction flask. While stirring vigorously with an overhead stirrer, methyl tert-butyl ether (MTBE) (100 mL, ~7 volumes) was added slowly over 5-10 seconds. The precipitation was stirred for 1-2 mins before the stirring was stopped and the material was allowed to settle before collected via vacuum filtration in a medium porosity fritted glass funnel. The semi-dry material was slurried briefly on the frit with an additional MTBE (35 mL). The material was dried in vacuum oven at ~50° C. for 2 days. This yielded 1.01 mg (95.8%) of the title compound as a dense white powder. GPC (DMF, 50 mM LiBr) Mn=2,016 Da, Mp=2,089 Da, PDI=1.01; Purity (HPLC)=95.8%.

Example 40—Preparation of Didodecyl-N-poly(Sar$_{60}$)

Following the general procedure of Example 39 with the following reagent equivalents and amounts: didodecylamine (55 mg, 1 equiv.), sarcosine NCA (1.07 g, 60 equiv.), DMAc (10 mL). This yielded the title compound as a dense white solid (706 mg, 98.3%). GPC (DMF, 50 mM LiBr) Mn=3,273 Da, Mp=3,382 Da, PDI=1.02; Purity (HPLC)=98.1%.

Example 41—Preparation of N-Butyl-NH-poly(Sar$_{30}$)-Lauroyl

A 25 mL round-bottom flask was charged with N-butylamine (30 mg, 0.410 mmol, 1 equiv.) and N,N-dimethylacetamide (DMAc) (5 mL). The reaction flask was then placed in a jacketed reaction beaker equipped to a circulating isopropanol/water bath with the temperature set to 15° C. The solution was stirred and allowed to equilibrate for ~5 mins before the addition of sarcosine N-carboxyanhydride (Sar NCA) (1.42 g, 12.3 mmol, 30 equiv.). IR spectroscopy was used to monitor the reaction progression via disappearance of the carbonyl stretches at ~1850 and 1778 cm$^{-1}$. After stirring for 5 hours, the Sar NCA was completely consumed, and the temperature of the reaction was raised to 25° C. Triethylamine (572 µL, 4.10 mmol, 10 equiv.) was added to the reaction, followed by lauroyl chloride (0.949 mL, 4.102 mmol, 10 equiv.). The reaction was stirred overnight before filtering through a medium porosity fritted glass funnel and rinsing with DMAc (~4 mL). The reaction mixture was transferred to a beaker using DMAc (2×1 mL) to rinse the filtration flask. While stirring vigorously with an overhead stirrer, methyl tert-butyl ether (MTBE) (80 mL, ~7 volumes) was added slowly over 5-10 seconds. The precipitation was stirred for 1-2 mins before the stirring was stopped and the material was allowed to settle before collected via vacuum filtration in a medium porosity fritted glass funnel. The semi-dry material was slurried briefly on the frit with an additional MTBE (25 mL). The material was dried in vacuum oven at ~50° C. for 2 days. This yielded 708 mg (72.3%) of the title compound as a dense powder. GPC (DMF, 50 mM LiBr) Mn=2,009 Da, Mp=1,902 Da, PDI=1.05; Purity (HPLC)=99.1%.

Example 42—Preparation of N-Butyl-NH-poly(Sar$_{30}$)-Myristoyl

A 25 mL round-bottom flask was charged with N-butylamine (30 mg, 0.410 mmol, 1 equiv.) and N,N-dimethylacetamide (DMAc) (5 mL). The reaction flask was then placed in a jacketed reaction beaker equipped to a circulating isopropanol/water bath with the temperature set to 15° C. The solution was stirred and allowed to equilibrate for ~5 mins before the addition of sarcosine N-carboxyanhydride (Sar NCA) (1.42 g, 12.3 mmol, 30 equiv.). IR spectroscopy was used to monitor the reaction progression via disappearance of the carbonyl stretches at ~1850 and 1778 cm$^{-1}$. After stirring for 5 hours, the Sar NCA was completely consumed, and the temperature of the reaction was raised to 25° C. Triethylamine (572 µL, 4.10 mmol, 10 equiv.) was added to the reaction, followed by myristoyl chloride (1.115 mL, 4.102 mmol, 10 equiv.). The reaction was stirred overnight before filtering through a medium porosity fritted glass funnel and rinsing with DMAc (~4 mL). The reaction mixture was transferred to a beaker using DMAc (2×1 mL) to rinse the filtration flask. While stirring vigorously with an overhead stirrer, methyl tert-butyl ether (MTBE) (80 mL, ~7 volumes) was added slowly over 5-10 seconds. The precipitation was stirred for 1-2 mins before the stirring was stopped and the material was allowed to settle before collected via vacuum filtration in a medium porosity fritted glass funnel. The semi-dry material was slurried briefly on the frit with an additional MTBE (25 mL). The material was dried in vacuum oven at ~50° C. for 2 days. This yielded 373 mg (37.6%) of the title compound as a dense powder. GPC (DMF, 50 mM LiBr) Mn=2,022 Da, Mp=1,906 Da, PDI=1.05; Purity (HPLC)=98.7%.

Example 43—Preparation of N-Butyl-NH-poly(Sar$_{30}$)-Palmitoyl

A 25 mL round-bottom flask was charged with N-butylamine (30 mg, 0.410 mmol, 1 equiv.) and N,N-dimethylacetamide (DMAc) (5 mL). The reaction flask was then placed in a jacketed reaction beaker equipped to a circulating isopropanol/water bath with the temperature set to 15° C. The solution was stirred and allowed to equilibrate for ~5 mins before the addition of sarcosine N-carboxyanhydride (Sar NCA) (1.42 g, 12.3 mmol, 30 equiv.). IR spectroscopy was used to monitor the reaction progression via disappearance of the carbonyl stretches at ~1850 and 1778 cm$^{-1}$. After stirring for 5 hours, the Sar NCA was completely consumed, and the temperature of the reaction was raised to 25° C. Triethylamine (572 µL, 4.10 mmol, 10 equiv.) was added to the reaction, followed by palmitoyl chloride (1.244 mL, 4.102 mmol, 10 equiv.). The reaction was stirred overnight before filtering through a medium porosity fritted glass funnel and rinsing with DMAc (~4 mL). The reaction mixture was transferred to a beaker using DMAc (2×1 mL) to rinse the filtration flask. While stirring vigorously with an overhead stirrer, methyl tert-butyl ether (MTBE) (80 mL, ~7 volumes) was added slowly over 5-10 seconds. The precipitation was stirred for 1-2 mins before the stirring was stopped and the material was allowed to settle before collected via vacuum filtration in a medium porosity fritted glass funnel. The semi-dry material was slurried briefly on the frit with an additional MTBE (25 mL). The material was dried in vacuum oven at ~50° C. for 2 days. This yielded 373 mg (37.2%) of the title compound as a dense powder. GPC (DMF, 50 mM LiBr) Mn=2,101 Da, Mp=1,989 Da, PDI=1.05; Purity (HPLC)=98.5%.

Example 44—Preparation of N-Butyl-NH-poly(Sar$_{30}$)-Oleoyl

A 25 mL round-bottom flask was charged with N-butylamine (30 mg, 0.410 mmol, 1 equiv.) and N,N-dimethylacetamide (DMAc) (5 mL). The reaction flask was then placed in a jacketed reaction beaker equipped to a circulating isopropanol/water bath with the temperature set to 15° C. The solution was stirred and allowed to equilibrate for ~5 mins before the addition of sarcosine N-carboxyanhydride (Sar NCA) (1.42 g, 12.3 mmol, 30 equiv.). IR spectroscopy was used to monitor the reaction progression via disappearance of the carbonyl stretches at ~1850 and 1778 cm$^{-1}$. After stirring for 5 hours, the Sar NCA was completely consumed, and the temperature of the reaction was raised to 25° C. Triethylamine (572 µL, 4.10 mmol, 10 equiv.) was added to the reaction, followed by oleoyl chloride (1.356 mL, 4.102 mmol, 10 equiv.). The reaction was stirred overnight before filtering through a medium porosity fritted glass funnel and rinsing with DMAc (~4 mL). The reaction mixture was transferred to a beaker using DMAc (2×1 mL) to rinse the filtration flask. While stirring vigorously with an overhead stirrer, methyl tert-butyl ether (MTBE) (80 mL, ~7 volumes) was added slowly over 5-10 seconds. The precipitation was stirred for 1-2 mins before the stirring was stopped and the material was allowed to settle before collected via vacuum filtration in a medium porosity fritted glass funnel. The semi-dry material was slurried briefly on the frit with an additional MTBE (25 mL). The material was dried in vacuum oven at ~50° C. for 2 days. This yielded 792 mg (78.2%) of the title compound as a dense powder. GPC (DMF, 50 mM LiBr) Mn=2,340 Da, Mp=2,103 Da, PDI=1.11; Purity (HPLC)=98.6%.

Example 45—Preparation of Tetradecyl-NH-poly(Sar$_{23}$)

Following the general procedure of Example 17 with the following reagent equivalents and amounts: tetradecylamine (407 mg, 1 equiv.), sarcosine NCA (5.05 g, 23 equiv.), DMAc (35 mL). This yielded the title compound as a dense white solid (3.2 g, 90.8%). GPC (DMF, 50 mM LiBr) Mn=1,919 Da, Mp=2,010 Da, PDI=1.02.

The invention claimed is:
1. A composition, comprising:
(i) a polymer of Formula II:

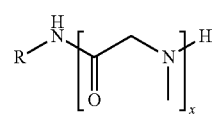

or a salt thereof, wherein:
R is a (C12-C20) hydrophobic aliphatic group; and
x is 5-50; and
(ii) a protein.
2. The composition according to claim 1, wherein:
R is $CH_3$—$(CH_2)_y$—; and
y is 11-19.
3. The composition according to claim 1, wherein:
R is $CH_3(CH_2)_7CH$=$CH(CH_2)_7CH_2$—.
4. A composition, comprising:
(i) a polymer of Formula III:

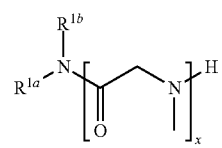

or a salt thereof, wherein:
$R^{1a}$ is a (C6-C20)hydrophobic aliphatic group;
$R^{1b}$ a (C6-C20)hydrophobic aliphatic group; and
x is 5-50; and
(ii) a protein.
5. The composition according to claim 4, wherein:
$R^{1a}$ is $CH_3$—$(CH_2)_y$—;

$R^{1b}$ is $CH_3-(CH_2)_z-$;
y is 5-19; and
z is 5-19.

6. The composition according to claim 1, wherein the polymer has the following structure:

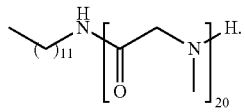

7. The composition according to claim 1, wherein the polymer has the following structure:

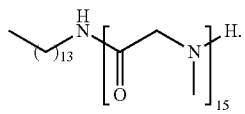

8. The composition according to claim 1, wherein the polymer has the following structure:

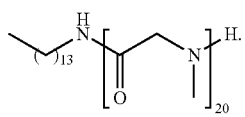

9. The composition according to claim 1, wherein the polymer has the following structure:

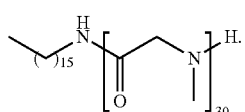

10. The composition according to claim 1, wherein the polymer has the following structure:

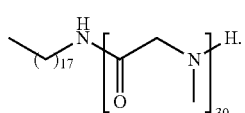

11. The composition according to claim 4, wherein the polymer has the following structure:

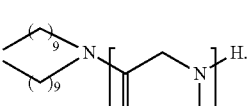

12. The composition according to claim 4, wherein the polymer has the following structure:

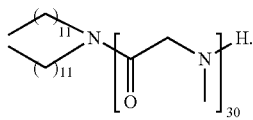

13. The composition according to claim 1, wherein the polymer has the following structure:

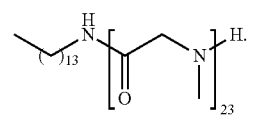

14. The composition according to claim 1 or 4, further comprising one or more of water, a preservative, and a pH adjuster.

15. The composition according to claim 1 or 4, further comprising one or more of water, a preservative, and a pH adjuster.

16. A composition, comprising:
(i) a polymer of Formula I:

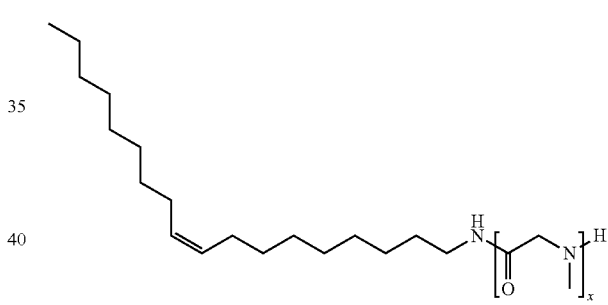

or a salt thereof, wherein x is 5-90; and
(ii) a protein.

17. The composition of claim 16, wherein x is 10.
18. The composition of claim 16, wherein x is 15.
19. The composition of claim 16, wherein x is 20.
20. The composition of claim 16, wherein x is 25.
21. The composition of claim 16, wherein x is 30.
22. The composition of claim 16, wherein x is 35.
23. The composition of claim 16, wherein x is 45.
24. The composition according to claim 16, further comprising one or more of water, a preservative, and a pH adjuster.

* * * * *